US012732716B2

(12) United States Patent
Yoshita et al.

(10) Patent No.: US 12,732,716 B2
(45) Date of Patent: Sep. 8, 2026

(54) SOLID-STATE IMAGING ELEMENT

(71) Applicant: SONY SEMICONDUCTOR SOLUTIONS CORPORATION, Kanagawa (JP)

(72) Inventors: Ryoto Yoshita, Kanagawa (JP); Takashi Machida, Tokyo (JP); Luonghung Asakura, Kanagawa (JP); Yoshiaki Inada, Tokyo (JP); Yoshimichi Kumagai, Kanagawa (JP); Toru Shirakata, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 149 days.

(21) Appl. No.: 18/699,397

(22) PCT Filed: Sep. 2, 2022

(86) PCT No.: PCT/JP2022/033061
§ 371 (c)(1),
(2) Date: Apr. 8, 2024

(87) PCT Pub. No.: WO2023/062962
PCT Pub. Date: Apr. 20, 2023

(65) Prior Publication Data

US 2024/0414450 A1 Dec. 12, 2024

(30) Foreign Application Priority Data

Oct. 15, 2021 (JP) ................................ 2021-169354

(51) Int. Cl.
*H04N 25/65* (2023.01)
*H04N 25/532* (2023.01)
(Continued)

(52) U.S. Cl.
CPC ........... *H04N 25/65* (2023.01); *H04N 25/532* (2023.01); *H04N 25/59* (2023.01); *H04N 25/771* (2023.01);
(Continued)

(58) Field of Classification Search
CPC ...... H04N 25/65; H04N 25/532; H04N 25/59; H04N 25/771; H04N 25/78; H04N 25/79;
(Continued)

(56) References Cited

U.S. PATENT DOCUMENTS

2009/0256060 A1 10/2009 Meynants
2011/0121162 A1 5/2011 Murata et al.
(Continued)

FOREIGN PATENT DOCUMENTS

JP 2010-034890 2/2010
JP 2019-057873 4/2019
(Continued)

OTHER PUBLICATIONS

Park et al., "A 2.2μm stacked back side illuminated voltage domain global shutter CMOS image sensor," IEEE International Electron Devices Meeting (IEDM), 2019, 4 pages.
(Continued)

*Primary Examiner* — Albert H Cutler
(74) *Attorney, Agent, or Firm* — SHERIDAN ROSS P.C.

(57) ABSTRACT

In a solid-state imaging element that performs exposure in all pixels at the same time, image quality is improved. A solid-state imaging element includes a previous-stage circuit, a plurality of capacitive elements, a selection circuit, and a subsequent-stage circuit. In the solid-state imaging element, the previous-stage circuit converts charges into a voltage using each of a plurality of conversion efficiencies and outputs it to the previous-stage node. One ends of the plurality of capacitive elements are connected to the previ-
(Continued)

ous-stage node in common. The selection circuit connects the other end of one of the plurality of capacitive elements to a subsequent-stage node. The subsequent-stage circuit reads the voltage via the subsequent-stage node.

20 Claims, 79 Drawing Sheets

(51) Int. Cl.

| | |
|---|---|
| ***H04N 25/57*** | (2023.01) |
| ***H04N 25/59*** | (2023.01) |
| ***H04N 25/627*** | (2023.01) |
| ***H04N 25/671*** | (2023.01) |
| ***H04N 25/771*** | (2023.01) |
| ***H04N 25/78*** | (2023.01) |
| ***H04N 25/79*** | (2023.01) |

(52) U.S. Cl.
CPC ............. *H04N 25/78* (2023.01); *H04N 25/79* (2023.01); *H04N 25/57* (2023.01); *H04N 25/627* (2023.01); *H04N 25/671* (2023.01)

(58) Field of Classification Search
CPC .... H04N 25/57; H04N 25/627; H04N 25/671; H04N 25/70; H04N 25/76; H04N 25/77
See application file for complete search history.

(56) References Cited

U.S. PATENT DOCUMENTS

| | | | | |
|---|---|---|---|---|
| 2012/0287294 | A1* | 11/2012 | Kaizu | H04N 25/589 348/E5.037 |
| 2015/0341582 | A1* | 11/2015 | Sakaguchi | H04N 25/771 348/301 |
| 2019/0246054 | A1 | 8/2019 | Kobayashi et al. | |
| 2019/0327432 | A1* | 10/2019 | Milkov | H10F 39/809 |
| 2020/0260034 | A1 | 8/2020 | Moue et al. | |
| 2023/0156369 | A1* | 5/2023 | Miyauchi | H10F 39/18 348/308 |

FOREIGN PATENT DOCUMENTS

| | | |
|---|---|---|
| JP | 2019-135815 | 8/2019 |
| JP | 2021-158313 | 10/2021 |
| TW | 201320739 A | 5/2013 |

OTHER PUBLICATIONS

English Translation of International Search Report prepared by the Japan Patent Office on Oct. 13, 2022, for International Application No. PCT/JP2022/033061, 2 pgs.

* cited by examiner

Fig. 9
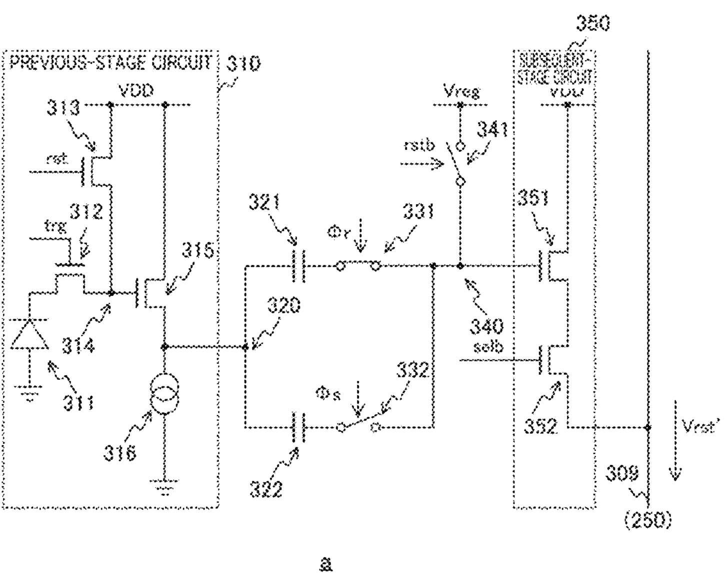
a
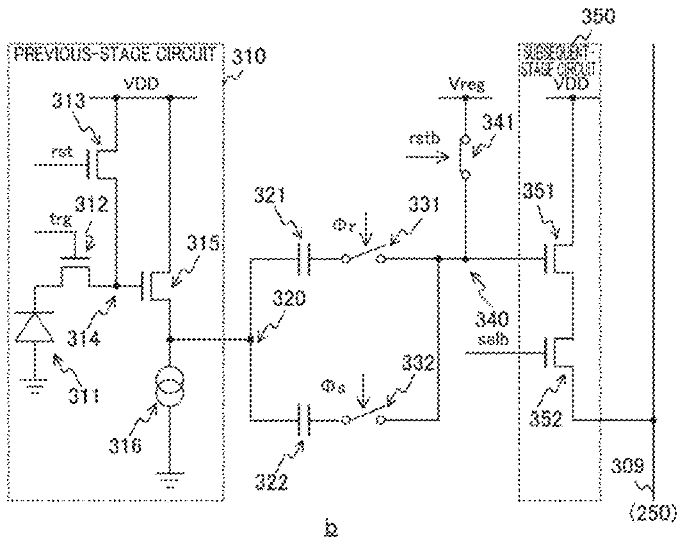
b

Fig. 33
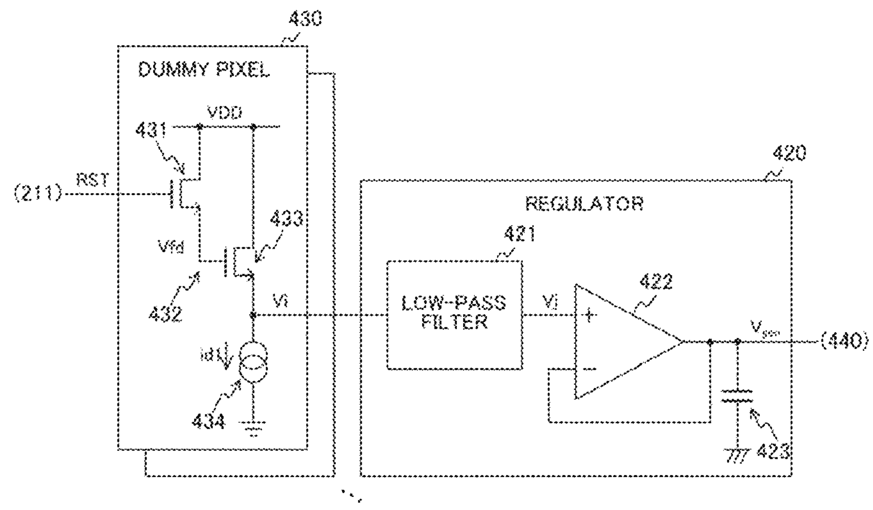
a
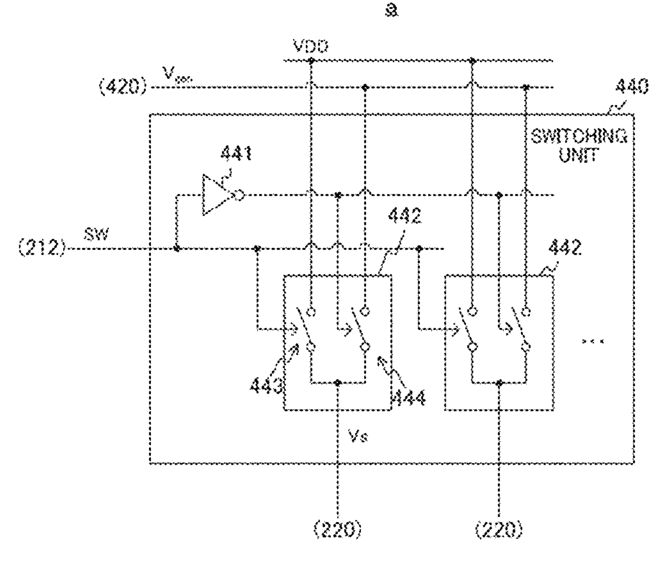
b

Fig. 38

| OPERATION | NOISE | RN(μVrms) | | NOTE |
|---|---|---|---|---|
| | | FIRST EMBODIMENT | SEVENTH EMBODIMENT | |
| GLOBAL SHUTTER | PIXEL kTC NOISE | 450 | 450 | SH CAPACITY OF 50 fF |
| SEQUENTIAL READING | NOISE OF PREVIOUS-STAGE SF | 380 | 0 | — |
| | NOISE AFTER SUBSEQUENT-STAGE SF | 160 | 160 | INCLUDING ADC NOISE |
| TOTAL | | 610 | 478 | — |

Fig. 61

| DRIVING EXAMPLE | CONVERSION EFFICIENCY | PIXEL DRIVING METHOD |
| --- | --- | --- |
| DRIVING EXAMPLE 1 | ANY ONE OF HCG, MCG, AND LCG | HOLD P-PHASE IN THREE CAPACITIVE ELEMENTS, AND HOLD D-PHASE IN REMAINING THREE CAPACITIVE ELEMENTS |
| DRIVING EXAMPLE 2 | | HOLD P-PHASE IN TWO CAPACITIVE ELEMENTS, AND HOLD D-PHASE IN ANOTHER TWO CAPACITIVE ELEMENTS |
| DRIVING EXAMPLE 3 | TWO OF HCG, MCG, AND LCG | HOLD P-PHASE AND D-PHASE ACCORDING TO HIGHER CONVERSION EFFICIENCY IN PLURALITY OF CAPACITIVE ELEMENTS, AND HOLD P-PHASE AND D-PHASE ACCORDING TO LOWER CONVERSION EFFICIENCY IN PLURALITY OF CAPACITIVE ELEMENTS |
| DRIVING EXAMPLE 4 | | HOLD P-PHASE AND D-PHASE ACCORDING TO HIGHER CONVERSION EFFICIENCY IN PLURALITY OF CAPACITIVE ELEMENTS, AND HOLD P-PHASE AND D-PHASE ACCORDING TO LOWER CONVERSION EFFICIENCY IN SMALLER NUMBER OF CAPACITIVE ELEMENTS |

Fig. 62
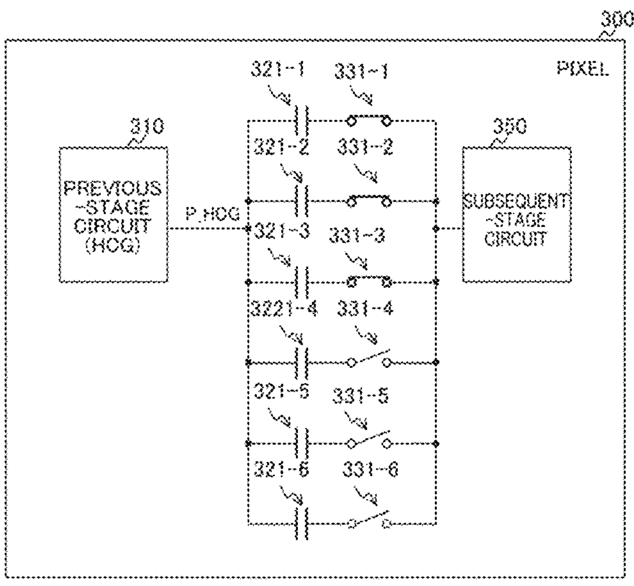
a
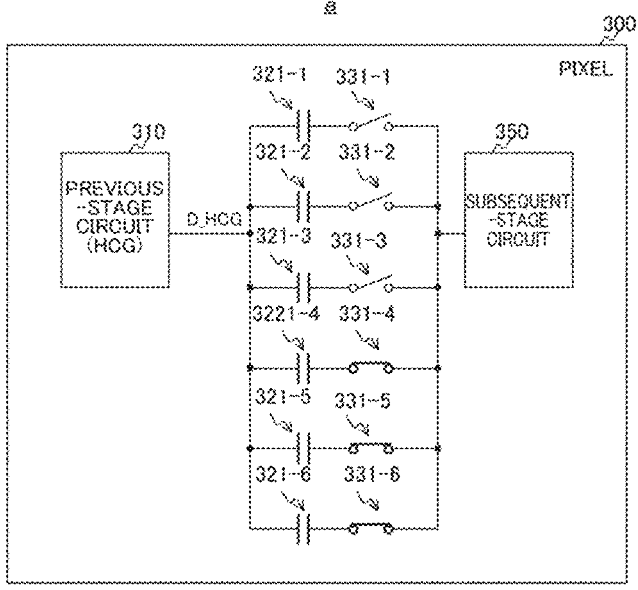
b

Fig. 63
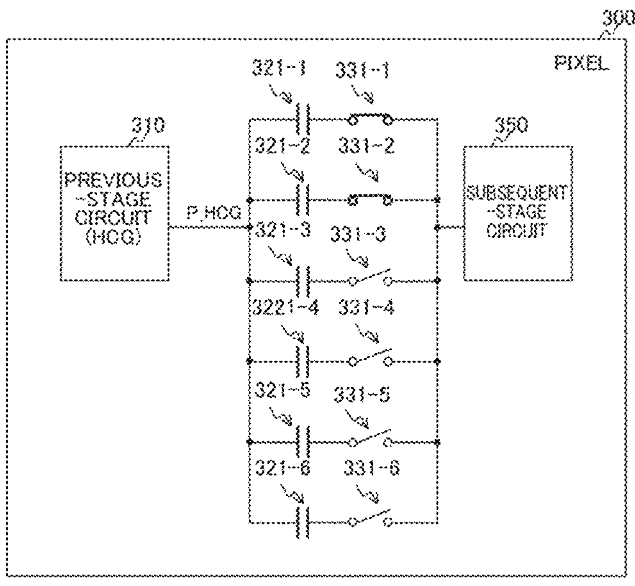
a
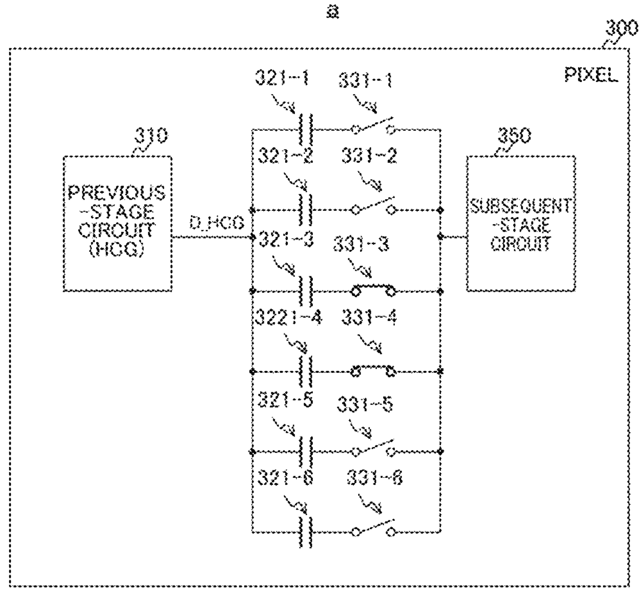
b

Fig. 66
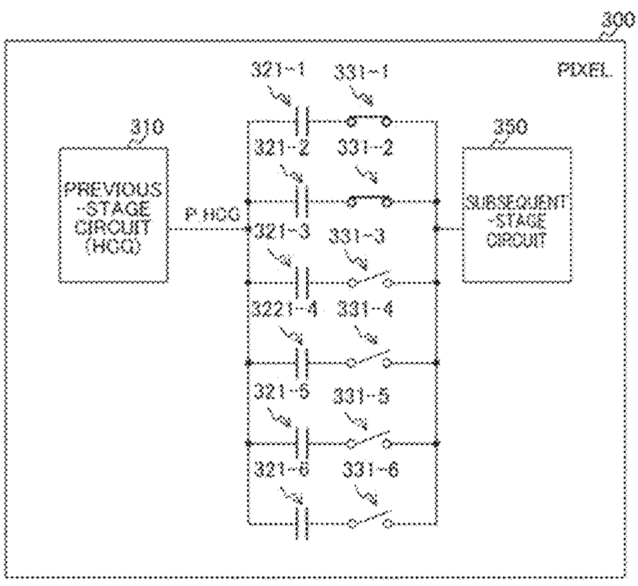
a
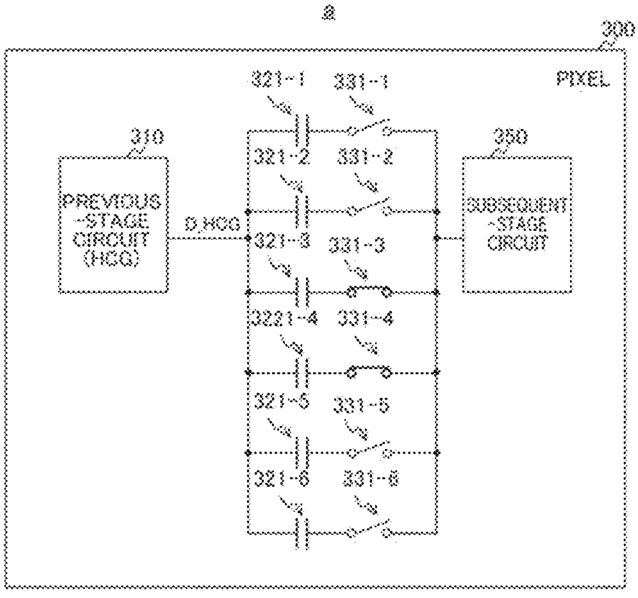
b

Fig. 67
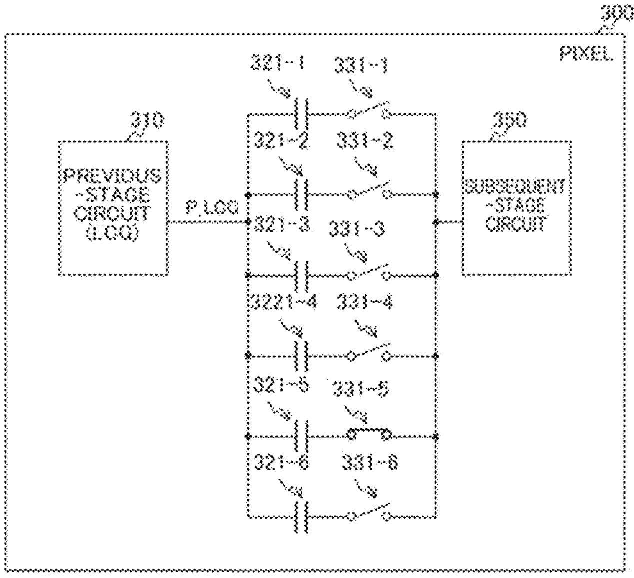
a
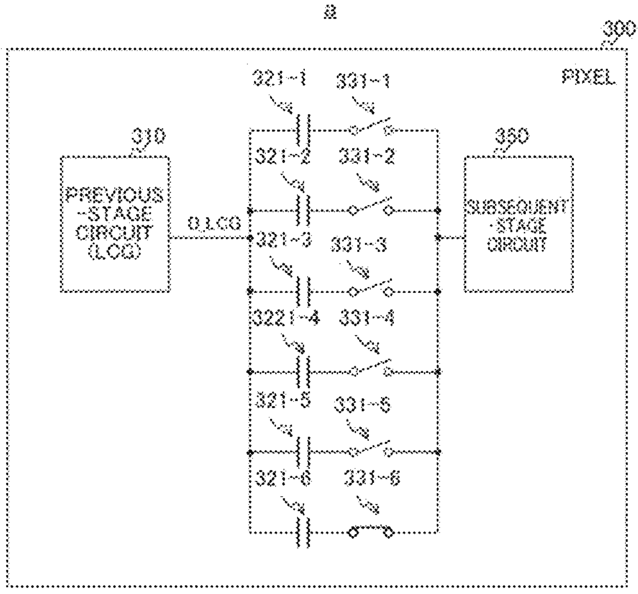
b

SOLID-STATE IMAGING ELEMENT

CROSS REFERENCE TO RELATED APPLICATIONS

This application is a national stage application under 35 U.S.C. 371 and claims the benefit of PCT Application No. PCT/JP2022/033061, having an international filing date of 2 Sep. 2022, which designated the United States, which PCT application claimed the benefit of Japanese Patent Application No. 2021-169354, filed 15 Oct. 2021, the entire disclosures of each of which are incorporated herein by reference.

TECHNICAL FIELD

The present technology relates to a solid-state imaging element. More specifically, the present technology relates to a voltage domain type solid-state imaging element.

BACKGROUND ART

In recent years, attention has been focused on voltage domain type global shutter complementary MOS (CMOS) image sensors that convert signal charges into a voltage and hold it. Hereinafter, such sensors will be referred to as "VD.GS". Regarding VD.GS, there is a concern that kTC noise may become worse, and thus a configuration in which a sample-and-hold circuit including a pair of capacitive elements is provided for each pixel has been proposed (see, for example, NPL 1).

CITATION LIST

Non Patent Literature

NPL 1: Geunsook Park, et al., A 2.2 μm stacked back side illuminated voltage domain global shutter CMOS image sensor, IEDM 2019.

SUMMARY

Technical Problem

In the above-described related art, a reduction in kTC noise in VD.GS is achieved by holding a voltage in a sample-and-hold circuit. However, in the above-described solid-state imaging element, it is not possible to switch a conversion efficiency at the time of converting charges into a voltage. For this reason, there is a concern that a saturation charge amount may be insufficient in the case of high illuminance, and there is a concern that sensitivity may be insufficient in the case of low illuminance. Due to the insufficiency of the saturation charge amount and the sensitivity, the above-described VD.GS has a problem in that the image quality of captured image data deteriorates.

The present technology has been made in view of such circumstances, and an object thereof is to improve image quality in a solid-state imaging element that exposes all pixels at the same time.

Solution to Problem

The present technology has been made to solve the above-described problems, and a first aspect thereof is a solid-state imaging element including a previous-stage circuit that converts charges into a voltage using each of a plurality of conversion efficiencies and outputs it to a previous-stage node, a plurality of capacitive elements whose one ends are connected to the previous-stage node in common, a selection circuit that connects the other end of one of the plurality of capacitive elements to a subsequent-stage node, and a subsequent-stage circuit that reads the voltage via the subsequent-stage node. This brings about the effect of reducing kTC noise.

Furthermore, in the first aspect, the plurality of capacitive elements may include a high capacitive element whose capacitance value is higher than a predetermined value and a low capacitive element whose capacitance value is lower than the predetermined value, the high capacitive element may hold the voltage generated by a highest high conversion efficiency among the plurality of conversion efficiencies, and the low capacitive element may hold the voltage generated by a conversion efficiency lower than the highest conversion efficiency among the plurality of conversion efficiencies. This brings about the effect of reducing kTC noise.

Furthermore, in the first aspect, an area of the high capacitive element may be larger than the low capacitive element. This brings about the effect that the capacitance value of the high capacitive element increases.

Furthermore, in the first aspect, a capacitance density of the high capacitive element may be higher than that of the low capacitive element. This brings about the effect that the areas of the respective capacitive elements are equalized.

Furthermore, in the first aspect, the high capacitive element may include a plurality of unit capacitive elements connected in parallel. This brings about the effect that the capacitance densities and areas of the respective capacitive elements are uniform.

Furthermore, in the first aspect, the previous-stage circuit, the selection circuit, and the subsequent-stage circuit may be disposed in a first chip, and the plurality of capacitive elements may be disposed in a second chip. This brings about the effect of facilitating miniaturization of pixels.

Furthermore, in the first aspect, a distance from the output terminal of the previous-stage circuit to the high capacitive element may be longer than a distance from the output terminal to the low capacitive element. This brings about the effect that the wiring capacity of a wiring to the high capacitive element increases.

Furthermore, in the first aspect, the first chip may include a plurality of laminated substrates. This brings about the effect that the areas of the photoelectric conversion element and the transistor can be increased.

Furthermore, in the first aspect, the previous-stage circuit may include a photoelectric conversion element, a previous-stage transfer transistor that transfers the charges from the photoelectric conversion element to a floating diffusion layer, a first reset transistor that initializes the floating diffusion layer, a previous-stage amplification transistor that amplifies the voltage and outputs it to the previous-stage node, and a predetermined number of conversion efficiency control transistors that control a conversion efficiency. This brings about the effect that the conversion efficiency can be switched by turning on and turning off the conversion efficiency control transistors.

Furthermore, in the first aspect, the previous-stage circuit may further include an additional capacitor, the conversion efficiency control transistor may be inserted between the floating diffusion layer and the additional capacitor, and the additional capacitor may be disposed in the second chip. This brings about the effect that the area of the additional capacitor can be increased.

Furthermore, in the first aspect, the previous-stage circuit may further include an additional capacitor, and a discharge transistor that discharges the charges from the photoelectric conversion element, the predetermined number of conversion efficiency control transistors may include first and second conversion efficiency control transistors inserted in series between the floating diffusion layer and the additional capacitor, and the additional capacitor may be disposed in either the first or second chip. This brings about the effect of suppressing fluctuation in potential of the floating diffusion layer.

Furthermore, in the first aspect, the solid-state imaging element may further include a switching unit that adjusts a source voltage supplied to a source of the previous-stage amplification transistor, in which the previous-stage circuit further may include a current source transistor that supplies a current to a drain of the previous-stage amplification transistor, and the current source transistor may transition from an ON state to an OFF state after an exposure period ends. This brings about the effect that a source follower at a previous stage is set to be in an OFF state during reading.

Furthermore, in the first aspect, the switching unit may supply a predetermined power supply voltage as the source voltage within the exposure period, and may supply a generated voltage different from the power supply voltage as the source voltage after the exposure period ends. This brings about the effect that a source voltage of the source follower at the previous stage is adjusted.

Furthermore, in the first aspect, the solid-state imaging element may further include a control circuit that controls a reset power supply voltage of the previous-stage circuit, in which the first reset transistor may initialize a voltage of the floating diffusion layer to the reset power supply voltage, and the control circuit may set the reset power supply voltage to a voltage different from that in the exposure period within a reading period in which the voltage is read. This brings about the effect of ameliorating sensitivity non-uniformity.

Furthermore, in the first aspect, the solid-state imaging element may further include a digital signal processing unit that adds a pair of consecutive frames, in which the plurality of capacitive elements may include first and second capacitive elements, the voltage may include a reset level and a signal level, and the previous-stage circuit may hold the reset level in one of the first and second capacitive elements within an exposure period of one of the pair of frames and then hold the signal level in the other of the first and second capacitive elements, and may hold the reset level in the other of the first and second capacitive elements within an exposure period of the other of the pair of frames and then hold the signal level in one of the first and second capacitive elements. This brings about the effect of ameliorating sensitivity non-uniformity.

Furthermore, in the first aspect, the solid-state imaging element may further include an analog-to-digital converter that converts the output voltage into a digital signal. This brings about the effect that digital image data is generated.

Furthermore, in the first aspect, the analog-to-digital converter may include a comparator that compares a level of a vertical signal line for transmitting the voltage with a predetermined ramp signal and outputs a comparison result, and a counter that counts a count value over a period until the comparison result is inverted, and outputs the digital signal indicating the count value. This brings about the effect of realizing analog-to-digital conversion with a simple configuration.

Furthermore, in the first aspect, the comparator may include a comparison device that compares levels of a pair of input terminals and outputs comparison results, and an input-side selector that selects either the vertical signal line or a node of a predetermined reference voltage and connects it to one of the pair of input terminals, and the ramp signal may be input to one of the pair of input terminals. This brings about the effect of suppressing a black spot phenomenon.

Furthermore, in the first aspect, the solid-state imaging element may further include a control unit that determines whether an illuminance is higher than a predetermined value based on the comparison result and outputs a determination result, a correlated double sampling (CDS) processing unit that performs correlated double sampling processing on the digital signal, and an output-side selector that outputs either the digital signal subjected to the correlated double sampling processing or a digital signal having a predetermined value based on the determination result. This brings about the effect of suppressing a black spot phenomenon.

Furthermore, in the first aspect, the solid-state imaging element may further include a vertical scanning circuit that controls the previous-stage circuit to set a conversion efficiency, in which capacitance values of the plurality of capacitive elements may be the same, and the voltage may include a reset level and a signal level according to an exposure amount. This brings about the effect that a level is held in the plurality of capacitive elements.

Furthermore, in the first aspect, the vertical scanning circuit may set one of the plurality of conversion efficiencies, may hold the reset level in half of the plurality of capacitive elements, and may hold the signal level in the other half of the plurality of capacitive elements. This brings about the effect of reducing noise when a conversion efficiency is fixed.

Furthermore, in the first aspect, the plurality of capacitive elements may include a plurality of first capacitive elements, a plurality of second capacitive elements, and a plurality of third capacitive elements, and the vertical scanning circuit may set one of the plurality of conversion efficiencies, may hold the reset level in half of the plurality of first capacitive elements, and may hold the signal level in the plurality of second capacitive elements. This brings about the effect of reducing noise when a conversion efficiency is fixed.

Furthermore, in the first aspect, the plurality of capacitive elements may include a plurality of first capacitive elements, a plurality of second capacitive elements, a plurality of third capacitive elements, and a plurality of fourth capacitive elements, and the vertical scanning circuit may sequentially set two of the plurality of conversion efficiencies, may hold the reset level generated by a higher one of the two conversion efficiencies in the plurality of first capacitive elements, may hold the signal level generated by the higher one of the two conversion efficiencies in the plurality of second capacitive elements, may hold the reset level generated by a lower one of the two conversion efficiencies in the plurality of third capacitive elements, and may hold the signal level generated by the lower one of the two conversion efficiencies in the plurality of fourth capacitive elements. This brings about the effect of reducing noise when a conversion efficiency is switched.

Furthermore, in the first aspect, the plurality of capacitive elements may include a plurality of first capacitive elements, a plurality of second capacitive elements, a predetermined number of third capacitive elements smaller than the number of first capacitive elements, and the predetermined number of fourth capacitive elements, and the vertical scanning circuit may sequentially set two of the plurality of conversion efficiencies, may hold the reset level generated by a higher one of the two conversion efficiencies in the plurality of first capacitive elements, may hold the signal level generated by the higher one of the two conversion efficiencies in the plurality of second capacitive elements, may hold the reset level generated by a lower one of the two conversion efficiencies in the predetermined number of third capacitive elements, and may hold the signal level generated by the lower one of the two conversion efficiencies in the predetermined number of fourth capacitive elements. This brings about the effect of reducing noise when a conversion efficiency is switched.

Furthermore, in the first aspect, the voltage may include a first reset level generated immediately before an end of a first exposure period, a first signal level generated at the end of the first exposure period, a second reset level generated immediately before an end of a second exposure period, and a second signal level generated at the end of the second exposure period, the plurality of capacitive elements may include a first capacitive element that holds the first reset level, a second capacitive element that holds the first signal level, a third capacitive element that holds the second reset level, and a fourth capacitive element that holds the second signal level, the second exposure period may be started immediately after the end of the first exposure period, and the subsequent-stage circuit may read the voltage while avoiding a sample-and-hold period of the voltage. This brings about the effect of improving a consecutive imaging function.

Furthermore, in the first aspect, the voltage may further include a third reset level generated immediately before end of a third exposure period and a third signal level generated at the end of the third exposure period, the plurality of capacitive elements may further include a fifth capacitive element that holds the third reset level and a sixth capacitive element that holds the third signal level, and the third exposure period may be started immediately after the end of the second exposure period. This brings about the effect that three frames are imaged.

Furthermore, in the first aspect, the voltage may have a first reset level generated immediately before end of a first exposure period, a first signal level generated at the end of the first exposure period, and a second signal level generated at end of the second exposure period, the plurality of capacitive elements may include a first capacitive element that holds the first reset level, a second capacitive element that holds the first signal level, and a third capacitive element that holds the second signal level, the second exposure period may be started immediately after the end of the first exposure period, and the subsequent-stage circuit may read the voltage while avoiding a sample-and-hold period of the voltage. This brings about the effect of increasing the number of frames to be consecutively imaged.

Further, a second aspect of the present technology is a solid-state imaging element including a photoelectric conversion element, a first additional capacitor, a second additional capacitor that has a capacitance value different from that of the first additional capacitor, a transfer transistor that transfers charges from the photoelectric conversion element to a floating diffusion layer, a first conversion efficiency control transistor that opens and closes a path between the floating diffusion layer and the first additional capacitor, and a second conversion efficiency control transistor that opens and closes a path between a connection node between the first conversion efficiency control transistor and the first additional capacitor and the second additional capacitor. This brings about the effect that a difference in combined capacitances before and after switching a conversion efficiency increases.

BRIEF DESCRIPTION OF DRAWINGS

FIG. 9 is a diagram showing an example of the state of each pixel at the time of reset level reading and at the time of initialization of a subsequent-stage node in the first embodiment of the present technology.

FIG. 33 is a circuit diagram showing configuration examples of a dummy pixel, a regulator, and a switching unit in the seventh embodiment of the present technology.

FIG. 38 is a diagram showing effects in the seventh embodiment of the present technology.

FIG. 61 is a diagram showing a pixel driving method in the fifteenth embodiment of the present technology.

FIG. 62 is a diagram showing an example of the state of a pixel at the time of performing sampling-and-holding in Driving Example 1 in the fifteenth embodiment of the present technology.

FIG. 63 is a diagram showing an example of the state of a pixel at the time of performing sampling-and-holding in Driving Example 2 in the fifteenth embodiment of the present technology.

FIG. 66 is a diagram showing an example of the state of a pixel at the time of sampling and holding a level corresponding to a high conversion efficiency in Driving Example 4 in the fifteenth embodiment of the present technology.

FIG. 67 is a diagram showing an example of the state of a pixel at the time of sampling and holding a level corresponding to a low conversion efficiency in Driving Example 4 in the fifteenth embodiment of the present technology.

DESCRIPTION OF EMBODIMENTS

Hereinafter, a mode for implementing the present technology (hereinafter referred to as an embodiment) will be described. Description will be given in the following order.

1. First embodiment (example in which pixel signals are held in first and second capacitive elements)
2. Second embodiment (example in which discharge transistor is added, and pixel signals are held in first and second capacitive elements)
3. Third embodiment (example in which pixel signals are held in first and second capacitive elements, and reset power supply voltage is controlled)
4. Fourth embodiment (example in which pixel signals are held in first and second capacitive elements, and holding level is replaced for each frame)
5. Fifth embodiment (example in which pixel signals are held in first and second capacitive elements to suppress black spot phenomenon)
6. Sixth embodiment (example in which pixel signals are held in the first and second capacitive elements, and rolling shutter operation is performed)
7. Seventh embodiment (example in which pixel signals are held in first and second capacitive elements, and source follower in previous-stage is set to be in OFF state during reading)
8. Eighth embodiment (example in which voltages are held in plurality of capacitive elements with different capacitance values)
9. Ninth embodiment (example in which voltages are held in plurality of capacitive elements with different capacitance densities)
10. Tenth embodiment (example in which layouts of plurality of capacitive elements with different capacitance values are optimized)
11. Eleventh embodiment (example in which voltages are held in plurality of capacitive elements with different capacitance values, and pixel chip is configured as laminated structure)
12. Twelfth embodiment (example in which plurality of additional capacitors with different capacitance values are provided)
13. Thirteenth embodiment (example in which voltages are held in plurality of capacitive elements with different capacitance values, and additional capacitor is provided)
14. Fourteenth embodiment (example in which voltages are held in plurality of capacitive elements with different capacitance values, and additional capacitor and discharge transistor are provided)
15. Example of application to mobile object

1. First Embodiment

[Configuration Example of Imaging Device]

Figure 1:
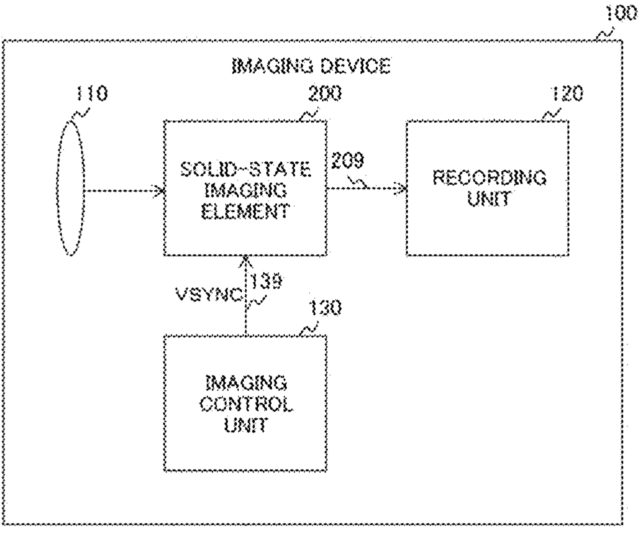
FIG. 1 is a block diagram showing a configuration example of an imaging device in a first embodiment of the present technology.

FIG. 1 is a block diagram showing a configuration example of an imaging device 100 in a first embodiment of the present technology. The imaging device 100 is a device that captures image data, and includes an imaging lens 110, a solid-state imaging element 200, a recording unit 120, and an imaging control unit 130. As the imaging device 100, a digital camera or an electronic device having an imaging function (such as a smartphone, a personal computer, or the like) is assumed.

The solid-state imaging element 200 captures image data under the control of the imaging control unit 130. The solid-state imaging element 200 supplies the image data to the recording unit 120 via a signal line 209.

The imaging lens 110 condenses light and guides the condensed light to the solid-state imaging element 200. The imaging control unit 130 controls the solid-state imaging element 200 so that the solid-state imaging element 200 captures image data. The imaging control unit 130 supplies, for example, an imaging control signal including a vertical synchronization signal VSYNC to the solid-state imaging element 200 via a signal line 139. The recording unit 120 records image data.

Here, the vertical synchronization signal VSYNC is a signal indicating the timing of imaging, and a periodic signal of a constant frequency (60 hertz, or the like) is used as the vertical synchronization signal VSYNC.

Although the imaging device 100 records image data, the image data may be transmitted to the outside of the imaging device 100. In this case, an external interface for transmitting image data is further provided. Alternatively, the imaging device 100 may further display image data. In this case, a display unit is further provided.

[Configuration Example of Solid-State Imaging Element]

Figure 2:
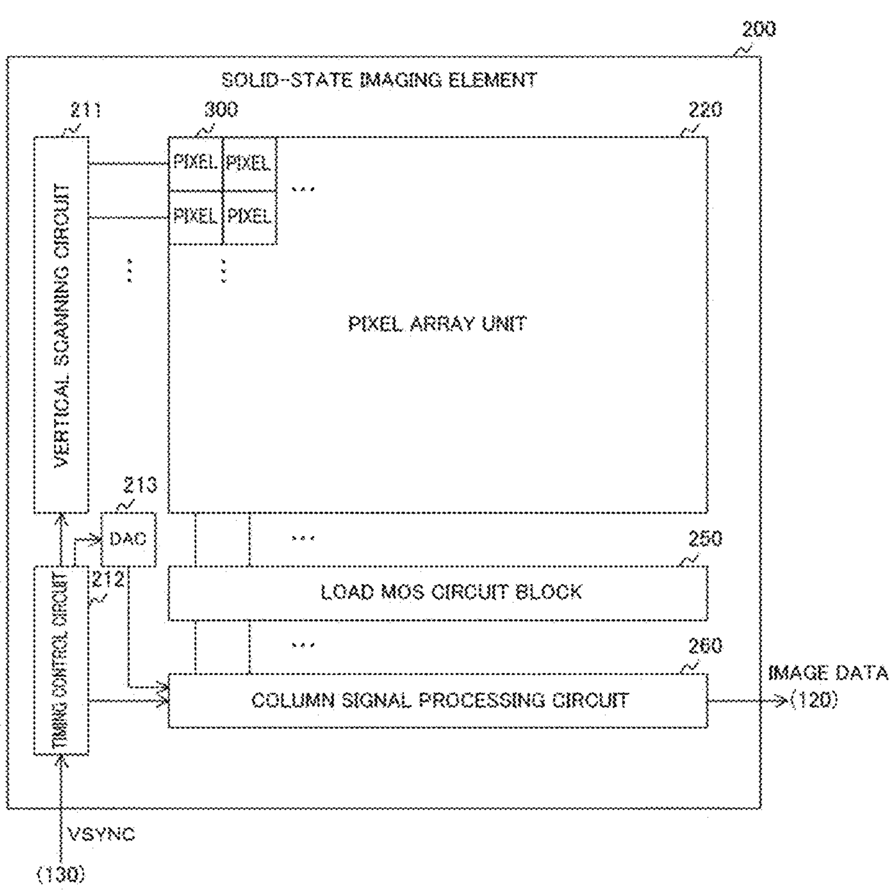
FIG. 2 is a block diagram showing a configuration example of a solid-state imaging element in the first embodiment of the present technology.

FIG. 2 is a block diagram showing a configuration example of the solid-state imaging element 200 in the first embodiment of the present technology. The solid-state imaging element 200 includes a vertical scanning circuit 211, a pixel array unit 220, a timing control circuit 212, a digital to analog converter (DAC) 213, a load MOS circuit block 250, and a column signal processing circuit 260. In the pixel array unit 220, a plurality of pixels 300 are arranged in a two-dimensional grid shape. Further, each circuit within the solid-state imaging element 200 is provided on a single semiconductor chip, for example.

Hereinafter, a set of pixels 300 arranged in the horizontal direction will be referred to as a "row", and a set of pixels 300 arranged in a direction perpendicular to the row will be referred to as a "column".

The timing control circuit 212 controls an operation timing of each of the vertical scanning circuit 211, the DAC 213, and the column signal processing circuit 260 in synchronization with the vertical synchronization signal VSYNC received from the imaging control unit 130.

The DAC 213 generates a sawtooth ramp signal by digital-to-analog (DA) conversion. The DAC 213 supplies the generated ramp signal to the column signal processing circuit 260.

The vertical scanning circuit 211 sequentially selects and drives rows and outputs analog pixel signals. The pixel 300 photoelectrically converts incident light to generate an analog pixel signal. This pixel 300 supplies a pixel signal to the column signal processing circuit 260 via the load MOS circuit block 250.

In the load MOS circuit block 250, a MOS transistor that supplies a constant current is provided for each column.

The column signal processing circuit 260 performs signal processing such as AD conversion processing and CDS processing on pixel signals for each column. The column signal processing circuit 260 supplies image data constituted by processed signals to the recording unit 120.

[Configuration Example of Pixel]

Figure 3:
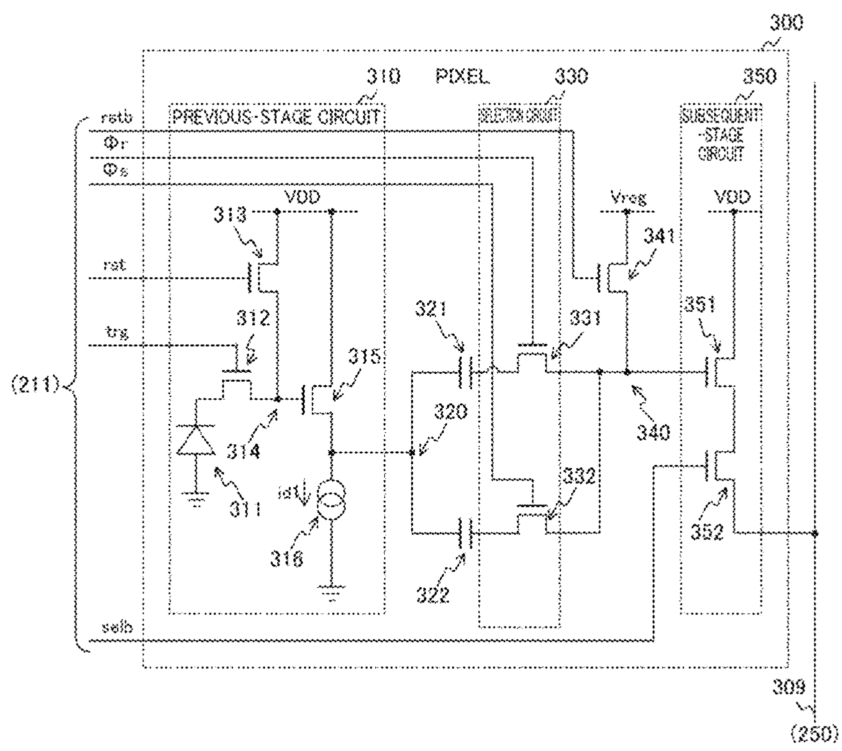
FIG. 3 is a circuit diagram showing a configuration example of a pixel in the first embodiment of the present technology.

FIG. 3 is a circuit diagram showing a configuration example of the pixel 300 in the first embodiment of the present technology. The pixel 300 includes a previous-stage circuit 310, capacitive elements 321 and 322, a selection circuit 330, a subsequent-stage reset transistor 341, and a subsequent-stage circuit 350.

The previous-stage circuit 310 includes a photoelectric conversion element 311, a transfer transistor 312, a floating diffusion (FD) reset transistor 313, an FD 314, a previous-stage amplification transistor 315, and a current source transistor 316.

The photoelectric conversion element 311 generates charges by photoelectric conversion. The transfer transistor 312 transfers charges from the photoelectric conversion element 311 to the FD 314 in response to a transfer signal trg received from the vertical scanning circuit 211.

The FD reset transistor 313 extracts charges from the FD 314 and initializes it in response to the FD reset signal rst received from the vertical scanning circuit 211. The FD 314 stores charges and generates a voltage according to the amount of charge. The previous-stage amplification transistor 315 amplifies the level of the voltage of the FD 314 and outputs the voltage to a previous-stage node 320. The FD reset transistor 313 is an example of a first reset transistor described in the claims.

Further, the sources of the FD reset transistor 313 and the previous-stage amplification transistor 315 are connected to a power supply voltage VDD. The current source transistor 316 is connected to a drain of the previous-stage amplification transistor 315. The current source transistor 316 supplies a current id1 under the control of the vertical scanning circuit 211.

One end of each of the capacitive elements 321 and 322 is connected to the previous-stage node 320 in common, and the other end thereof is connected to the selection circuit 330.

The selection circuit 330 includes a selection transistor 331 and a selection transistor 332. The selection transistor 331 opens and closes a path between the capacitive element 321 and a subsequent-stage node 340 in response to a selection signal Φr received from the vertical scanning circuit 211. The selection transistor 332 opens and closes a path between the capacitive element 322 and the subsequent-stage node 340 in response to a selection signal Φs received from the vertical scanning circuit 211.

The subsequent-stage reset transistor 341 initializes the level of the subsequent-stage node 340 to a predetermined potential Vreg in response to a subsequent-stage reset signal rstb from the vertical scanning circuit 211. The potential Vreg is set to a potential different from the power supply potential VDD (for example, a potential lower than VDD).

The subsequent-stage circuit 350 includes a subsequent-stage amplification transistor 351 and a subsequent-stage selection transistor 352. The subsequent-stage amplification transistor 351 amplifies the level of the subsequent-stage node 340. The subsequent-stage selection transistor 352 outputs a signal at the level amplified by the subsequent-stage amplification transistor 351 to the vertical signal line 309 as a pixel signal in response to a subsequent-stage selection signal selb received from the vertical scanning circuit 211.

As various transistors (the transfer transistor 312 and the like) in the pixel 300, for example, n-channel metal oxide semiconductor (nMOS) transistors are used.

The vertical scanning circuit 211 supplies a high-level FD reset signal rst and transfer signal trg to all pixels when exposure is started. Thereby, the photoelectric conversion element 311 is initialized. Hereinafter, this control will be referred to as "PD reset".

Immediately before the exposure ends, the vertical scanning circuit 211 supplies the high-level FD reset signal rst over a pulse period while setting the subsequent-stage reset signal rstb and the selection signal Φr at a high level for all pixels. Thereby, the FD 314 is initialized, and a level corresponding to the level of the FD 314 at that time is held in the capacitive element 321. This control will be referred to as "FD reset" below.

The level of the FD 314 at the time of the FD reset and a level corresponding to that level (the holding level of the capacitive element 321 and the level of the vertical signal line 309) will be collectively referred to as a "P-phase" or a "reset level" below.

When the exposure ends, the vertical scanning circuit 211 supplies a high-level transfer signal trg over a pulse period while setting the subsequent-stage reset signal rstb and the selection signal Φs to a high level for all pixels. Thereby, signal charges corresponding to the amount of exposure are transferred to the FD 314, and a level corresponding to the level of the FD 314 at that time is held in the capacitive element 322.

The level of the FD 314 at the time of transferring the signal charges and a level corresponding to that level (the holding level of the capacitive element 322 and the level of the vertical signal line 309) will be collectively referred to as a "D-phase" or a "signal level" below.

Exposure control of starting and ending exposure for all pixels at the same time in this manner will be referred to as a global shutter method. Through this exposure control, the previous-stage circuits 310 of all pixels generate a reset level and a signal level in order. The reset level is held in the capacitive element 321, and the signal level is held in the capacitive element 322.

After the exposure is completed, the vertical scanning circuit 211 sequentially selects rows and sequentially outputs reset levels and signal levels of the rows. When the reset levels are output, the vertical scanning circuit 211 supplies a high-level selection signal Φr over a predetermined period while setting the FD reset signal rst and the subsequent-stage selection signal selb of the selected row to a high level. Thereby, the capacitive element 321 is connected to the subsequent-stage node 340, and a reset level is read.

After the reset level is read, the vertical scanning circuit 211 supplies a high-level subsequent-stage reset signal rstb over a pulse period while setting the FD reset signal rst and the subsequent-stage selection signal selb of the selected row to a high level. Thereby, the level of the subsequent-stage node 340 is initialized. At this time, both the selection transistor 331 and the selection transistor 332 are in an open state, and the capacitive elements 321 and 322 are separated from the subsequent-stage node 340.

After the subsequent-stage node 340 is initialized, the vertical scanning circuit 211 supplies a high-level selection signal Φs for a predetermined period while setting the FD reset signal rst and the subsequent selection signal selb of the selected row to a high level. Thereby, the capacitive element 322 is connected to the subsequent-stage node 340, and the signal level is read.

Through the above-described reading control, the selection circuit 330 in the selected row sequentially performs control of connecting the capacitive element 321 to the subsequent-stage node 340, control of separating the capacitive elements 321 and 322 from the subsequent-stage node 340, and control of connecting the capacitive element 322 to the subsequent-stage node 340. Further, when the capacitive elements 321 and 322 are separated from the subsequent-stage node 340, the subsequent-stage reset transistor 341 in the selected row initializes the level of the subsequent-stage node 340. Further, the subsequent-stage circuit 350 in the selected row sequentially reads a reset level and a signal level from the capacitive elements 321 and 322 via the subsequent-stage node 340 and outputs them to the vertical signal line 309.

[Configuration Example of Column Signal Processing Circuit]

Figure 4:
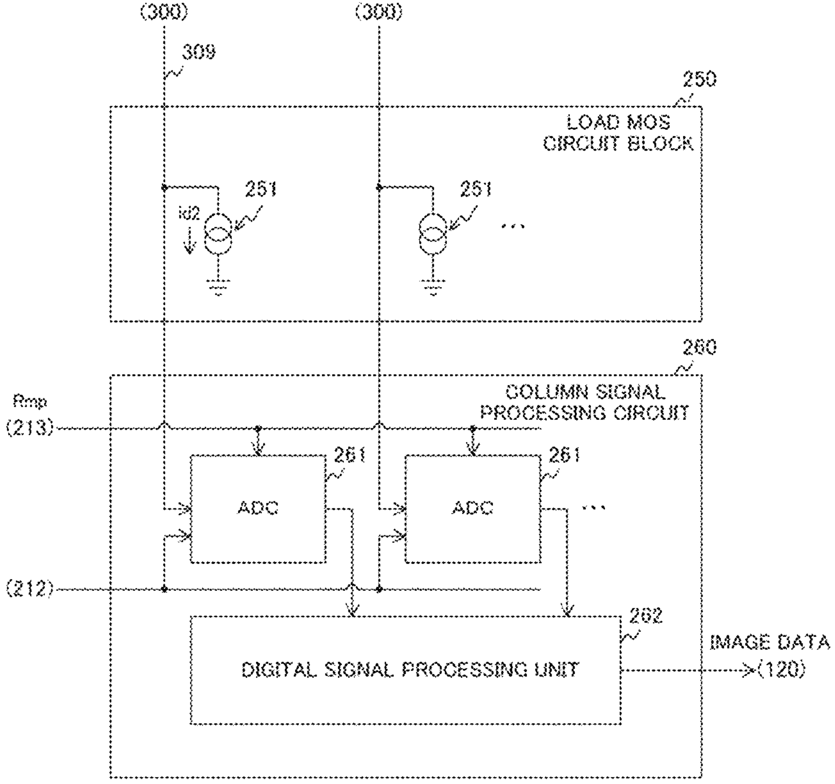
FIG. 4 is a block diagram showing configuration examples of a column signal processing circuit and a load MOS circuit block in the first embodiment of the present technology.

FIG. 4 is a block diagram showing configuration examples of the load MOS circuit block 250 and the column signal processing circuit 260 in the first embodiment of the present technology.

In the load MOS circuit block 250, the vertical signal line 309 is wired for each column. When the number of columns is I (I is an integer), I vertical signal lines 309 are wired. Furthermore, a load MOS transistor 251 that supplies a constant current id2 is connected to each of the vertical signal lines 309.

A plurality of ADCs 261 and a digital signal processing unit 262 are disposed in the column signal processing circuit 260. The ADC 261 is disposed for each column. When the number of columns is I, I ADCs 261 are disposed.

The ADC 261 converts an analog pixel signal received from the corresponding column into a digital signal by using a ramp signal Rmp received from the DAC 213. The ADC 261 supplies a digital signal to the digital signal processing unit 262. For example, as the ADC 261, a single slope type ADC including a comparator and a counter is disposed.

The digital signal processing unit 262 performs predetermined signal processing such as CDS processing on each digital signal for each column. The digital signal processing unit 262 supplies image data constituted by processed digital signals to the recording unit 120.

[Operation Example of Solid-State Imaging Element]

Figure 5:
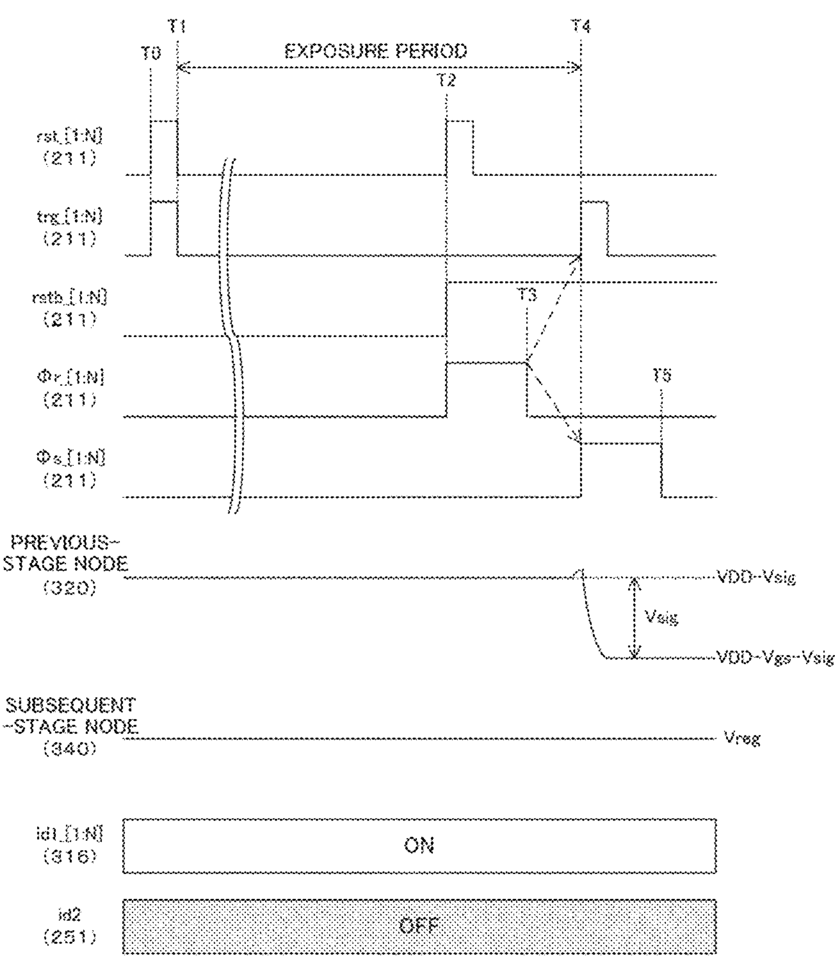
FIG. 5 is a timing chart showing an example of a global shutter operation in the first embodiment of the present technology.

FIG. 5 is a timing chart showing an example of a global shutter operation in the first embodiment of the present technology. The vertical scanning circuit 211 supplies a high-level FD reset signal rst and transfer signal trg to all rows (in other words, all pixels) from a timing T0 immediately before the start of exposure to a timing T1 after a pulse period has elapsed. Thereby, PD reset of all pixels is performed, and exposure is started in all rows at the same time.

Here, rst_[n] and trg_[n] in the drawing indicate signals to a pixel in an n-th row among N rows. N is an integer indicating a total number of rows, and n is an integer from 1 to N.

Then, at a timing T2 immediately before the end of an exposure period, the vertical scanning circuit 211 supplies a high-level FD reset signal rst over a pulse period while setting a subsequent-stage reset signal rstb and a selection signal Φr to a high level in all pixels. Thereby, FD reset of all pixels is performed, and a reset level is sampled and held. Here, rstb_[n] and Φr_[n] in the drawing indicate signals to a pixels in an n-th row.

At a timing T3 after the timing T2, the vertical scanning circuit 211 returns the selection signal Φr to a low level.

At a timing T4 of the end of exposure, the vertical scanning circuit 211 supplies a high-level transfer signal trg over a pulse period while setting a subsequent-stage reset signal rstb and a selection signal Φs to a high level in all pixels. Thereby, a signal level is sampled and held. Further, the level of the previous-stage node 320 decreases from the reset level (VDD−Vsig) to the signal level (VDD−Vgs−Vsig). Here, VDD is a power supply voltage, and Vsig is a net signal level obtained by CDS processing. Vgs is a gate-source voltage of the previous-stage amplification transistor 315. Further, Φs_[n] in the drawing indicates a signal to a pixel in an n-th row.

At a timing T5 after the timing T4, the vertical scanning circuit 211 returns the selection signal Φs to a low level.

Further, the vertical scanning circuit 211 controls the current source transistors 316 of all rows (all pixels) so that the current source transistors 316 supply a current id1. Here, id1_[*n*] in the drawing indicates a current of a pixel in an n-th row. When the current id becomes large, an IR drop becomes large, and thus the current id1 needs to be an order of several nanoamperes (nA) to several tens of nanoamperes (nA). On the other hand, the load MOS transistors 251 in all columns are in an OFF state, and the current id2 is not supplied to the vertical signal line 309.

Figure 6:
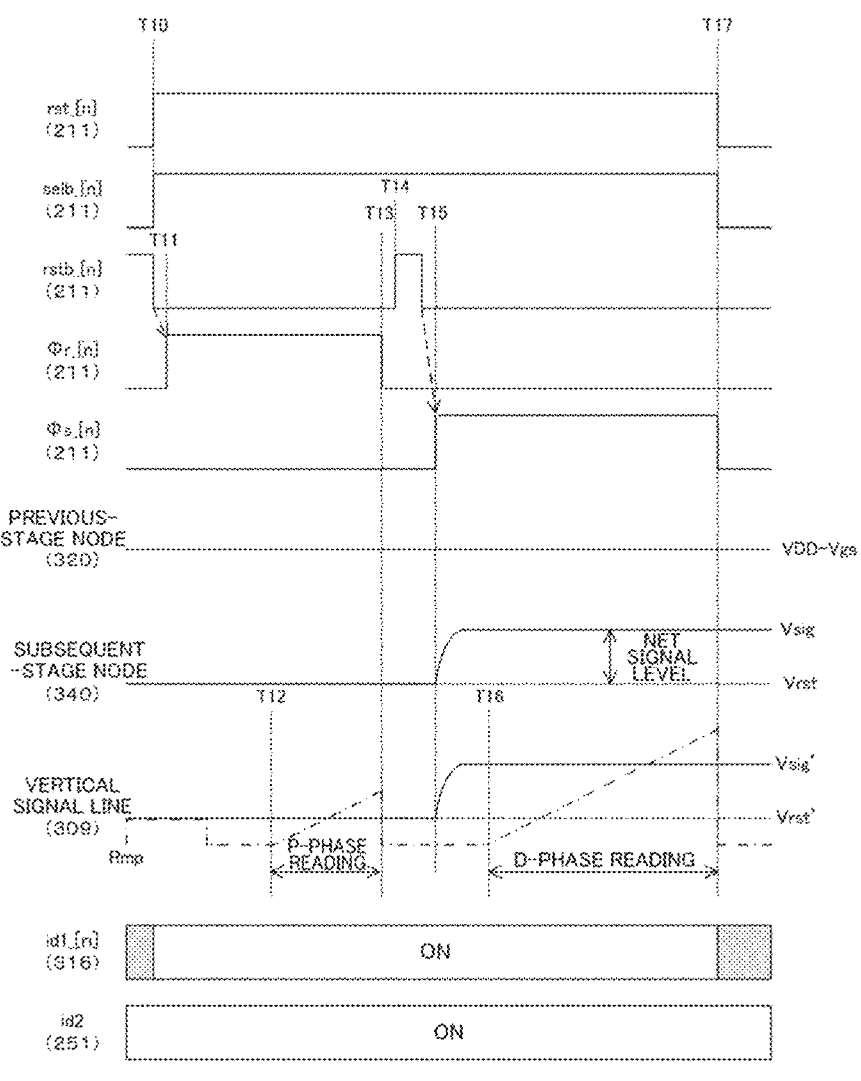
FIG. 6 is a timing chart showing an example of a reading operation in the first embodiment of the present technology.

FIG. 6 is a timing chart showing an example of a reading operation in the first embodiment of the present technology. In a reading period of an n-th row from a timing T10 to a timing T17, the vertical scanning circuit 211 sets an FD reset signal rst and a subsequent-stage selection signal selb of the n-th row to a high level. Further, in the reading period, subsequent-stage reset signals rstb of all rows are controlled to a low level. Here, selb_[n] in the drawing indicates a signal to a pixel in the n-th row.

The vertical scanning circuit 211 supplies a high-level selection signal Φr to the n-th row over a period from the timing T11 immediately after the timing T10 to the timing T13. The potential of the subsequent-stage node 340 is set to a reset level Vrst.

Over the period from the timing T12 after the timing T11 to the timing T13, the DAC 213 gradually increases the ramp signal Rmp. The ADC 261 compares the ramp signal Rmp and a level Vrst' of the vertical signal line 309, and counts a count value until a comparison result is inverted. Thereby, a P-phase level (reset level) is read.

Over a pulse period from the timing T14 immediately after the timing T13, the vertical scanning circuit 211 supplies a high-level subsequent-stage reset signal rstb to the n-th row. Thereby, when there is a parasitic capacitance in the subsequent-stage node 340, the history of the previous signals held in the parasitic capacitance can be erased.

The vertical scanning circuit 211 supplies a high-level selection signal Φs to the n-th row over a period from the timing T15 to the timing T17 immediately after the subsequent-stage node 340 is initialized. The potential of the subsequent-stage node 340 is set to a signal level Vsig. Although the signal level was lower than the reset level at the time of exposure, the subsequent-stage node 340 is a reference at the time of reading, and thus the signal level becomes higher than the reset level. A difference between the reset level Vrst and the signal level Vsig corresponds to a net signal level after FD reset noise and offset noise are removed.

Over a period from the timing T16 after the timing T15 to the timing T17, the DAC 213 gradually increases the ramp signal Rmp. The ADC 261 compares the ramp signal Rmp and the level Vrst' of the vertical signal line 309 and counts a count value until a comparison result is inverted. Thereby, a D-phase level (signal level) is read.

Further, the vertical scanning circuit 211 controls the current source transistor 316 in the n-th row to be read out over a period from the timing T10 to the timing T17 so that the current source transistor 316 supplies a current id1. Furthermore, the timing control circuit 212 controls the load MOS transistors 251 in all columns to supply a current id2 during a reading period of all rows.

Figure 7:
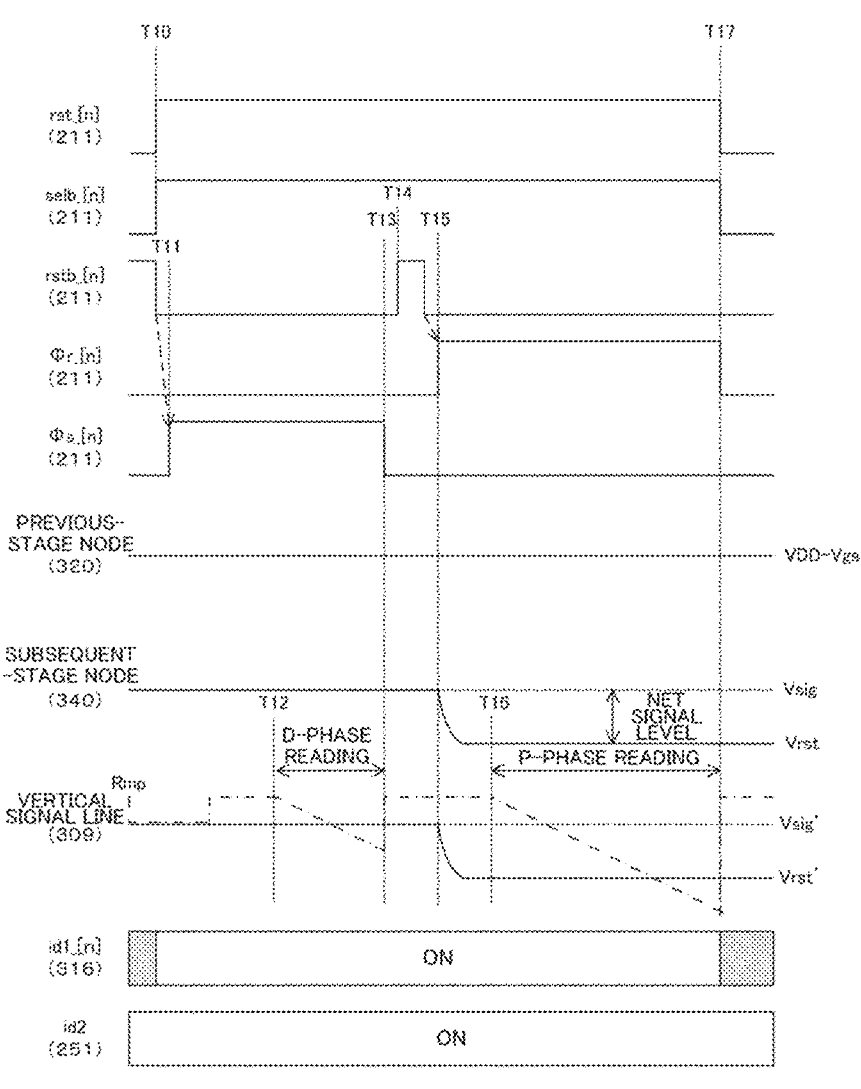
FIG. 7 is a timing chart showing another example of a reading operation in the first embodiment of the present technology.

Although the solid-state imaging element 200 reads the signal level after the reset level, the order is not limited thereto. As shown in FIG. 7, the solid-state imaging element 200 can also read the reset level after the signal level. In this case, as shown in the drawing, the vertical scanning circuit 211 supplies a high-level selection signal Φr after a high-level selection signal Φs. Furthermore, in this case, it is necessary to reverse the inclination of the ramp signal.

Figure 8:
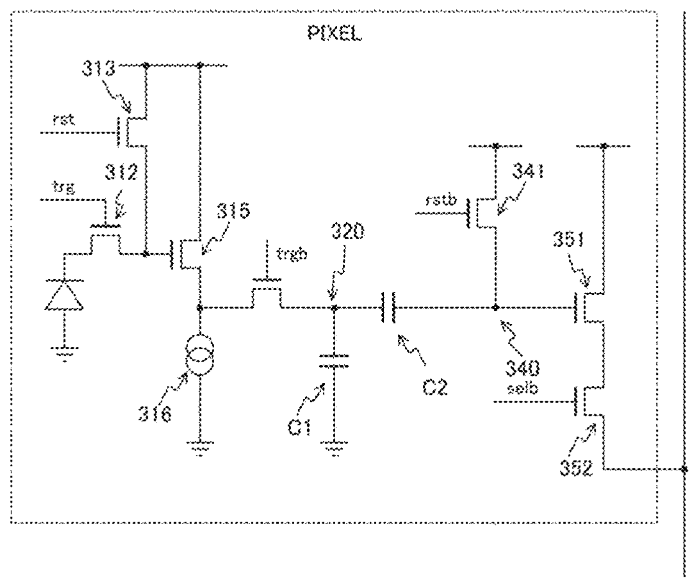
FIG. 8 is a circuit diagram showing a configuration example of a pixel in a comparative example.

FIG. 8 is a circuit diagram showing a configuration example of a pixel in a comparative example. In this comparative example, the selection circuit 330 is not provided, and a transfer transistor is inserted between the previous-stage node 320 and a previous-stage circuit. Furthermore, capacitors C1 and C2 are inserted instead of the capacitive elements 321 and 322. The capacitor C1 is inserted between the previous-stage node 320 and a ground terminal, and the capacitor C2 is inserted between the previous-stage node 320 and the subsequent-stage node 340.

Exposure control and reading control of the pixel in this comparative example are described in, for example, FIG. 5.5.2 of NPL 1. In this comparative example, when it is assumed that a capacitance value of each of the capacitors C1 and C2 is C, a level Vn of kTC noise at the time of exposure and reading is expressed by the following formula.

$$Vn = (3 * kT/C)^{1/2} \quad \text{Formula 1}$$

In the above formula, k denotes Boltzmann's constant, and the unit is, for example, Joule per Kelvin (J/K). T denotes an absolute temperature, and the unit is, for example, Kelvin (K). Further, the unit of Vn is, for example, volt (V), and the unit of C is, for example, farad (F).

FIG. 9 is a diagram showing an example of the state of a pixel in each of the case of reading of a reset level and the case of initialization of a subsequent-stage node in the first embodiment of the present technology. "a" in the drawing indicates the state of the pixel 300 when the reset level is read, and "b" in the drawing indicates the state of the pixel 300 when the subsequent-stage node 340 is initialized. Further, in the drawing, the selection transistor 331, the selection transistor 332, and the subsequent-stage reset transistor 341 are represented by symbols of switches for convenience of description.

As shown in "a" in the drawing, the vertical scanning circuit 211 sets the selection transistor 331 to be in a closed state and sets the selection transistor 332 and the subsequent-stage reset transistor 341 to be in an open state. Thereby, the reset level is read via the subsequent-stage circuit 350.

As shown in "b" in the drawing after the reset level is read, the vertical scanning circuit 211 sets the selection transistor 331 and the selection transistor 332 to be in an open state, and sets the subsequent-stage reset transistor 341 to be in a closed state. Thereby, the capacitive elements 321 and 322 are separated from the subsequent-stage node 340, and the level of the subsequent-stage node 340 is initialized.

It is assumed that a capacitance value of a parasitic capacitance Cp of the subsequent-stage node 340 being separated from the capacitive elements 321 and 322 is extremely small as compared to those of the capacitive elements 321 and 322. For example, when the parasitic capacitance Cp is set to several femtofarads (fF), the parasitic capacitances of the capacitive elements 321 and 322 are an order of several tens of femtofarads.

Figure 10:
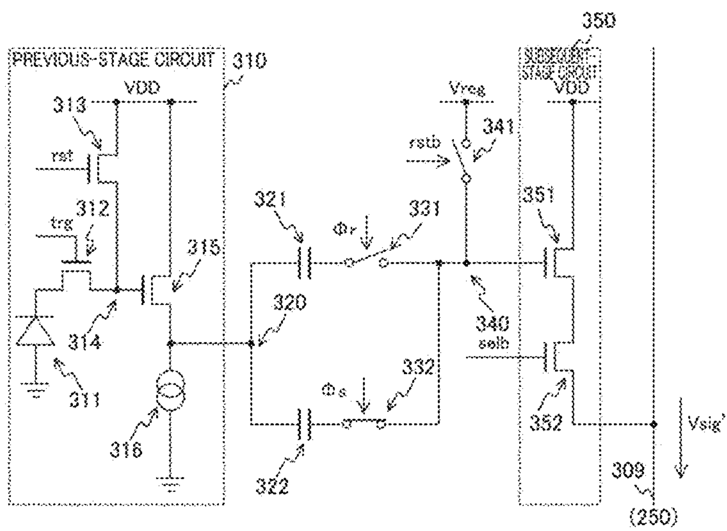
FIG. 10 is a diagram showing an example of the state of a pixel at the time of reading a signal level in the first embodiment of the present technology.

FIG. 10 is a diagram showing an example of the state of the pixel 300 at the time of reading a signal level in the first embodiment of the present technology.

After the subsequent-stage node 340 is initialized, the vertical scanning circuit 211 sets the selection transistor 332 to be in a closed state and sets the selection transistor 331 and the subsequent-stage reset transistor 341 to be in an open state. Thereby, a signal level is read via the subsequent-stage circuit 350.

Here, kTC noise at the time of exposure of the pixel 300 is considered. At the time of the exposure, kTC noise is generated during each of sampling of a reset level and sampling of a signal level immediately before the exposure ends. When it is assumed that a capacitance value of each of the capacitive elements 321 and 322 is C, a level Vn of kTC noise during the exposure is expressed by the following formula.

$$Vn = (2 * kT/C)^{1/2} \quad \text{Formula 2}$$

Furthermore, as shown in FIGS. 9 and 10, since the subsequent-stage reset transistor 341 is driven during reading, kTC noise is generated at that time. However, the capacitive elements 321 and 322 are separated during the driving of the subsequent-stage reset transistor 341, and the parasitic capacitance Cp at that time is small. For this reason, kTC noise during the reading is negligible as compared to kTC noise during the exposure. Thus, kTC noise during the exposure and the reading is expressed by Formula 2.

From Formulas 1 and 2, in the pixel 300 whose capacitance is separated during reading, kTC noise is smaller than in the comparative example in which a capacitance cannot be separated during reading. Thereby, the image quality of image data can be improved.

Figure 11:
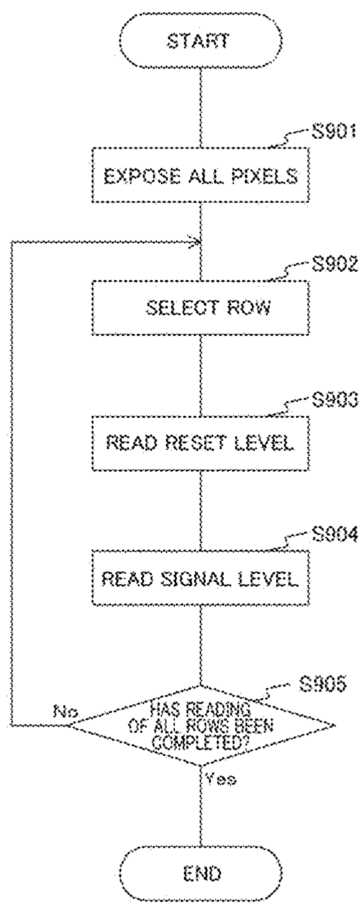
FIG. 11 is a flowchart showing an example of an operation of the solid-state imaging element in the first embodiment of the present technology.

FIG. 11 is a flowchart showing an example of an operation of the solid-state imaging element 200 in the first embodiment of the present technology. This operation is started, for example, when a predetermined application for capturing image data is executed.

The vertical scanning circuit 211 performs exposure for all pixels (step S901). Then, the vertical scanning circuit 211 selects a row to read (step S902). The column signal processing circuit 260 reads a reset level of the row (step S903) and then reads a signal level (step S904).

The solid-state imaging element 200 determines whether reading of all rows has been completed (step S905). When the reading of all rows has not been completed (step S905: No), the solid-state imaging element 200 repeats step S902 and the subsequent steps. On the other hand, when the reading of all rows has been completed (step S905: Yes), the solid-state imaging element 200 executes CDS processing and the like, and ends the operation for imaging. When a plurality of pieces of image data are continuously captured, steps S901 to S905 are repeatedly executed in synchronization with a vertical synchronization signal.

As described above, in the first embodiment of the present technology, when the selection circuit 330 separates the capacitive elements 321 and 322 from the subsequent-stage node 340, the subsequent-stage reset transistor 341 initializes the subsequent-stage node 340. Since the capacitive elements 321 and 322 are separated, the level of reset noise caused by their driving becomes a level corresponding to a parasitic capacitance smaller than their capacitances. The image quality of image data can be improved by reducing the noise.

First Modification Example

In the first embodiment described above, the previous-stage circuit 310 reads a signal while being connected to the previous-stage node 320. However, in this configuration, noise from the previous-stage node 320 cannot be blocked during the reading. A pixel 300 according to a first modification example of the first embodiment is different from that in the first embodiment in that a transistor is inserted between a previous-stage circuit 310 and a previous-stage node 320.

Figure 12:
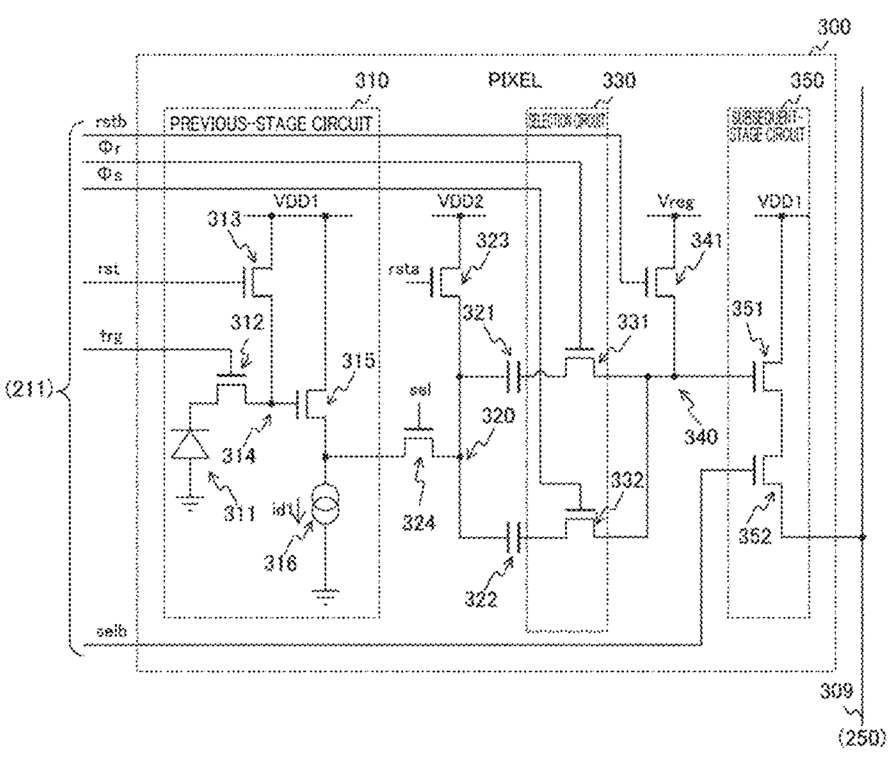
FIG. 12 is a circuit diagram showing a configuration example of a pixel in a first modification example of the first embodiment of the present technology.

FIG. 12 is a circuit diagram showing a configuration example of the pixel 300 in the first modification example of the first embodiment of the present technology. The pixel 300 in the first modification example of the first embodiment is different from that in the first embodiment in that a previous-stage reset transistor 323 and a previous-stage selection transistor 324 are further provided. In addition, power supply voltages of the previous-stage circuit 310 and a subsequent-stage circuit 350 in the first modification example of the first embodiment are set to be VDD1.

The previous-stage reset transistor 323 initializes the level of the previous-stage node 320 with a power supply voltage VDD2. It is desirable that the power supply voltage VDD2 be set to a value that satisfies the following formula.

$$VDD2 = VDD1 - Vgs \qquad \text{Formula 3}$$

In the above formula, Vgs denotes a gate-source voltage of the previous-stage amplification transistor 315.

By setting VDD2 to a value that satisfies Formula 3, it is possible to reduce potential fluctuations between the previous-stage node 320 and a subsequent-stage node 340 during darkness. Thereby, photo response non-uniformity (PRNU) can be improved.

The previous-stage selection transistor 324 opens and closes a path between the previous-stage circuit 310 and the previous-stage node 320 in response to a previous-stage selection signal sel received from a vertical scanning circuit 211.

Figure 13:
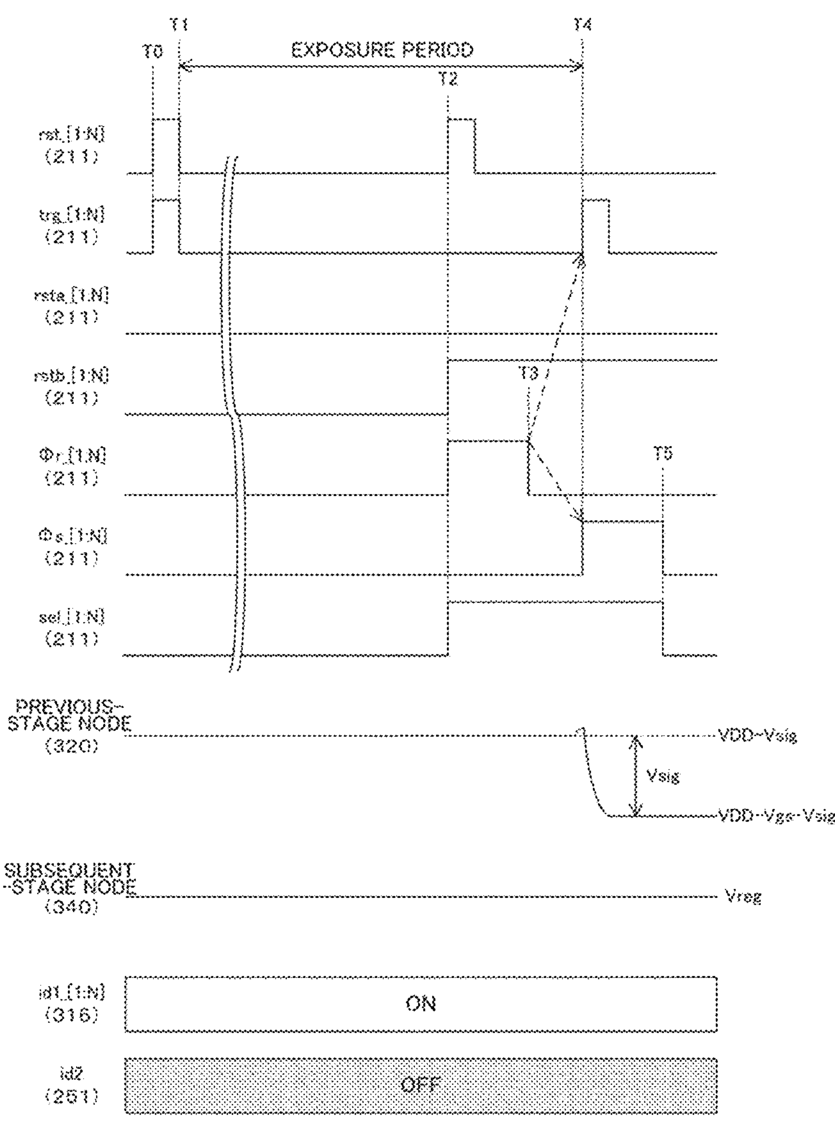
FIG. 13 is a timing chart showing an example of a global shutter operation in the first modification example of the first embodiment of the present technology.

FIG. 13 is a timing chart showing an example of a global shutter operation in the first modification example of the first embodiment of the present technology. The timing chart according to the first modification example of the first embodiment is different from that in the first embodiment in that the vertical scanning circuit 211 further supplies a previous-stage reset signal rsta and a previous-stage selection signal sel. In the drawing, rsta_[n] and sel_[n] indicate signals to a pixel in an n-th row.

The vertical scanning circuit 211 supplies a high-level previous-stage selection signal sel to all pixels from a timing T2 immediately before the end of exposure to a timing T5. The previous-stage reset signal rsta is controlled to a low level.

Figure 14:
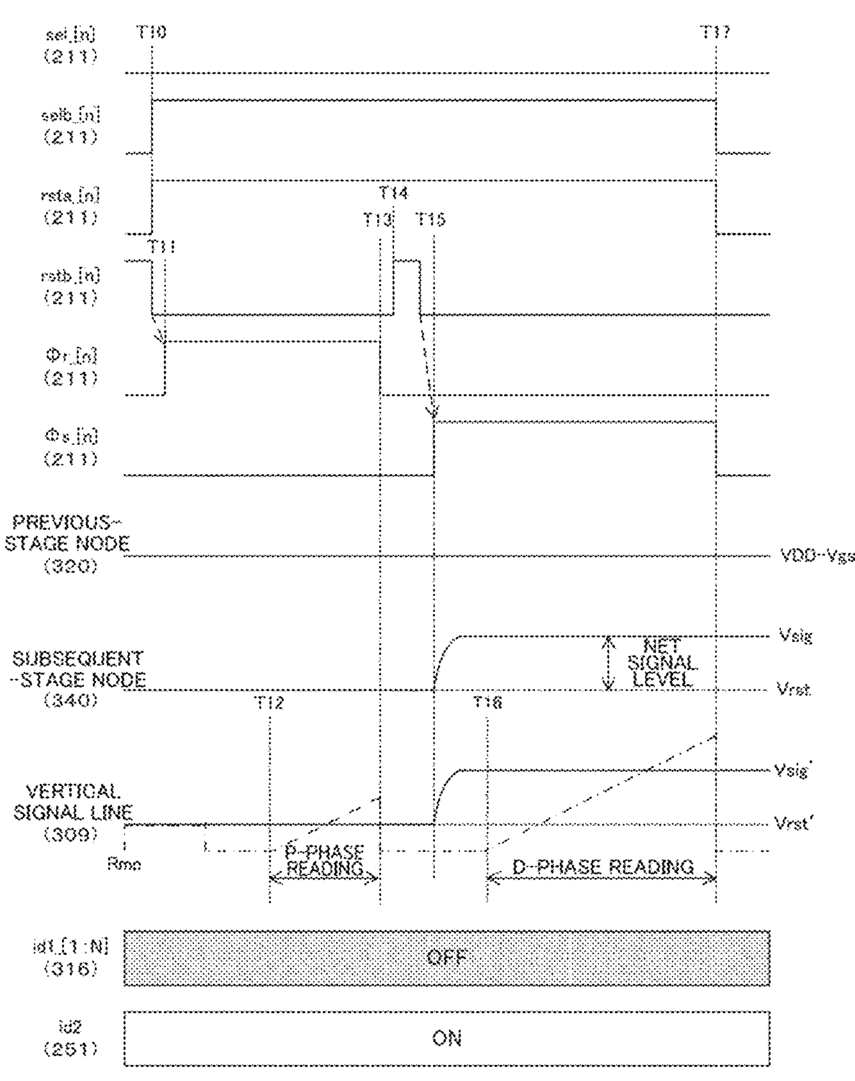
FIG. 14 is a timing chart showing an example of a reading operation in the first modification example of the first embodiment of the present technology.

FIG. 14 is a timing chart showing an example of a reading operation in the first modification example of the first embodiment of the present technology. At the time of reading each row, the previous-stage selection signal sel is controlled to a low level. Through this control, the previous-stage selection transistor 324 transitions to an open state, and the previous-stage node 320 is separated from the previous-stage circuit 310. Thereby, noise from the previous-stage node 320 can be blocked at the time of reading.

Furthermore, during a reading period for the n-th row from a timing T10 to a timing T17, the vertical scanning circuit 211 supplies the high-level previous-stage reset signal rsta to the n-th row.

Further, at the time of the reading, the vertical scanning circuit 211 controls current source transistors 316 of all pixels so that the current source transistors 316 stop supplying a current id1. A current id2 is supplied in the same manner as in the first embodiment. In this manner, the current id1 is controlled more simply than in the first embodiment.

As described above, according to the first modification example of the first embodiment of the present technology, the previous-stage selection transistor 324 transitions to an open state at the time of reading, and the previous-stage circuit 310 is separated from the previous-stage node 320, thereby making it possible to block noise from the previous-stage circuit 310.

Second Modification Example

In the first embodiment described above, the circuit within the solid-state imaging element 200 is provided on a single semiconductor chip. However, in this configuration, there is a concern that the element may not fit within the semiconductor chip when the pixel 300 is miniaturized. A solid-state imaging element 200 in a second modification example of the first embodiment is different from that in the first embodiment in that circuits within the solid-state imaging element 200 are disposed to be distributed to two semiconductor chips.

Figure 15:
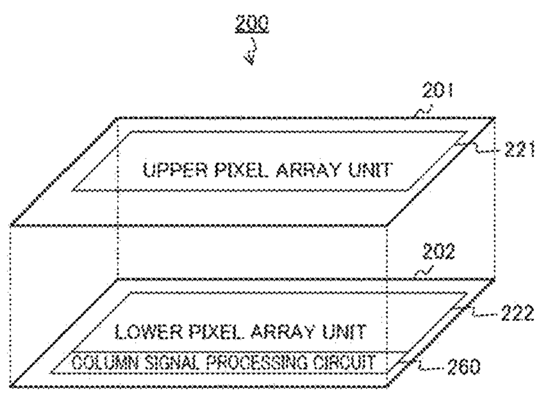
FIG. 15 is a diagram showing an example of a laminated structure of a solid-state imaging element in a second modification example of the first embodiment of the present technology.

FIG. 15 is a diagram showing an example of a laminated structure of the solid-state imaging element 200 in the second modification example of the first embodiment of the present technology. The solid-state imaging element 200 in the second modification example of the first embodiment includes a lower pixel chip 202 and an upper pixel chip 201 laminated on the lower pixel chip 202. These chips are electrically connected by, for example, Cu—Cu bonding. The chips can also be connected by vias or bumps in addition to the Cu—Cu bonding.

An upper pixel array unit 221 is disposed in the upper pixel chip 201. A lower pixel array unit 222 and a column signal processing circuit 260 are disposed in the lower pixel chip 202. For each pixel in a pixel array unit 220, a portion thereof is disposed in the upper pixel array unit 221 and the rest is disposed in the lower pixel array unit 222.

Further, a vertical scanning circuit 211, a timing control circuit 212, a DAC 213, and a load MOS circuit block 250 are also disposed in the lower pixel chip 202. These circuits are omitted in the drawing.

Furthermore, the upper pixel chip 201 is manufactured through, for example, a pixel-dedicated process, and the lower pixel chip 202 is manufactured through, for example, a complementary MOS (CMOS) process. The upper pixel chip 201 is an example of a first chip described in the claims, and the lower pixel chip 202 is an example of a second chip described in the claims.

Figure 16:
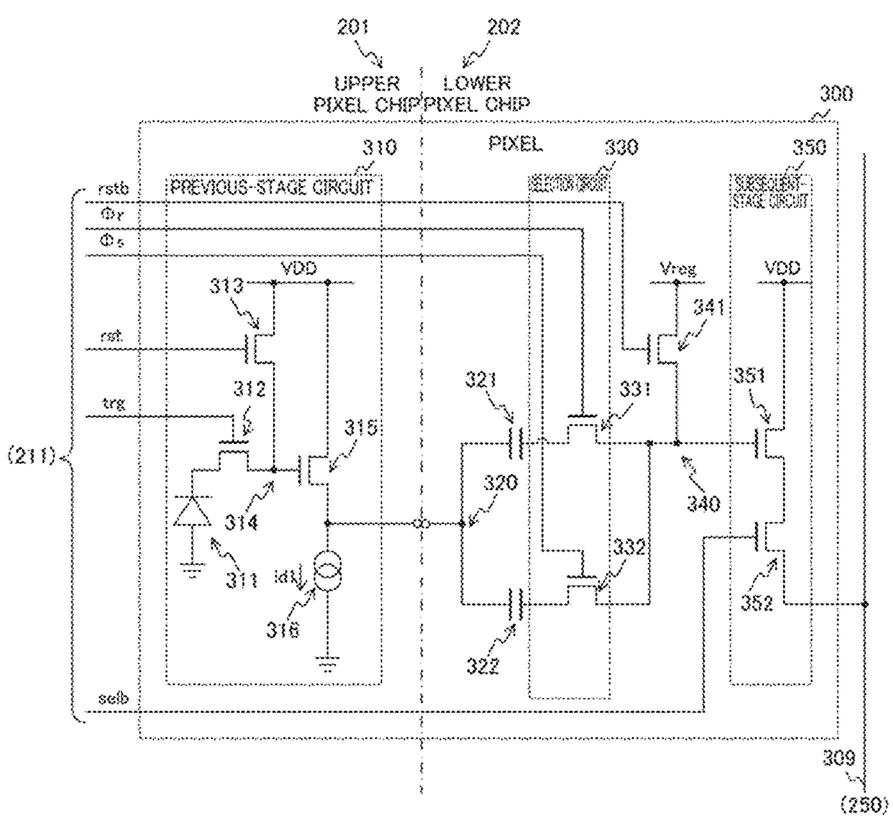
FIG. 16 is a circuit diagram showing a configuration example of a pixel in the second modification example of the first embodiment of the present technology.

FIG. 16 is a circuit diagram showing a configuration example of a pixel 300 in the second modification example of the first embodiment of the present technology. In the pixel 300, a previous-stage circuit 310 is disposed in the upper pixel chip 201, and the other circuits and elements (capacitive elements 321 and 322, and the like) are disposed in the lower pixel chip 202. A current source transistor 316 can also be disposed in the lower pixel chip 202. As shown in the drawing, the elements in the pixel 300 are disposed to be distributed to the upper pixel chip 201 and the lower pixel chip 202 laminated on each other, and thus it is possible to reduce the area of the pixel and facilitate the miniaturization of the pixel.

In this manner, according to the second modification example of the first embodiment of the present technology, the circuits and elements within the pixel 300 are disposed to be distributed to two semiconductor chips, and thus the miniaturization of the pixel is facilitated.

Third Modification Example

Figure 17:
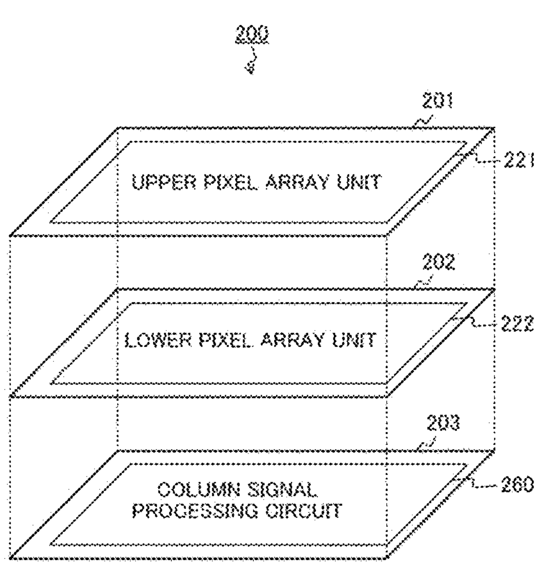
FIG. 17 is a diagram showing an example of a laminated structure of a solid-state imaging element in a third modification example of the first embodiment of the present technology.

In the second modification example of the first embodiment described above, a portion of the pixel 300 and peripheral circuits (the column signal processing circuit 260 and the like) are provided in the lower pixel chip 202 on the lower side. However, in this configuration, the layout area of the circuits and elements on the lower pixel chip 202 side is larger than that of the upper pixel chip 201 due to the peripheral circuits, and there is a concern that a useless space without circuits or elements may be generated in the upper pixel chip 201. A solid-state imaging element 200 in a third modification example of the first embodiment is different from that in the second modification example of the first embodiment in that circuits within the solid-state imaging element 200 are disposed to be distributed to three semiconductor chips FIG. 17 is a diagram showing an example of a laminated structure of the solid-state imaging element 200 in the third modification example of the first embodiment of the present technology. The solid-state imaging element 200 in the third modification example of the first embodiment includes an upper pixel chip 201, a lower pixel chip 202, and a circuit chip 203. These chips are laminated and electrically connected by, for example, Cu—Cu bonding. The chips can also be connected by vias or bumps in addition to the Cu—Cu bonding.

An upper pixel array unit 221 is disposed in the upper pixel chip 201. A lower pixel array unit 222 is disposed in the lower pixel chip 202. For each pixel in the pixel array unit 220, a portion thereof is disposed in the upper pixel array unit 221 and the rest is disposed in the lower pixel array unit 222.

Further, a column signal processing circuit 260, a vertical scanning circuit 211, a timing control circuit 212, a DAC 213, and a load MOS circuit block 250 are disposed in the circuit chip 203. Circuits other than the column signal processing circuit 260 are omitted in the drawing.

By adopting a three-layered configuration as shown in the drawing, it is possible to reduce a useless space and further miniaturize pixels as compared to a two-layered configuration. Furthermore, a lower pixel chip 202 in a second layer can be manufactured through a dedicated process for capacitors and switches.

In this manner, in the third modification example of the first embodiment of the present technology, the circuits in the solid-state imaging element 200 are disposed to be distributed to three semiconductor chips, and thus pixels can be miniaturized as compared to a case where circuits are disposed to be distributed to two semiconductor chips.

2. Second Embodiment

In the first embodiment described above, the reset level is sampled and held within the exposure period. However, in this configuration, an exposure period cannot be made shorter than a sample-and-hold period of a reset level. A solid-state imaging element 200 in a second embodiment is different from that in the first embodiment in that an exposure period is further shortened by adding a transistor that discharges charges from a photoelectric conversion element.

Figure 18:
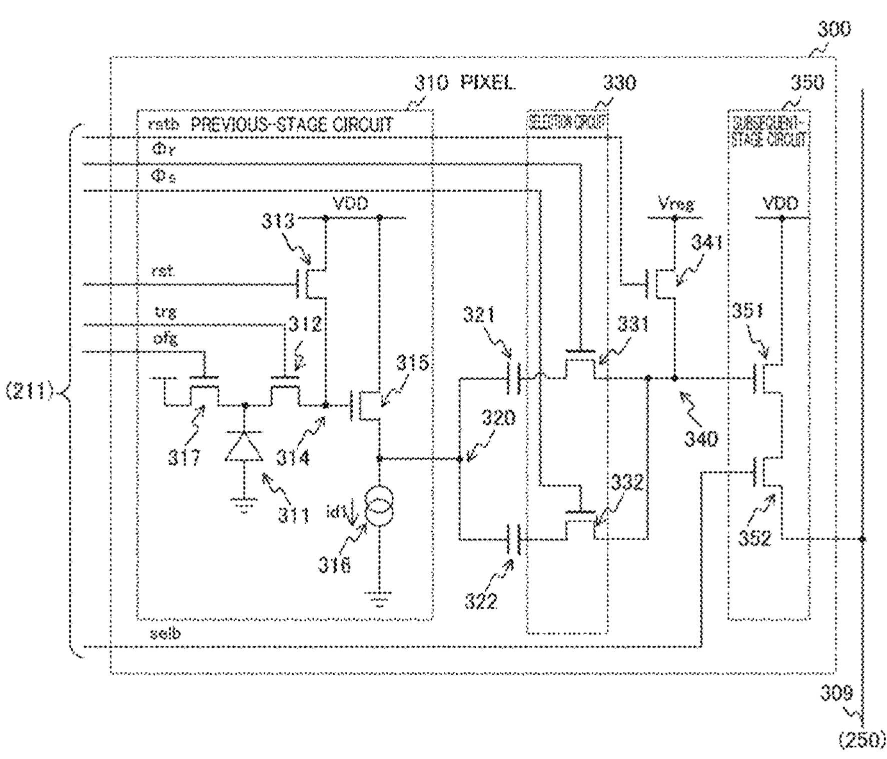
FIG. 18 is a circuit diagram showing a configuration example of a pixel in a second embodiment of the present technology.

FIG. 18 is a circuit diagram showing a configuration example of a pixel 300 in the second embodiment of the present technology. The pixel 300 in the second embodiment is different from that in the first embodiment in that a discharge transistor 317 is further provided in a previous-stage circuit 310.

The discharge transistor 317 functions as an overflow drain that discharges charges from a photoelectric conversion element 311 in response to a discharge signal ofg received from a vertical scanning circuit 211. As the discharge transistor 317, for example, an nMOS transistor is used.

In a configuration in which the discharge transistor 317 is not provided as in the first embodiment, blooming may occur when charges are transferred from the photoelectric conversion element 311 to an FD 314 for all pixels. Then, when FD reset is performed, the potentials of the FD 314 and a previous-stage node 320 drop. In compliance with such a drop in potential, currents for charging and discharging capacitive elements 321 and 322 are continuously generated, and IR drops of a power supply and a ground change from a steady state without blooming.

On the other hand, during sampling-and-holding of signal levels of all pixels, charges in the photoelectric conversion element 311 are set to be in an empty state after signal charges are transferred. Thus, blooming does not occur, and IR drops of the power supply and the ground are set to be in a steady state without blooming. Streaking noise is generated due to a difference in IR drop at the time of performing sampling-and-holding of the reset level and the signal level.

On the other hand, in the second embodiment in which the discharge transistor 317 is provided, the charges of the photoelectric conversion element 311 are discharged to an overflow drain side. For this reason, the IR drops at the time of performing sample-and-holding of the reset level and the signal level become approximately the same, and streaking noise can be suppressed.

Figure 19:
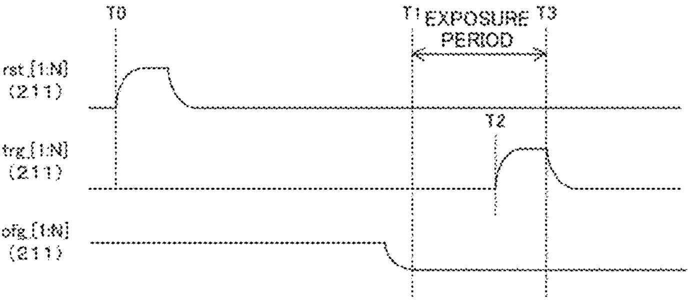
FIG. 19 is a timing chart showing an example of a global shutter operation in the second embodiment of the present technology.

FIG. 19 is a timing chart showing an example of a global shutter operation in the second embodiment of the present technology. At a timing T0 before a timing when exposure is started, the vertical scanning circuit 211 supplies a high-level FD reset signal rst to all pixels over a pulse period while setting discharge signals ofg of all pixels to a high level. Thereby, PD reset and FD reset are performed for all pixels. Additionally, a reset level is sampled and held. Here, ofg_[n] in the drawing indicates a signal to a pixel in an n-th row among N rows.

Then, at a timing T1 when the exposure is started, the vertical scanning circuit 211 returns the discharge signals ofg of all pixels to a low level. Then, the vertical scanning circuit 211 supplies a high-level transfer signal trg to all pixels over a period from a timing T2 immediately before the end of the exposure to a timing T3 when the exposure ends. Thereby, a signal level is sampled and held.

In a configuration in which the discharge transistor 317 is not provided as in the first embodiment, both a transfer transistor 312 and an FD reset transistor 313 have to be set to be in an ON state when exposure is started (that is, when PD reset is performed). In this control, when the PD reset is performed, the FD 314 has also to be reset at the same time. For this reason, it is necessary to perform the FD reset again within the exposure period and to sample and hold a reset level, and it is not possible to make the exposure period shorter than a sample-and-hold period of the reset level. When sampling-and-holding of a reset level is performed for all pixels, a certain degree of waiting time is required until a voltage and a current are stabilized, and a sample-and-hold period of, for example, several microseconds (μs) to several tens of microseconds (μs) is required.

On the other hand, in the second embodiment in which the discharge transistor 317 is provided, PD reset and FD reset can be performed separately. For this reason, as shown in the drawing, a reset level can be sampled and held by performing FD reset before the PD reset is canceled (exposure is started). Thereby, it is possible to make an exposure period shorter than a sample-and-hold period of a reset level.

The first to third modification examples of the first embodiment can also be applied to the second embodiment.

As described above, according to the second embodiment of the present technology, the discharge transistor 317 that discharges charges from the photoelectric conversion element 311 is provided, and thus it is possible to sample and hold a reset level by performing FD reset before exposure is started. Thereby, it is possible to make an exposure period shorter than a sample-and-hold period of a reset level.

3. Third Embodiment

In the first embodiment described above, the FD 314 is initialized by the power supply voltage VDD.

However, in this configuration, there is a concern that sensitivity non-uniformity (PRNU) will deteriorate due to variations in the capacitive elements 321 and 322 and a parasitic capacitance. A solid-state imaging element 200 in a third embodiment is different from that in the first embodiment in that PRNU is improved by lowering a power supply of an FD reset transistor 313 during reading.

Figure 20:
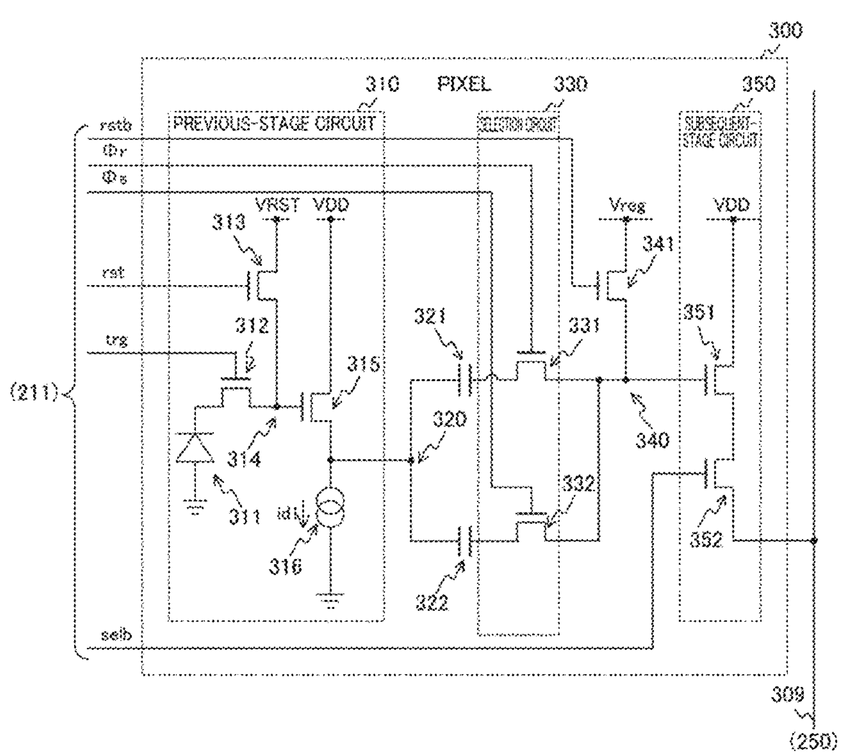
FIG. 20 is a circuit diagram showing a configuration example of a pixel in a third embodiment of the present technology.

FIG. 20 is a circuit diagram showing a configuration example of a pixel 300 in the third embodiment of the present technology. The pixel 300 in the third embodiment is different from that in the first embodiment in that the power supply of the FD reset transistor 313 is separated from a power supply voltage VDD of the pixel 300.

A drain of the FD reset transistor 313 in the third embodiment is connected to a reset power supply voltage VRST. The reset power supply voltage VRST is controlled by, for example, a timing control circuit 212. The timing control circuit 212 is an example of a control circuit described in the claims.

Figure 21:
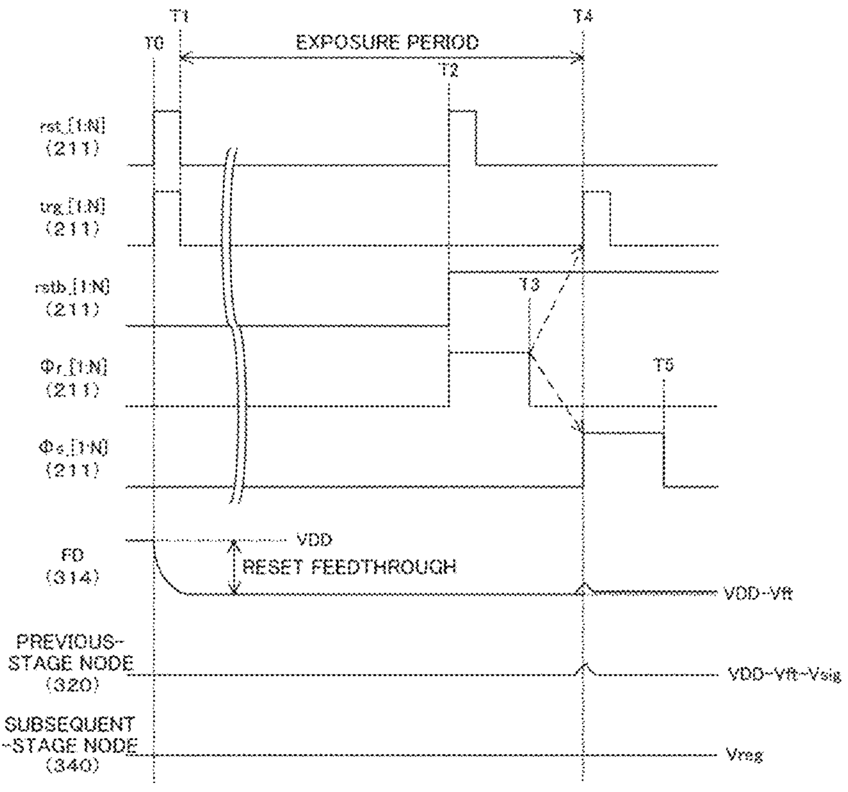
FIG. 21 is a diagram showing reset feedthrough in the third embodiment of the present technology.
Figure 22:
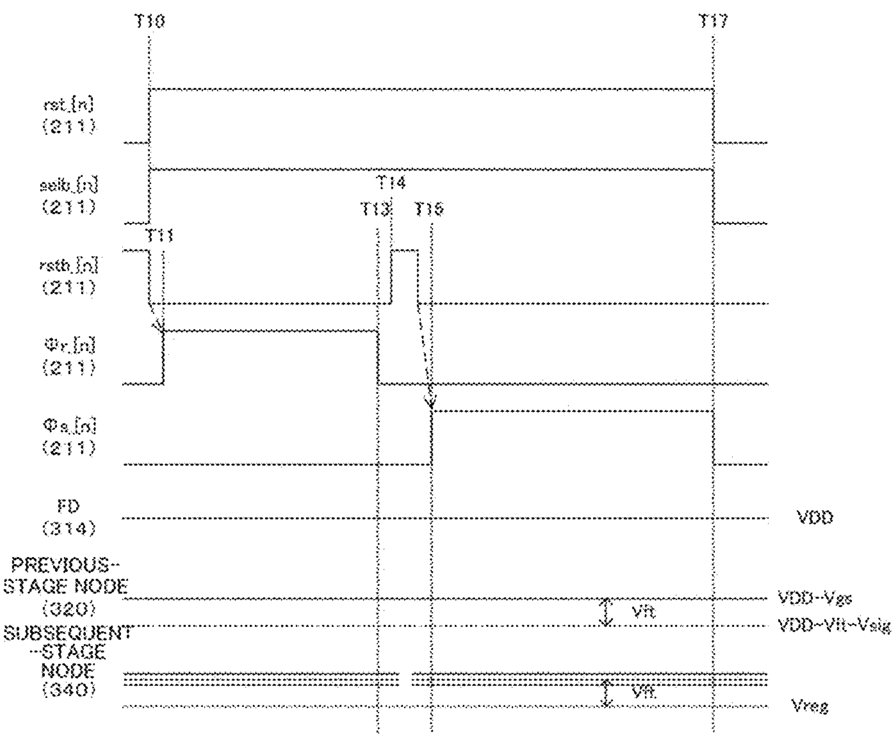
FIG. 22 is a diagram showing variations in level due to reset feedthrough in the third embodiment of the present technology.

Here, a deterioration in PRNU in the pixel 300 of the first embodiment will be considered with reference to FIGS. 21 and 22. In the first embodiment, as shown in FIG. 21, the potential of an FD 314 is lowered due to reset feedthrough of the FD reset transistor 313 at a timing T0 immediately before exposure is started. This fluctuation amount is assumed to be Vft.

In the first embodiment, the power supply voltage of the FD reset transistor 313 is VDD, and thus the potential of the FD 314 changes from VDD to VDD−Vft at the timing T0. Further, the potential of a previous-stage node 320 during exposure is VDD−Vft−Vsig.

Further, in the first embodiment, the FD reset transistor 313 transitions to an ON state during reading as shown in FIG. 22, and the FD 314 is fixed to the power supply voltage VDD. The potentials of the previous-stage node 320 and a subsequent-stage node 340 during reading are shifted as high as Vft due to the fluctuation amount Vft of the FD 314. However, the amount of voltage to be shifted varies for each pixel due to variations in the capacitance values of the capacitive elements 321 and 322 and a parasitic capacitance, causing a deterioration in PRNU.

A transition amount of the subsequent-stage node 340 when the previous-stage node 320 transitions by Vft is expressed by, for example, the following formula.

$$\{(Cs+\delta Cs)/(Cs+\delta Cs+Cp)\}*Vft \quad \text{Formula 4}$$

In the above formula, Cs denotes a capacitance value of the capacitive element 322 on a signal level side, and δCs denotes a variation in Cs. Cp denotes a capacitance value of the parasitic capacitance of the subsequent-stage node 340.

Formula 4 can be approximated to the following formula.

$$\{1-(\delta Cs/Cs)*(Cp/Cs)\}*Vft \quad \text{Formula 5}$$

From Formula 5, a variation in the subsequent-stage node 340 can be expressed by the following formula.

$$\{(\delta Cs/Cs)*(Cp/Cs)\}*Vft \quad \text{Formula 6}$$

When (δCs/Cs) is assumed to be $10^{-2}$, (Cp/Cs) is assumed to be $10^{-1}$, and Vft is assumed to be 400 millivolts (mV), PRNU is 400 μVrms from Formula 6, which is a relatively large value.

In particular, when kTC noise during sampling-and-holding of input conversion capacitance is reduced, it is necessary to increase a charge-voltage conversion efficiency of the FD 314. In order to increase the charge-voltage conversion efficiency, the capacitance of the FD 314 has to be reduced, but the smaller the capacitance of the FD 314, the larger the fluctuation amount Vft, which can be several hundred millivolts (mV). In this case, the influence of PRNU may become a negligible level by Formula 6.

Figure 23:
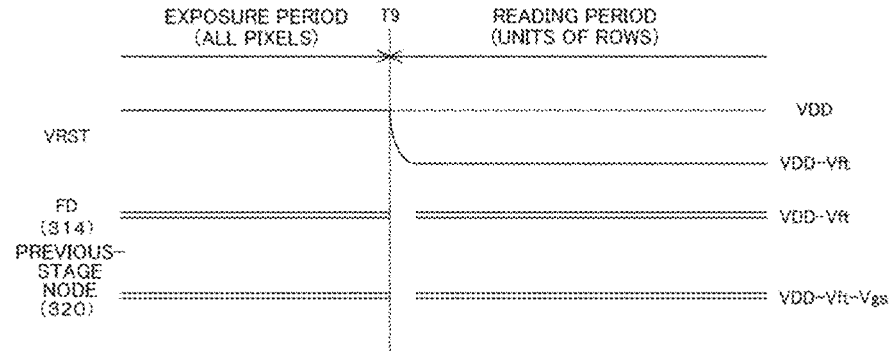
FIG. 23 is a timing chart showing an example of voltage control in the third embodiment of the present technology.

FIG. 23 is a timing chart showing an example of voltage control in the third embodiment of the present technology.

The timing control circuit 212 controls the reset power supply voltage VRST in a reading period in units of rows after a timing T9 to a value different from that in an exposure period.

For example, in the exposure period, the timing control circuit 212 sets the reset power supply voltage VRST to the same value as the power supply voltage VDD. On the other hand, in the reading period, the timing control circuit 212 lowers the reset power supply voltage VRST to VDD−Vft. That is, in the reading period, the timing control circuit 212 lowers the reset power supply voltage VRST by an amount that substantially matches the fluctuation amount Vft due to reset feedthrough. Through such control, the reset level of the FD 314 can be made uniform during exposure and reading.

By controlling the reset power supply voltage VRST, it is possible to reduce voltage fluctuation amounts of the FD 314 and the previous-stage node 320 as shown in the drawing. Thereby, it is possible to suppress variations in the capacitive elements 321 and 322 and a deterioration in PRNU caused by a parasitic capacitance.

The first to third modification examples of the first embodiment and the second embodiment can also be applied to the third embodiment.

In this manner, according to the third embodiment of the present technology, the timing control circuit 212 lowers the reset power supply voltage VRST by the fluctuation amount Vft due to reset feedthrough during reading, and thus a reset level can be made uniform during exposure and reading.

Thereby, it is possible to suppress a deterioration in sensitivity non-uniformity (PRNU).

4. Fourth Embodiment

In the first embodiment described above, the signal level is read after the reset level for each frame. However, in this configuration, there is a concern that sensitivity non-uniformity (PRNU) may deteriorate due to variations in the capacitive elements 321 and 322 and a parasitic capacitance. A solid-state imaging element 200 in a fourth embodiment is different from that in the first embodiment in that PRNU is improved by replacing a level held in the capacitive element 321 and a level held in the capacitive element 322 for each frame.

The solid-state imaging element 200 in the fourth embodiment continuously images a plurality of frames in synchronization with a vertical synchronization signal. Frames of odd numbers are referred to as "odd-numbered frames," and frames of even numbers are referred to as "even-numbered frames". The odd-numbered frame and the even-numbered frame are an example of a pair of frames described in the claims.

Figure 24:
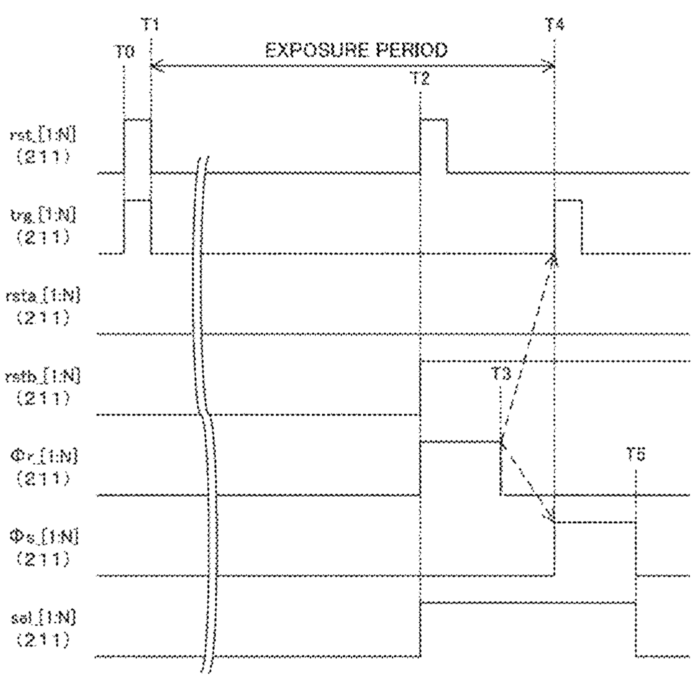
FIG. 24 is a timing chart showing an example of a global shutter operation for an odd frame in a fourth embodiment of the present technology.

FIG. 24 is a timing chart showing an example of a global shutter operation of an odd-numbered frame in the fourth embodiment. In an exposure period of the odd-numbered frame, a previous-stage circuit 310 in the solid-state imaging element 200 sets a selection signal Φs to a high level after a selection signal or to hold a reset level in the capacitive element 321 and then hold a signal level in the capacitive element 322.

Figure 25:
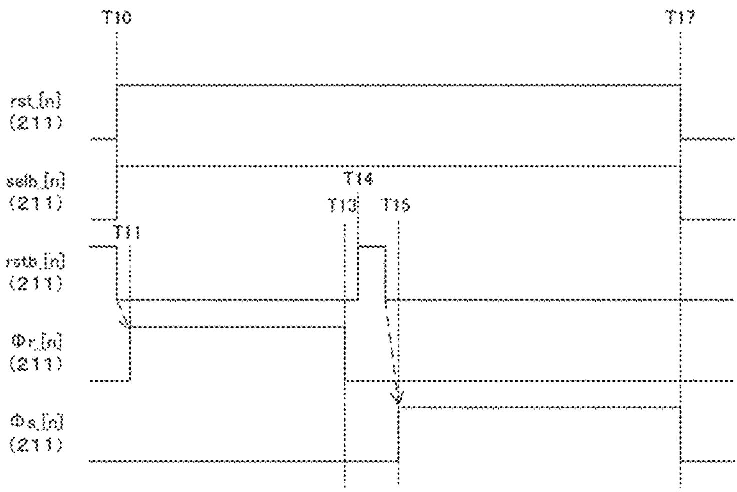
FIG. 25 is a timing chart showing an example of a reading operation for an odd frame in the fourth embodiment of the present technology.

FIG. 25 is a timing chart showing an example of a reading operation of an odd-numbered frame in the fourth embodiment of the present technology. In a reading period of the odd-numbered frame, a subsequent-stage circuit 350 in the solid-state imaging element 200 sets a selection signal Φs to a high level after a selection signal Φr and reads a signal level after a reset level.

Figure 26:
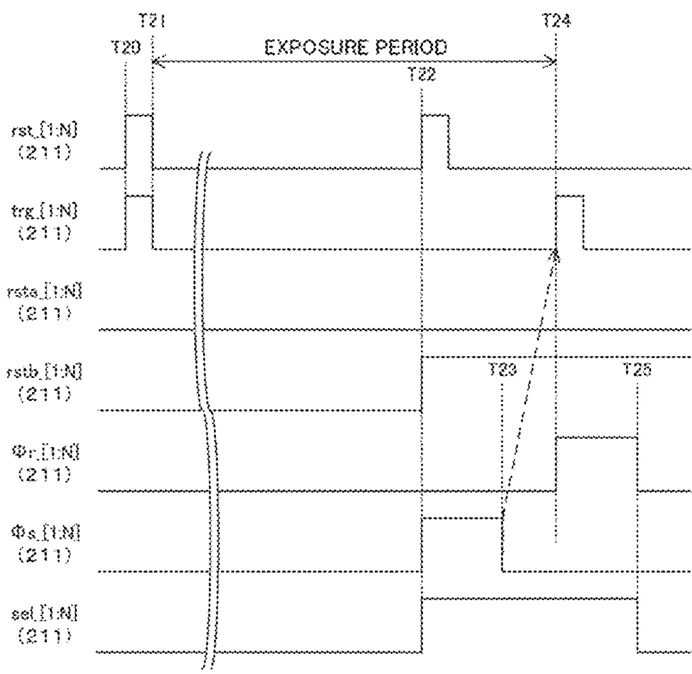
FIG. 26 is a timing chart showing an example of a global shutter operation for an even frame in the fourth embodiment of the present technology.

FIG. 26 is a timing chart showing an example of a global shutter operation of an even-numbered frame in the fourth embodiment. In an exposure period of the even-numbered frame, the previous-stage circuit 310 in the solid-state imaging element 200 sets a selection signal Φr to a high level after a selection signal Φs to hold a reset level in the capacitive element 322 and then hold a signal level in the capacitive element 321.

Figure 27:
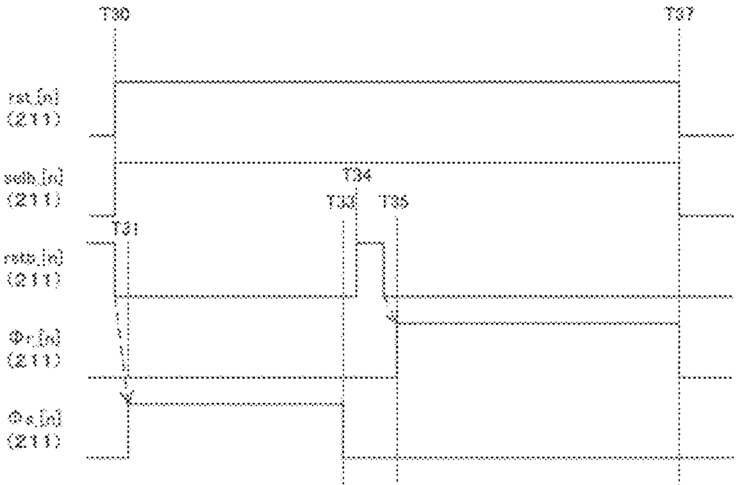
FIG. 27 is a timing chart showing an example of a reading operation for an even frame in the fourth embodiment of the present technology.

FIG. 27 is a timing chart showing an example of a reading operation of an even-numbered frame in the fourth embodiment of the present technology. In a reading period of the even-numbered frame, the subsequent-stage circuit 350 in the solid-state imaging element 200 sets a selection signal Φr to a high level after a selection signal Φs and reads a signal level after a reset level.

As shown in FIGS. 24 and 26, the levels respectively held in the capacitive elements 321 and 322 are opposite in the even-numbered frame and the odd-numbered frame. Thereby, the polarities of PRNU are also opposite in the even-numbered frame and the odd-numbered frame. A column signal processing circuit 260 at a subsequent stage calculates an average of addition of the odd and even-numbered frames. Thereby, it is possible to cancel out PRNUs with opposite polarities.

This control is effective in capturing moving images and adding frames together. Further, it is not necessary to add an element to the pixel 300, and the control can be realized only by changing a driving method.

The first to third modification examples of the first embodiment and the second and third embodiments can also be applied to the fourth embodiment.

In this manner, in the fourth embodiment of the present technology, a level held in the capacitive element 321 and a level held in the capacitive element 322 are opposite in an odd-numbered frame and an even-numbered frame. Thus, the polarities of PRNU can be opposite in the odd-numbered frame and the even-numbered frame. By adding these odd-numbered frame and even-numbered frame by the column signal processing circuit 260, a deterioration in PRNU can be suppressed.

5. Fifth Embodiment

In the first embodiment described above, the column signal processing circuit 260 obtains a difference between a reset level and a signal level for each column. However, in this configuration, when extremely high illuminance light is incident on a pixel, charges overflow from the photoelectric conversion element 311, resulting in a decrease in brightness and a concern of occurrence of a black spot phenomenon in which a black depressed portion is generated. A solid-state imaging element 200 in a fifth embodiment is different from that in the first embodiment in that it is determined for each pixel whether a black spot phenomenon has occurred.

Figure 28:
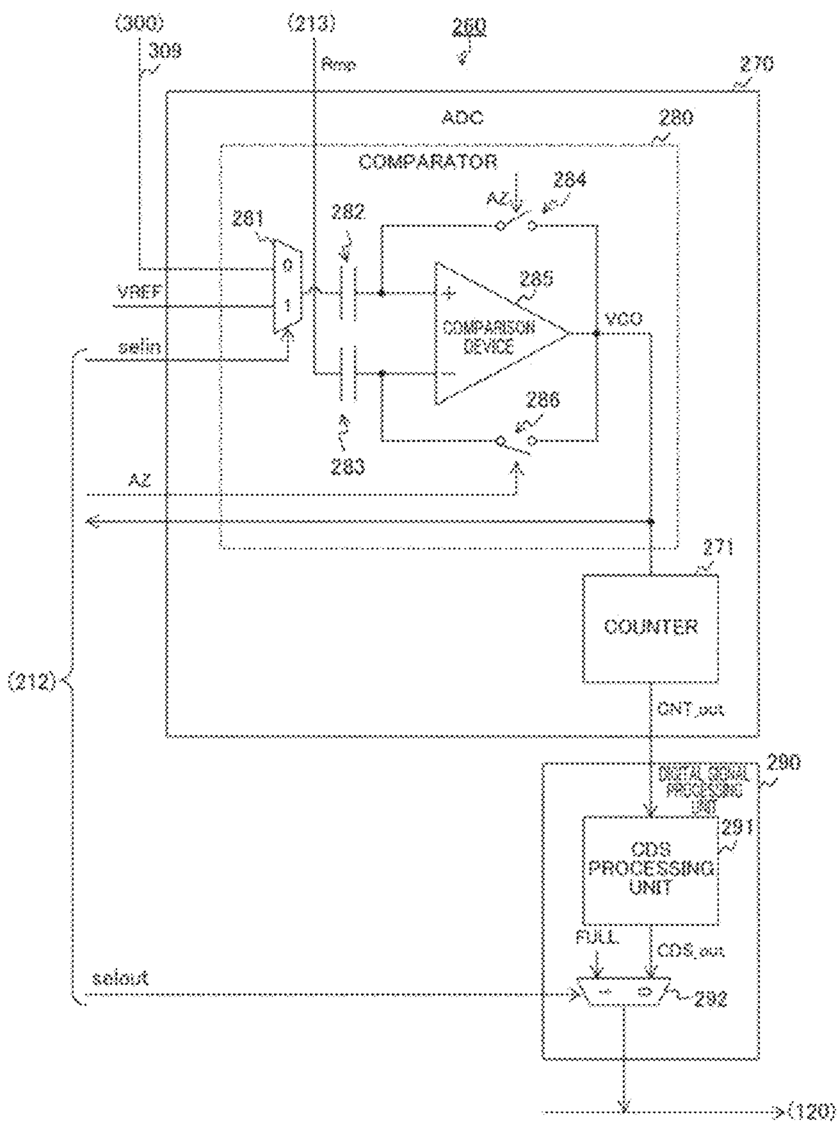
FIG. 28 is a circuit diagram showing a configuration example of a column signal processing circuit in a fifth embodiment of the present technology.

FIG. 28 is a circuit diagram showing a configuration example of a column signal processing circuit 260 in the fifth embodiment of the present technology. A plurality of ADCs 270 and a digital signal processing unit 290 are disposed in the column signal processing circuit 260 in the fifth embodiment. Further, in the digital signal processing unit 290, a plurality of CDS processing units 291 and a plurality of selectors 292 are disposed. The ADC 270, the CDS processing unit 291, and the selector 292 are provided for each column.

The ADC 270 also includes a comparator 280 and a counter 271. The comparator 280 compares the level of a vertical signal line 309 and a ramp signal Rmp received from a DAC 213, and outputs a comparison result VCO. The comparison result VCO is supplied to the counter 271 and a timing control circuit 212. The comparator 280 includes a selector 281, capacitive elements 282 and 283, auto-zero switches 284 and 286, and a comparison device 285.

The selector 281 connects either the vertical signal line 309 of the corresponding column or a node of a predetermined reference voltage VREF to a non-inversion input terminal (+) of the comparison device 285 via the capacitive element 282 in response to an input-side selection signal selin. The input-side selection signal selin is supplied from the timing control circuit 212. The selector 281 is an example of an input-side selector described in the claims.

The comparison device 285 compares the levels of the non-inversion input terminal (+) and an inversion input terminal (−) and outputs a comparison result VCO to the counter 271. A ramp signal Rmp is input to the inversion input terminal (−) via the capacitive element 283.

The auto-zero switch 284 short-circuits the non-inversion input terminal (+) of the comparison result VCO and an output terminal in response to an auto-zero signal Az received from the timing control circuit 212. The auto-zero switch 286 short-circuits the inversion input terminal (−) of the comparison result VCO and the output terminal in response to the auto-zero signal Az.

The counter 271 counts a count value until the comparison result VCO is inverted, and outputs a digital signal CNT_out indicating the count value to the CDS processing unit 291.

The CDS processing unit 291 performs CDS processing on the digital signal CNT_out. The CDS processing unit 291 calculates a difference between a digital signal CNT_out corresponding to a reset level and a digital signal CNT_out corresponding to a signal level, and outputs the difference to the selector 292 as CDS_out.

The selector 292 outputs either the digital signal CDS_out after the CDS processing or a full-code digital signal FULL as pixel data of the corresponding column in response to an output-side selection signal selout received from the timing control circuit 212. The selector 292 is an example of an output-side selector described in the claims.

Figure 29:
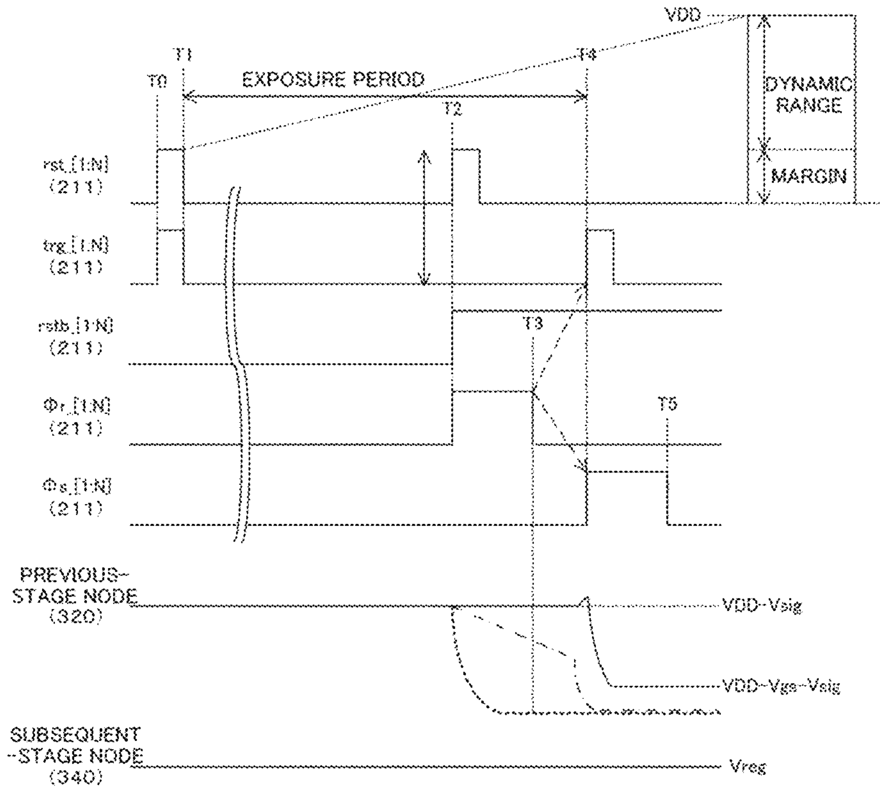
FIG. 29 is a timing chart showing an example of a global shutter operation in the fifth embodiment of the present technology.

FIG. 29 is a timing chart showing an example of a global shutter operation in the fifth embodiment of the present technology. A transistor control method at the time of the global shutter operation in the fifth embodiment is the same as that in the first embodiment.

Here, it is assumed that extremely high illuminance light is incident on a pixel 300. In this case, the photoelectric conversion element 311 is fully charged, charges overflow from the photoelectric conversion element 311 to the FD 314, and the potential of the FD 314 is lowered after FD reset is performed. An alternating dotted-dashed line in the drawing indicates a fluctuation in potential of the FD 314 when weak sunlight is incident such that the amount of overflowing charges becomes relatively small. A dotted line in the drawing indicates a fluctuation in potential of the FD 314 when strong sunlight is incident such that the amount of overflowing charges becomes relatively large.

When weak sunlight is incident, a reset level is lowered at a timing T3 when the FD reset is completed, but the level has not been completely lowered at this point in time.

On the other hand, when strong sunlight is incident, the reset level has been completely lowered at the timing T3. In this case, a signal level is the same as the reset level, and a potential difference therebetween is "0". Thus, a digital signal after CDS processing is the same as that in a dark state, results in a black depressed portion. In this manner, in spite of the incidence of extremely high illuminance light such as sunlight, a phenomenon in which a pixel becomes black is referred to as a black spot phenomenon or blooming.

Furthermore, when the level of the FD 314 of the pixel in which the black spot phenomenon has occurred is excessively lowered, an operating point of a previous-stage circuit 310 cannot be secured, and a current id1 of a current source transistor 316 fluctuates. The current source transistors 316 of respective pixels are connected to a common power supply or ground. Thus, when a current fluctuates in a certain pixel, a fluctuation in an IR drop of the pixel affects sample levels of the other pixels. A pixel in which a black spot phenomenon occurs becomes an aggressor, and a pixel whose sample level fluctuates due to the pixel becomes a victim. As a result, streaking noise is generated.

When a discharge transistor 317 is provided as in the second embodiment, overflowing charges are discarded to the discharge transistor 317 side in a pixel with a black spot (blooming), and thus a black spot phenomenon is less likely to occur. However, even when the discharge transistor 317 is provided, there is a possibility that some of the charges will flow to the FD 314, results in a possibility that the black spot phenomenon will not be completely eliminated. Furthermore, the addition of the discharge transistor 317 leads to a disadvantage in that a ratio of an effective area to the amount of charges for each pixel decreases. For this reason, it is desirable to suppress the black spot phenomenon without using the discharge transistor 317.

Two methods are conceivable as a method of suppressing a black spot phenomenon without using the discharge transistor 317. A first method is to adjust a clip level of the FD 314. A second method is to determine whether a black spot phenomenon occurs during reading and replace an output with a full code when a black spot phenomenon occurs.

Regarding the first method, a high level of an FD reset signal rst (in other words, a gate of an FD reset transistor 313) in the drawing is a power supply voltage VDD, and a low level corresponds to the clip level of the FD 314. In the first embodiment, a difference (that is, an amplitude) between the high level and the low level is set to a value corresponding to a dynamic range. On the other hand, in the fifth embodiment, the value is adjusted to a value obtained by further adding a margin to the value. Here, the value corresponding to the dynamic range corresponds to a difference between the power supply voltage VDD and the potential of the FD 314 when the digital signal becomes a full code.

By lowering a gate voltage in an OFF state of the FD reset transistor 313 (a low level of the FD reset signal rst), it is possible to prevent the FD 314 from excessively decreasing due to blooming and prevent an operating point of the previous-stage amplification transistor 315 from being crushed.

The dynamic range changes depending on an analog gain of the ADC. When the analog gain is low, a large dynamic range is required, and conversely, when the analog gain is high, a small dynamic range is required. For this reason, the gate voltage in the OFF state of the FD reset transistor 313 can be changed depending on an analog gain.

Figure 30:
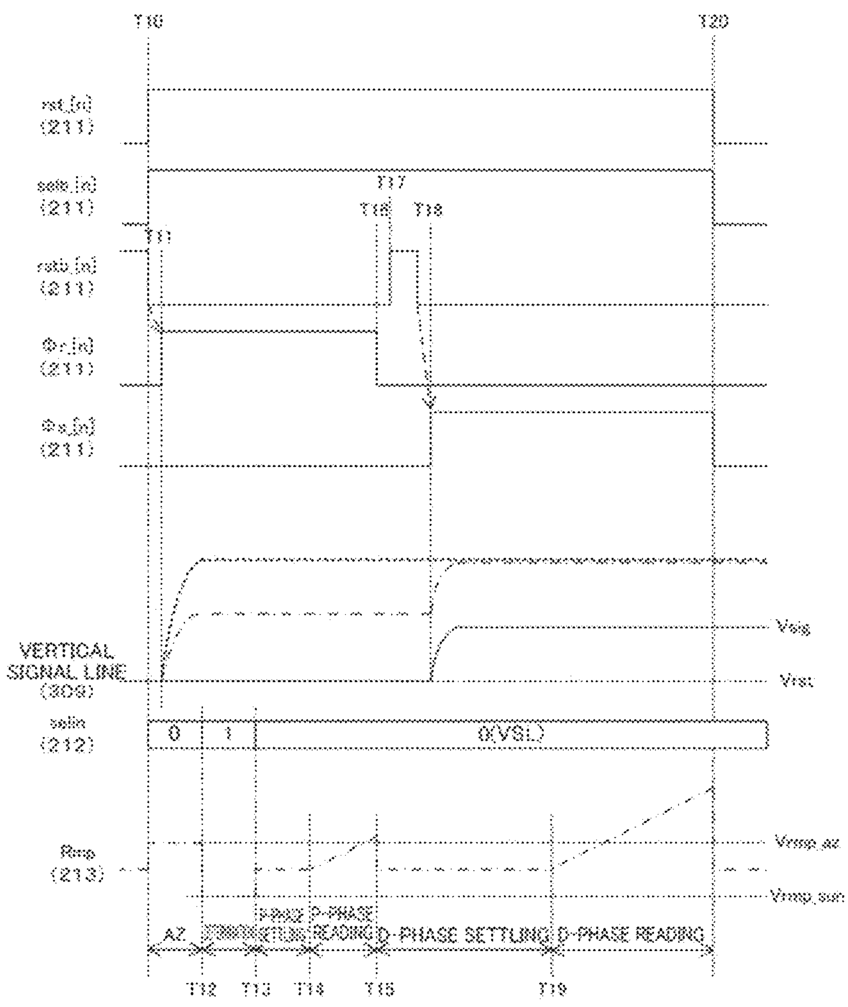
FIG. 30 is a timing chart showing an example of a reading operation in the fifth embodiment of the present technology.

FIG. 30 is a timing chart showing an example of a reading operation in the fifth embodiment of the present technology. When a selection signal Φr is set to a high level at a timing T11 immediately after a timing T10 when reading is started, the potential of the vertical signal line 309 fluctuates in a pixel on which sunlight is incident. An alternating dotted-dashed line in the drawing indicates a fluctuation in potential of the vertical signal line 309 when weak sunlight is incident. A dotted line in the drawing indicates a fluctuation in potential of the vertical signal line 309 when strong sunlight is incident.

In an auto-zero period from the timing T10 to a timing T12, the timing control circuit 212 supplies, for example, an input-side selection signal selin of "0", and connects the comparison device 285 to the vertical signal line 309. In the auto-zero period, the timing control circuit 212 performs auto-zero using the auto-zero signal Az.

Regarding the second method, the timing control circuit 212 supplies, for example, an input-side selection signal selin of "1" within a determination period from the timing T12 to a timing T13. Due to the input-side selection signal selin, the comparison device 285 is separated from the vertical signal line 309 and is connected to a node of a reference voltage VREF. The reference voltage VREF is set to an expected value of the level of the vertical signal line 309 when blooming does not occur. For example, when a gate-source voltage of the subsequent-stage amplification transistor 351 is assumed to be Vgs2, Vrst corresponds to Vreg−Vgs2. Furthermore, the DAC 213 lowers the level of the ramp signal Rmp from Vrmp_az to Vrmp_sun within the determination period.

Furthermore, when blooming does not occur within the determination period, the reset level Vrst of the vertical signal line 309 is substantially the same as the reference voltage VREF and is not much different from when the potential of the inversion input terminal (+) of the comparison device 285 is auto-zero. On the other hand, since the non-inversion input terminal (−) has dropped from Vrmp_az to Vrmp_sun, a comparison result VCO is set to a high level.

In contrast, when blooming occurs, the reset level Vrst becomes sufficiently higher than the reference voltage VREF, and a comparison result VCO is set to a low level when the following formula is established.

$$Vrst-VREF>Vrmp\_az-Vrmp\_sun \qquad \text{Formula 7}$$

In other words, the timing control circuit 212 can determine whether blooming has occurred based on whether the comparison result VCO is set to a low level within the determination period.

It is necessary to secure a certain degree of margin (the right side in Formula 7) for solar determination so that erroneous determinations do not occur due to variations in a threshold voltage of the subsequent-stage amplification transistor 351, in-plane IR drop differences of Vreg, and the like.

After the timing T13 after the determination period has elapsed, the timing control circuit 212 connects the comparison device 285 to the vertical signal line 309. Furthermore, when a P-phase settling period from the timing T13 to a timing T14 has elapsed, a P-phase is read within a period from the timing T14 to a timing T15. When a D-phase settling period from the timing T15 to a timing T19 has elapsed, a D-phase is read within a period from the timing T19 to a timing T20.

When it is determined that blooming has not occurred in the determination period, the timing control circuit 212 controls the selector 292 so that the selector 292 outputs, in response to an output-side selection signal selout, a digital signal CDS_out as it is after the CDS processing.

On the other hand, when it is determined that blooming has occurred in the determination period, the timing control circuit 212 controls the selector 292 so that the selector 292 outputs, in response to the output-side selection signal selout, a full code FULL instead of the digital signal CDS_out after the CDS processing. Thereby, a black spot phenomenon can be suppressed.

The first to third modification examples of the first embodiment and the second to fourth embodiments can also be applied to the fifth embodiment.

As described above, according to the fifth embodiment of the present technology, the timing control circuit 212 determines whether a black spot phenomenon has occurred based on the comparison result VCO, and outputs a full code when a black spot phenomenon occurs, thereby making it possible to suppress a black spot phenomenon.

6. Sixth Embodiment

In the first embodiment described above, the vertical scanning circuit 211 performs control of exposing all rows (all pixels) at the same time (that is, a global shutter operation). However, when simultaneous exposure is not required and low noise is required, such as during testing or analysis, it is desirable to perform a rolling shutter operation. A solid-state imaging element 200 in a sixth embodiment is different from that in the first embodiment in that a rolling shutter operation is performed during testing and the like.

Figure 31:
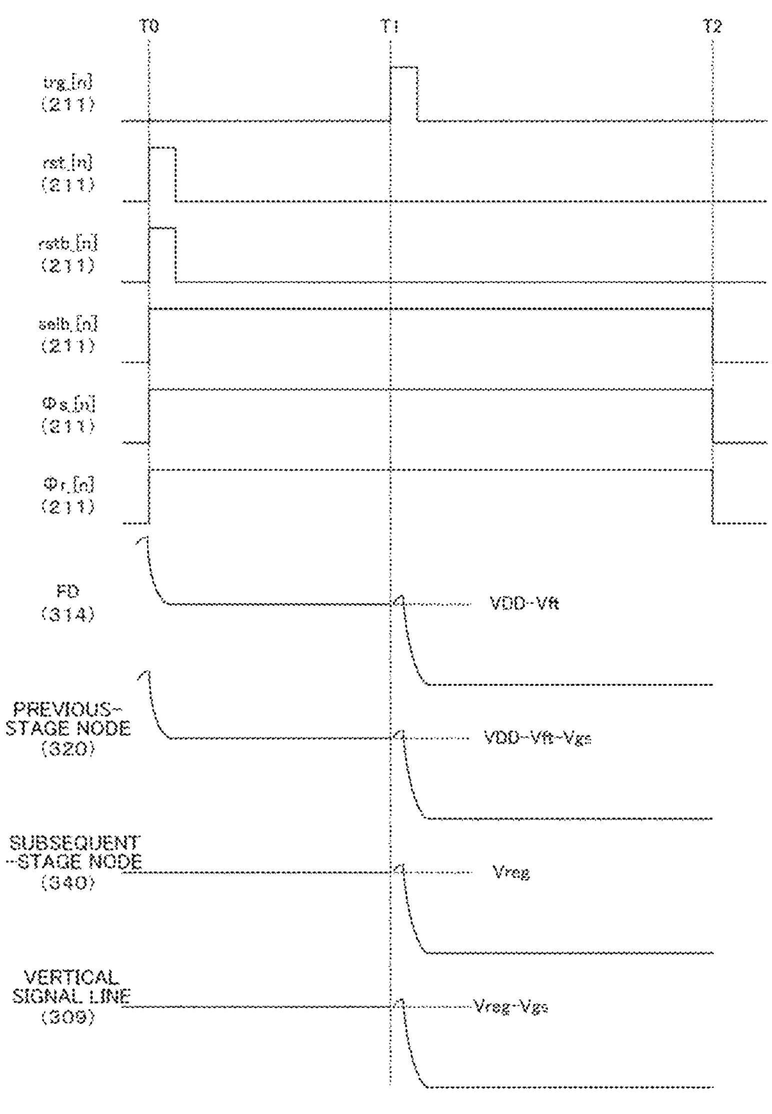
FIG. 31 is a timing chart showing an example of a rolling shutter operation in a sixth embodiment of the present technology.

FIG. 31 is a timing chart showing an example of a rolling shutter operation in the sixth embodiment of the present technology. A vertical scanning circuit 211 performs control of sequentially selecting a plurality of rows and starting exposure. The drawing shows exposure control for an n-th row.

During a period from a timing T0 to a timing T2, the vertical scanning circuit 211 supplies a high-level subsequent-stage selection signal selb, a selection signal Φr, and a selection signal Φs to the n-th row. Further, at the timing T0 when exposure is started, the vertical scanning circuit 211 supplies a high-level FD reset signal rst and a subsequent-stage reset signal rstb to the n-th row over a pulse period. At the timing T1 when the exposure ends, the vertical scanning circuit 211 supplies a transfer signal trg to the n-th row. Through the rolling shutter operation in the drawing, the solid-state imaging element 200 can generate image data with low noise.

During normal imaging, the solid-state imaging element 200 in the sixth embodiment performs a global shutter operation in the same manner as in the first embodiment.

Furthermore, the first to third modification examples of the first embodiment and the second to fifth embodiments can also be applied to the sixth embodiment.

In this manner, according to the sixth embodiment of the present technology, the vertical scanning circuit 211 performs control of sequentially selecting a plurality of rows and starting exposure (that is, a rolling shutter operation), and thus it is possible to generate image data with low noise.

7. Seventh Embodiment

In the first embodiment described above, the source of the source follower at the previous-stage (the previous-stage amplification transistor 315 and the current source transistor 316) is connected to the power supply voltage VDD, and the source follower performs reading in units of rows in an ON state. However, in this driving method, there is a concern that circuit noise of the source follower at the previous stage during reading in units of rows may propagate to the subsequent stage, increasing random noise. A solid-state imaging element 200 in a seventh embodiment is different from that in the first embodiment in that noise is reduced by setting a source follower at a previous stage to be in an OFF state during reading.

Figure 32:
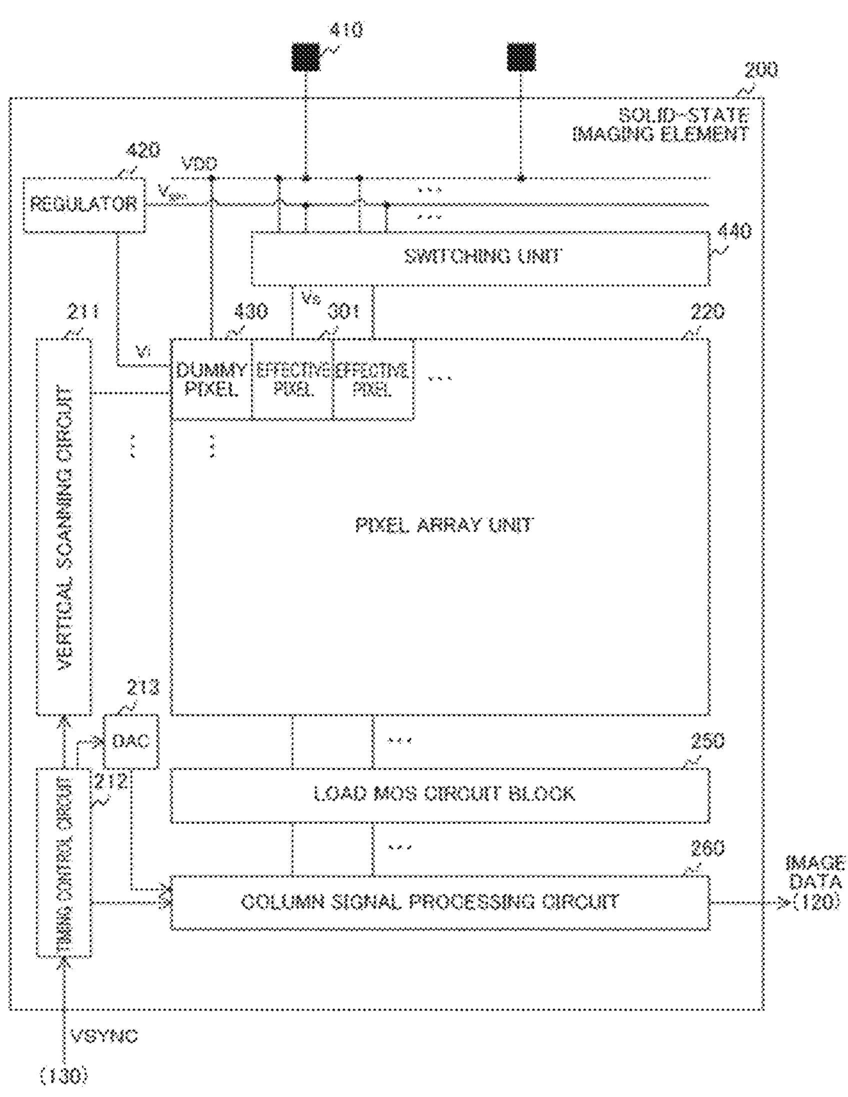
FIG. 32 is a block diagram showing a configuration example of a solid-state imaging element according to a seventh embodiment of the present technology.

FIG. 32 is a block diagram showing a configuration example of the solid-state imaging element 200 in the seventh embodiment of the present technology. The solid-state imaging element 200 in the seventh embodiment is different from that in the first embodiment in that a regulator 420 and a switching unit 440 are further provided. Further, in a pixel array unit 220 in the seventh embodiment, a plurality of effective pixels 301 and a predetermined number of dummy pixels 430 are arranged. The dummy pixels 430 are arranged in the vicinity of a region in which the effective pixels 301 are arranged.

Furthermore, a power supply voltage VDD is supplied to each of the dummy pixels 430, and the power supply voltage VDD and a source voltage Vs are supplied to each of the effective pixels 301. A signal line for supplying the power supply voltage VDD to the effective pixels 301 is omitted in the drawing. Further, the power supply voltage VDD is supplied from a pad 410 outside the solid-state imaging element 200.

The regulator 420 generates a constant generated voltage $V_{gen}$ based on an input potential Vi received from the dummy pixel 430 and supplies the generated voltage to the switching unit 440. The switching unit 440 selects either the power supply voltage VDD received from the pad 410 or the generated voltage $V_{gen}$ received from the regulator 420 and supplies the selected voltage to each of columns of the effective pixels 301 as a source voltage Vs.

FIG. 33 is a circuit diagram showing configuration examples of the dummy pixel 430, the regulator 420, and the switching unit 440 in the seventh embodiment of the present technology. "a" in the drawing is a circuit diagram of the dummy pixel 430 and the regulator 420, and "b" in the drawing is a circuit diagram of the switching unit 440.

As shown in "a" in the drawing, the dummy pixel 430 includes a reset transistor 431, an FD 432, an amplification transistor 433, and a current source transistor 434. The reset transistor 431 initializes the FD 432 in response to a reset signal RST received from a vertical scanning circuit 211. The FD 432 stores charges and generates a voltage according to the amount of charge. The amplification transistor 433 amplifies the level of a voltage of the FD 432 and supplies the amplified voltage to the regulator 420 as an input voltage Vi.

Further, sources of the reset transistor 431 and the amplification transistor 433 are connected to the power supply voltage VDD. The current source transistor 434 is connected to a drain of the amplification transistor 433. The current source transistor 434 supplies a current id1 under the control of the vertical scanning circuit 211.

The regulator 420 includes a low-pass filter 421, a buffer amplifier 422, and a capacitive element 423. The low-pass filter 421 passes components of a low frequency band less than a predetermined frequency in the signal of the input voltage Vi as an output voltage Vj.

The output voltage Vj is input to a non-inversion input terminal (+) of the buffer amplifier 422. An inversion input terminal (−) of the buffer amplifier 422 is connected to its output terminal. The capacitive element 423 holds the voltage of the output terminal of the buffer amplifier 422 as $V_{gen}$. The $V_{gen}$ is supplied to the switching unit 440.

As shown in "b" in the drawing, the switching unit 440 includes an inverter 441 and a plurality of switching circuits 442. The switching circuits 442 are disposed for each column of the effective pixels 301.

The inverter 441 inverts a switching signal SW received from a timing control circuit 212. The inverter 441 supplies an inverted signal to each of the switching circuits 442.

The switching circuit 442 selects either the power supply voltage VDD or the generated voltage $V_{gen}$ and supplies the selected voltage to the corresponding column in the pixel array unit 220 as a source voltage Vs. The switching circuit 442 includes switches 443 and 444. The switch 443 opens and closes a path between a node of the power supply voltage VDD and the corresponding column in response to the switching signal SW. The switch 444 opens and closes a path between a node of the generated voltage $V_{gen}$ and the corresponding column in response to an inverted signal of the switching signal SW.

Figure 34:
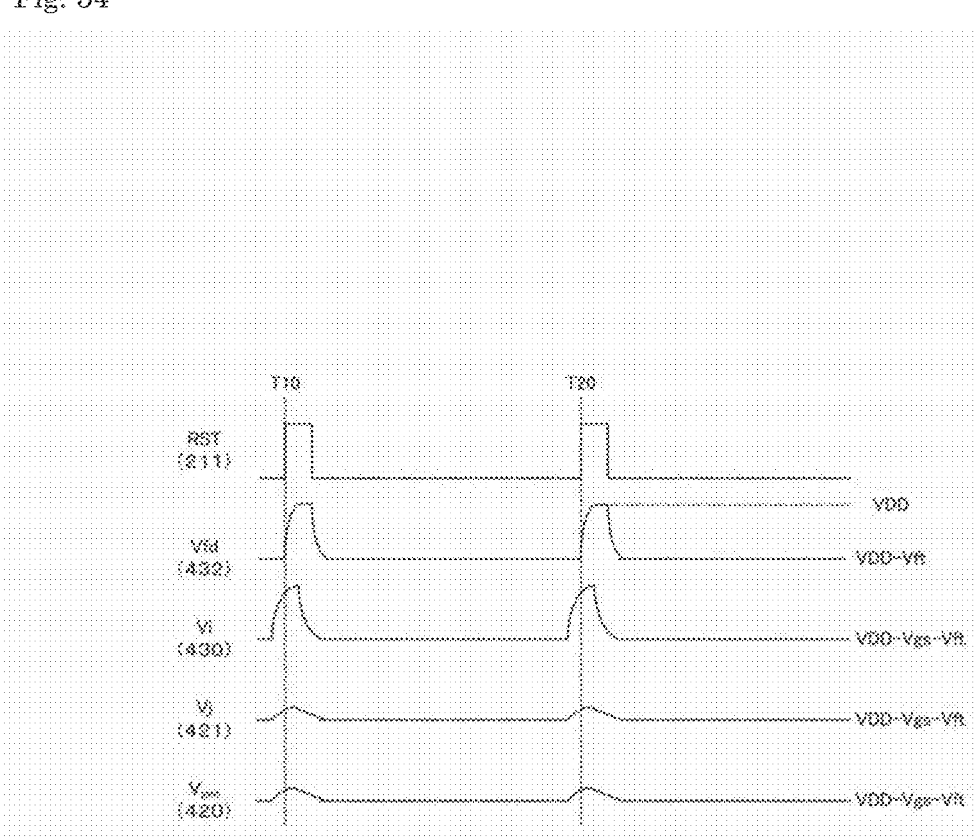
FIG. 34 is a timing chart showing an example of operations of a dummy pixel and a regulator in the seventh embodiment of the present technology.

FIG. 34 is a timing chart showing an example of operations of the dummy pixel 430 and the regulator 420 in the seventh embodiment of the present technology. At a timing T10 immediately before a certain row is read, the vertical scanning circuit 211 supplies a high-level (here, the power supply voltage VDD) reset signal RST to each of the dummy pixels 430. A potential Vfd of the FD 432 in the dummy pixel 430 is initialized to the power supply voltage VDD. Then, when the reset signal RST is set to a low level, the reset signal RST changes to VDD−Vft due to reset feed-through.

Furthermore, the input voltage Vi is lowered to VDD−Vgs−Vsig after reset. Vj and $V_{gen}$ are set to substantially constant voltages by passing through the low-pass filter 421.

After a timing T20 immediately before the next row is read, similar control is performed for each row, and a constant generated voltage $V_{gen}$ is supplied.

Figure 35:
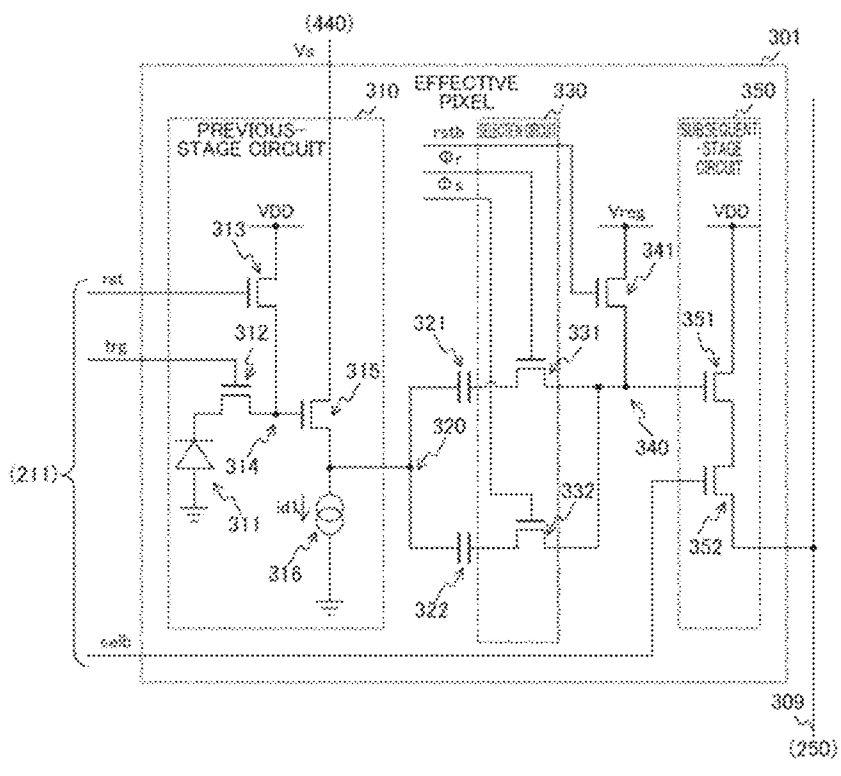
FIG. 35 is a circuit diagram showing a configuration example of an effective pixel in the seventh embodiment of the present technology.

FIG. 35 is a circuit diagram showing a configuration example of the effective pixel 301 in the seventh embodiment of the present technology. A circuit configuration of the effective pixel 301 is the same as that of the pixel 300 in the first embodiment, except that the source voltage Vs received from the switching unit 440 is supplied to a source of a previous-stage amplification transistor 315.

Figure 36:
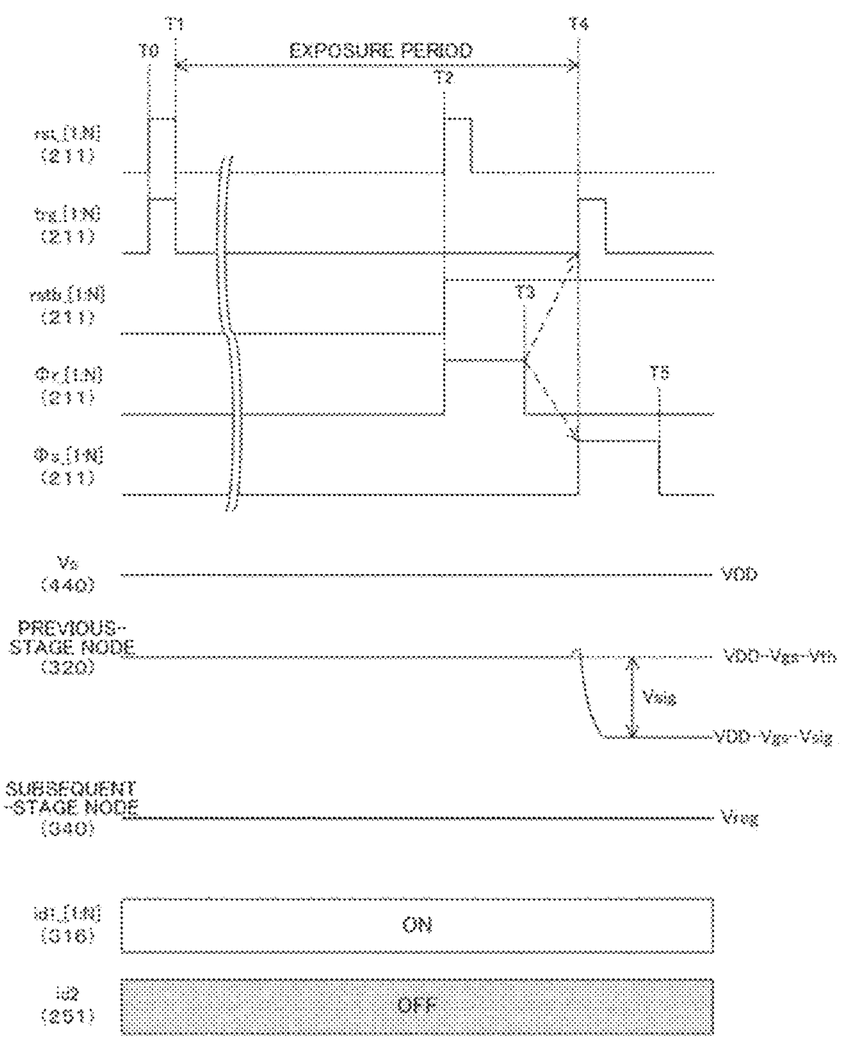
FIG. 36 is a timing chart showing an example of a global shutter operation in the seventh embodiment of the present technology.

FIG. 36 is a timing chart showing an example of a global shutter operation in the seventh embodiment of the present technology. In the seventh embodiment, when exposure is performed in all pixels at the same time, the switching unit 440 selects the power supply voltage VDD and supplies the selected power supply voltage VDD as a source voltage Vs. Furthermore, a voltage at a previous-stage node is lowered from VDD−Vgs−Vth to VDD−Vgs−Vsig at a timing T4. Here, Vth is a threshold voltage of a transfer transistor 312.

Figure 37:
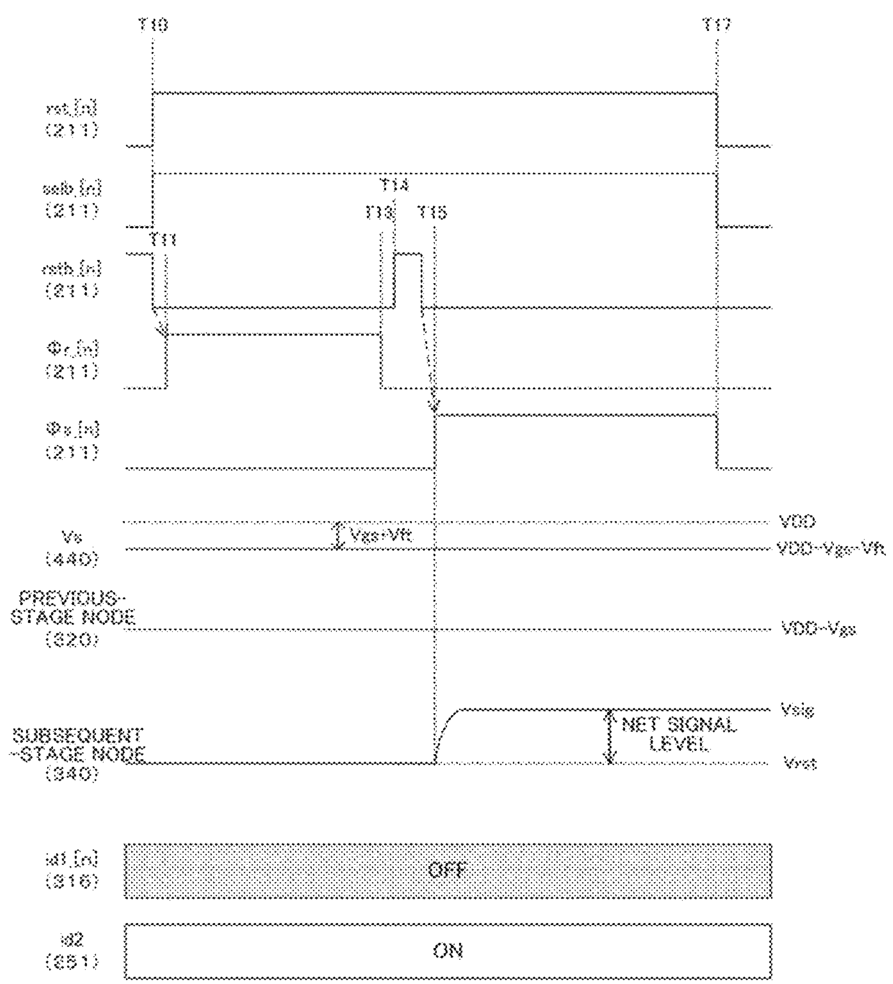
FIG. 37 is a timing chart showing an example of a reading operation in the seventh embodiment of the present technology.

FIG. 37 is a timing chart showing an example of a reading operation in the seventh embodiment of the present technology. In the seventh embodiment, during reading, the switching unit 440 selects the generated voltage $V_{gen}$ and supplies the selected voltage as a source voltage Vs. The generated voltage $V_{gen}$ is adjusted to VDD−Vgs−Vft. Further, in the seventh embodiment, the vertical scanning circuit 211 controls the current source transistors 316 of all rows (all pixels) so that the current source transistors 316 stop supplying the current id1.

FIG. 38 is a diagram showing effects in the seventh embodiment of the present technology. In the first embodiment, when reading is performed for each row, the source follower (the previous-stage amplification transistor 315 and the current source transistor 316) of the pixel 300 to be read is turned on. However, in this driving method, there is a concern that circuit noise of the source follower at the previous stage may propagate to the subsequent stage (the capacitive element, the source follower at the subsequent stage, and the ADC), increasing reading noise.

For example, in the first embodiment, kTC noise generated in a pixel during a global shutter operation is 450 (μVrms) as shown in the drawing. In addition, noise generated in the source follower (the previous-stage amplification transistor 315 and the current source transistor 316) at the previous stage during the reading for each row is 380 (μVrms). The noise generated after the source follower in the subsequent stage is 160 (μVrms). For this reason, the total noise is 610 (μVrms). In this manner, in the first embodiment, the contribution of noise of the source follower at the previous stage to the total noise value is relatively large.

In the seventh embodiment, in order to reduce the noise of the source follower at the previous stage, a voltage (Vs) that can be adjusted is supplied to the source of the source follower at the previous stage as described above. During the global shutter (exposure) operation, the switching unit 440 selects the power supply voltage VDD and supplies the selected voltage as a source voltage Vs. After the exposure ends, the switching unit 440 switches the source voltage Vs to VDD−Vgs−Vft. Further, the timing control circuit 212 turns on the current source transistor 316 at the previous stage during the global shutter (exposure) operation, and turns off the current source transistor 316 after the exposure ends.

Through the above-described control, as shown in FIGS. 36 and 37, the potentials of the previous-stage nodes are aligned during the global shutter operation and during the reading for each row, and PRNU can be improved. Further, the source follower at the previous stage is set to be in an OFF state during the reading for each row, and thus circuit noise of the source follower is not generated and is set to 0 (μVrms) as shown in FIG. 38. In the source follower at the previous stage, the previous-stage amplification transistor 315 is in an ON state.

In this manner, according to the seventh embodiment of the present technology, the source follower at the previous stage is set to be in an OFF state, and thus noise generated in the source follower can be reduced.

8. Eighth Embodiment

In the first embodiment described above, a conversion efficiency for converting charges into a voltage is kept constant. However, in this configuration, it is difficult to further improve image quality. A solid-state imaging element 200 in an eighth embodiment is different from that in the first embodiment in that a conversion efficiency is switched in two stages.

Figure 39:
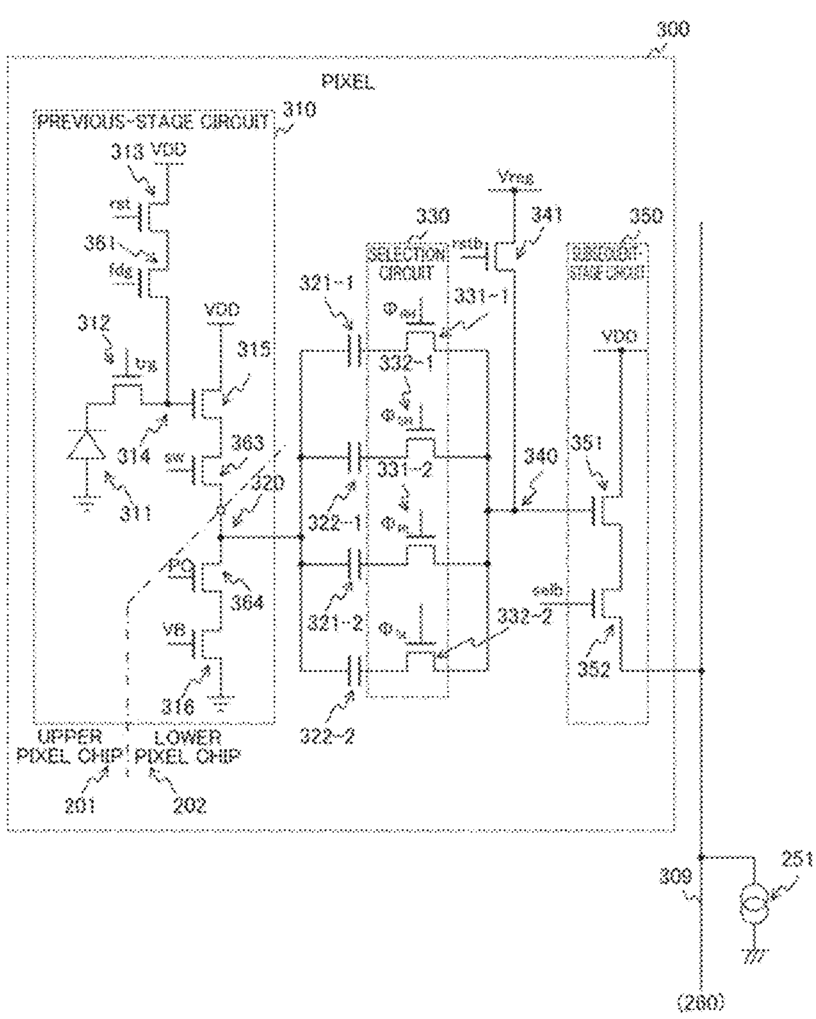
FIG. 39 is a circuit diagram showing a configuration example of a pixel in an eighth embodiment of the present technology.

FIG. 39 is a circuit diagram showing a configuration example of a pixel 300 in the eighth embodiment of the present technology. The pixel 300 in the eighth embodiment is different from that in the first embodiment in that a conversion efficiency control transistor 361 and the like are further disposed in a previous-stage circuit 310, and the numbers of capacitive elements and the number of selection transistors are increased.

In detail, a conversion efficiency control transistor 361, a switching transistor 363, and a precharge transistor 364 are further disposed in the previous-stage circuit 310. For example, nMOS transistors are used as the conversion efficiency control transistor 361, the switching transistor 363, and the precharge transistor 364. Further, instead of capacitive elements 321 and 322, capacitive elements 321-1, 322-1, 321-2, and 322-2 are disposed. As these capacitive elements, for example, elements having a metal insulator metal (MIM) structure are used. Furthermore, instead of selection transistors 331 and 332, selection transistors 331-1, 332-1, 331-2, and 332-2 are disposed.

A connection configuration for a photoelectric conversion element 311, a transfer transistor 312, an FD reset transistor 313, an FD 314, a previous-stage amplification transistor 315, and a current source transistor 316 is the same as in the first embodiment. However, in the eighth embodiment, the conversion efficiency control transistor 361 is inserted between the FD reset transistor 313 and the FD 314. Further, the switching transistor 363 and the precharge transistor 364 are inserted between the previous-stage amplification transistor 315 and the current source transistor 316.

The conversion efficiency control transistor 361 is turned on and turned off in response to a control signal fdg received from a vertical scanning circuit 211. The switching transistor 363 opens and closes a path between the previous-stage amplification transistor 315 and a previous-stage node 320 in response to a control signal sw received from the vertical scanning circuit 211. The precharge transistor 364 opens and closes a path between the previous-stage node 320 and the current source transistor 316 in response to a control signal PC received from the vertical scanning circuit 211.

One ends of the capacitive elements 321-1, 322-1, 321-2, and 322-2 are connected to the previous-stage node 320 in common. A selection circuit 330 connects the other end of any one of these capacitive elements to a subsequent-stage node 340.

The selection transistor 331-1 opens and closes a path between the capacitive element 321-1 and the subsequent-stage node 340 in response to a selection signal $\Phi_{RH}$ received from the vertical scanning circuit 211. The selection transistor 332-1 opens and closes a path between the capacitive element 321-1 and the subsequent-stage node 340 in response to a selection signal $\Phi_{SH}$ received from the vertical scanning circuit 211. The selection transistor 331-2 opens and closes a path between the capacitive element 321-2 and the subsequent-stage node 340 in response to a selection signal $\Phi_{RL}$ received from the vertical scanning circuit 211. The selection transistor 332-2 opens and closes a path between the capacitive element 322-2 and the subsequent-stage node 340 in response to a selection signal $\Phi_{SL}$ received from the vertical scanning circuit 211.

Furthermore, some of the elements in the pixel 300 are disposed in an upper pixel chip 201, and the remaining elements are disposed in a lower pixel chip 202. For example, the photoelectric conversion element 311, the transfer transistor 312, the FD reset transistor 313, the conversion efficiency control transistor 361, the FD 314, the previous-stage amplification transistor 315, and the switching transistor 363 are disposed in the upper pixel chip 201. The circuits after the precharge transistor 364 are disposed in the lower pixel chip 202. The solid-state imaging element 200 may not have a laminated structure, and each of the elements may be provided in a single semiconductor chip.

With the above-described circuit configuration, a conversion efficiency when the conversion efficiency control transistor 361 is in an OFF state is higher than when the conversion efficiency control transistor 361 is in an ON state. Hereinafter, a higher conversion efficiency will be referred to as a "high conversion gain (HCG)," and a lower conversion efficiency will be referred to as a "low conversion gain (LCG)." When exposure ends using a global shutter method, the previous-stage circuit 310 converts charges into a voltage by each of the HCG and the LCG, and sequentially outputs the voltages to the previous-stage node 320. Since a voltage of a reset level or a signal level is generated, four levels, that is, a reset level and a signal level generated by the HCG and a reset level and a signal level generated by the LCG, are sequentially output.

When the reset level corresponding to the HCG is output, only the selection transistor 331-1 in the selection circuit 330 transitions to an ON state, and the reset level is held in the capacitive element 321-1. When the signal level corresponding to the HCG is output, only the selection transistor 332-1 in the selection circuit 330 transitions to an ON state, and the signal level is held in the capacitive element 322-1. In this manner, the voltage corresponding to the HCG is held in the capacitive elements 321-1 and 322-1.

Further, when the reset level corresponding to the LCG is output, only the selection transistor 331-2 in the selection circuit 330 transitions to an ON state, and the reset level is held in the capacitive element 321-2. When the signal level corresponding to the LCG is output, only the selection transistor 332-2 in the selection circuit 330 transitions to an ON state, and the signal level is held in the capacitive element 322-2. In this manner, the voltage corresponding to the LCG is held in the capacitive elements 321-2 and 322-2.

Here, it is assumed that the respective capacitance values of the capacitive elements 321-1 and 322-1 corresponding to the HCG are the same. Further, it is assumed that the respective capacitance values of the capacitive elements 321-2 and 322-2 corresponding to the LCG are also the same. Further, it is assumed that the total capacitance value of the capacitive elements 321-1 and 322-1 corresponding to the HCG is larger than the total capacitance value of the capacitive elements 321-2 and 322-2 corresponding to the LCG. When the LCG is set, optical shot noise becomes dominant, and kTC noise generated during sampling-and-holding does not significantly contribute to image quality, as compared to when the HCG is set. On the other hand, when the HCG is set, an adverse effect of kTC noise becomes relatively large. Further, when a signal is sampled in the capacitive element, the larger the capacitance value thereof is, the more kTC noise during the sampling can be reduced. Thus, by relatively increasing the capacitance value of the capacitive element corresponding to the HCG that is more affected by kTC noise, it is possible to suppress kTC noise and improve image quality.

The subsequent-stage circuit 350 sequentially reads voltages (the reset level and the signal level) corresponding to the HCG and voltages corresponding to the LCG via the subsequent-stage node 340 after exposure ends.

A column signal processing circuit 260 at the subsequent stage performs CDS processing for obtaining a difference between the reset level corresponding to the HCG and the signal level corresponding to the HCG and generates a digital signal corresponding to the HCG. Further, the column signal processing circuit 260 performs CDS processing for obtaining a difference between the reset level corresponding to the LCG and the signal level corresponding to the LCG and generates a digital signal corresponding to the LCG.

Further, the column signal processing circuit 260 determines whether an illuminance is higher than a predetermined value in units of frames or in units of pixels. Then, the column signal processing circuit 260 outputs the digital signal corresponding to the LCG as a pixel signal of the pixel when the illuminance is high, and outputs the digital signal corresponding to the HCG as a pixel signal when the illuminance is low.

When a conversion efficiency is switched in accordance with an illuminance in units of frames, it is possible to suppress the insufficiency of a saturation charge amount and sensitivity. Thereby, image quality can be improved. Furthermore, when a conversion efficiency is switched in accordance with an illuminance in units of pixels, a dynamic range can be expanded. Furthermore, since it is not necessary to image two frames with different conversion efficiencies for each frame, it is possible to suppress a decrease in frame rate. Thereby, when the conversion efficiency is switched in units of pixels, it is possible to improve image quality while suppressing a decrease in frame rate.

Further, the vertical scanning circuit 211 sets only the switching transistor 363 out of the switching transistor 363 and the precharge transistor 364 to be in an ON state in an exposure period in response to the control signals sw and PC. Next, the vertical scanning circuit 211 sets only the precharge transistor 364 to be in an ON state in the exposure period in response to the control signals sw and PC. During reading, both the switching transistor 363 and the precharge transistor 364 are controlled to be in an OFF state. With this control, the influence of noise generated in the current source transistor 316 can be suppressed.

Although the switching transistor 363 and the precharge transistor 364 are disposed, a configuration in which these transistors are not disposed can also be adopted.

Figure 40:
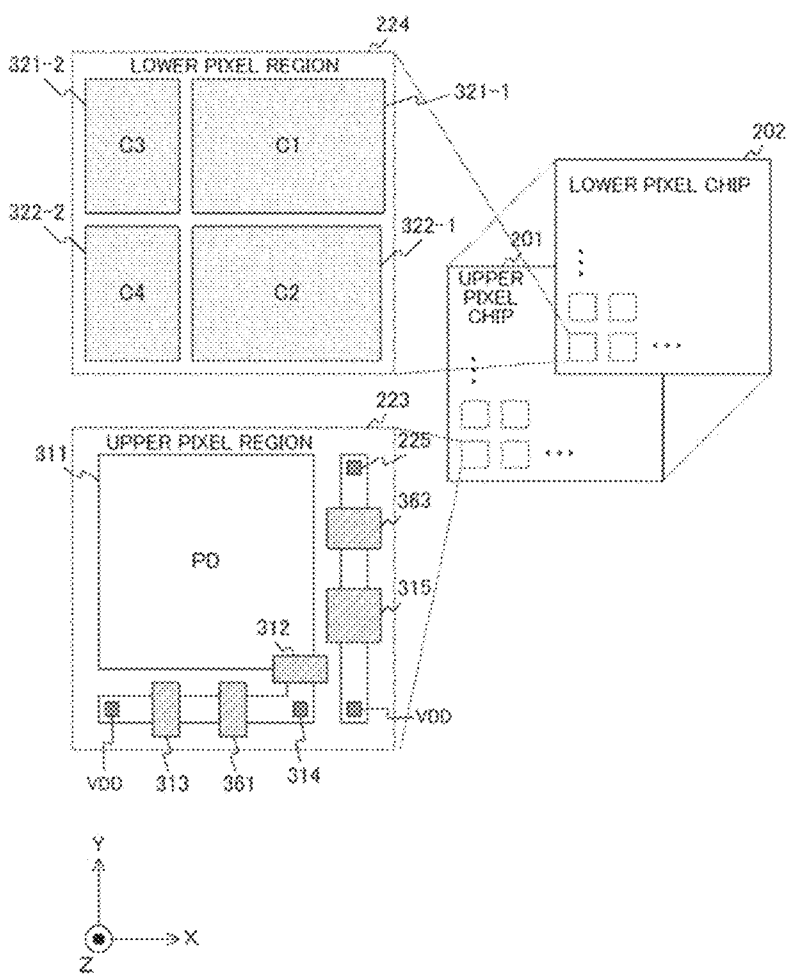
FIG. 40 is a plan view showing an example of a layout of an element in the eighth embodiment of the present technology.

FIG. 40 is a plan view showing an example of a layout of an element in the eighth embodiment of the present technology. As described above, for each pixel, some of elements within the pixel are disposed in the upper pixel chip 201, and the remaining elements are disposed in the lower pixel chip 202. For each pixel, a region where the elements on the upper side are disposed is assumed to be an upper pixel region 223, and a region where the elements on the lower side are disposed is assumed to be a lower pixel region 224.

In the upper pixel region 223, the photoelectric conversion element 311 and various transistors such as the transfer transistor 312 are disposed. Further, the switching transistor 363 is connected to the lower pixel region 224 via an output terminal 225.

In the lower pixel region 224, the capacitive elements 321-1 and 322-1 corresponding to the HCG and the capacitive elements 321-2 and 322-2 corresponding to the LCG are disposed. The capacitance densities of these capacitive elements are the same, and the areas of the capacitive elements 321-1 and 322-1 corresponding to the HCG are larger than those of the capacitive elements 321-2 and 322-2 corresponding to the LCG. Thereby, the capacitance values of the capacitive elements 321-1 and 322-1 corresponding to the HCG can be increased.

Furthermore, a predetermined axis parallel to the chip plane of the upper pixel chip 201 and the lower pixel chip 202 is assumed to be an "X axis", and an axis perpendicular to the chip plane is assumed to be a "Z axis". An axis perpendicular to the X-axis and the Z-axis is assumed to be a "Y-axis."

In FIGS. 39 and 40, the conversion efficiency is switched in two stages, but the conversion efficiency can also be switched in three stages.

Figure 41:
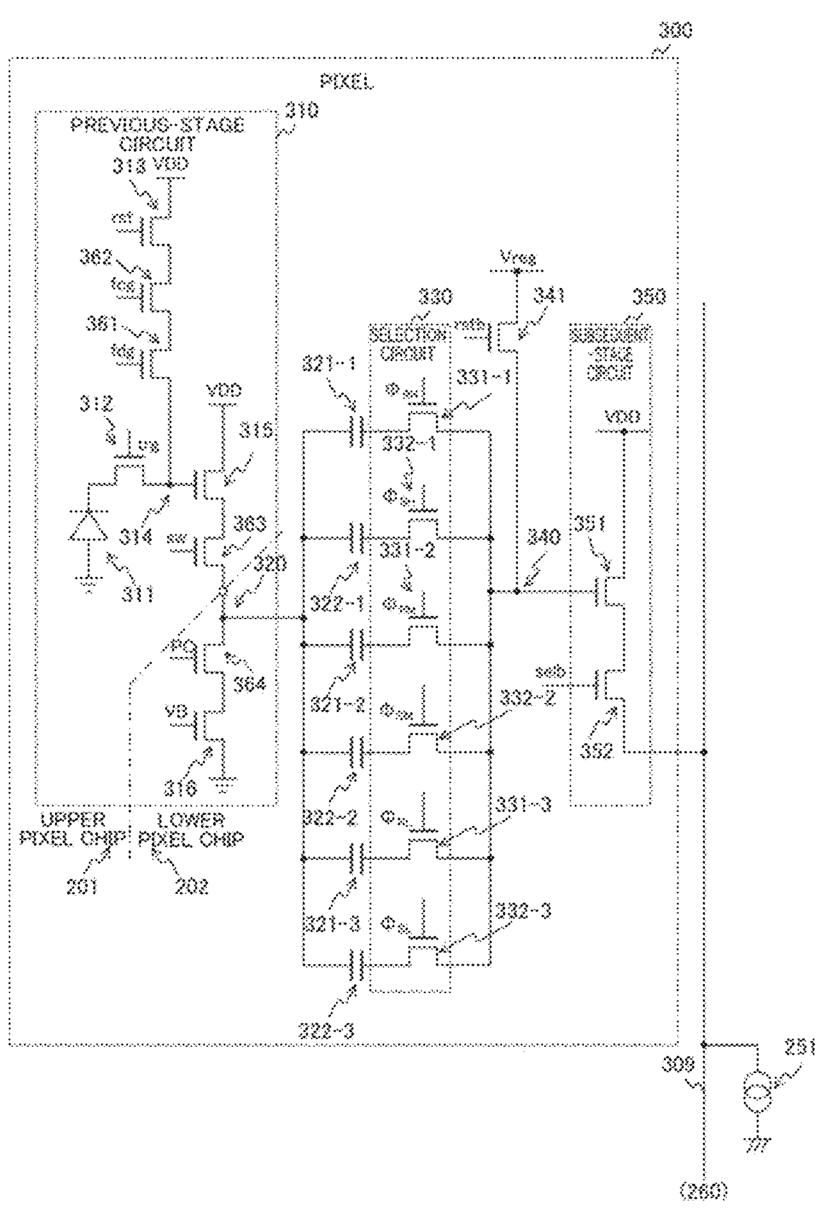
FIG. 41 is a circuit diagram showing a configuration example of a pixel when a conversion efficiency is switched in three stages in the eighth embodiment of the present technology.

FIG. 41 is a circuit diagram showing a configuration example of a pixel when a conversion efficiency is switched in three stages in the eighth embodiment of the present technology. In this case, a conversion efficiency control transistor 362, capacitive elements 321-3 and 322-3, and selection transistors 331-3 and 332-3 are added. For example, an nMOS transistor is used as the conversion efficiency control transistor 362.

The conversion efficiency control transistor 362 is inserted between the FD reset transistor 313 and the conversion efficiency control transistor 361, and is turned on and off in response to a control signal fcg received from the vertical scanning circuit 211.

One ends of the capacitive elements 321-3 and 322-3 are connected to the previous-stage node 320 in common. The selection transistor 331-3 opens and closes a path between the capacitive element 321-3 and the subsequent-stage node 340 in response to the selection signal $\Phi_{RL}$ received from the vertical scanning circuit 211. The selection transistor 332-3 opens and closes a path between the capacitive element 322-3 and the subsequent-stage node 340 in response to the selection signal $\Phi_{SL}$ received from the vertical scanning circuit 211. Further, the selection transistors 331-2 and 332-2 are opened and closed in response to selection signals $\Phi_{RM}$ and $\Phi_{SM}$.

When only the conversion efficiency control transistor 361 out of the conversion efficiency control transistors 361 and 362 is in an ON state, the conversion efficiency is lower than when both the conversion efficiency control transistors 361 and 362 are in an OFF state. Furthermore, when both the conversion efficiency control transistors 361 and 362 are in an ON state, the conversion efficiency is lower than when only the conversion efficiency control transistor 361 is in an ON state. In this manner, the conversion efficiency is controlled in three stages. Among the three stages, the highest conversion efficiency is referred to as an HCG, and the lowest conversion efficiency is referred to as an LCG. Further, the conversion efficiency between the HCG and the LCG is referred to as a "middle conversion gain (MCG)." By switching the conversion efficiency in three stages, it is possible to control the conversion efficiency to a more appropriate level than when the conversion efficiency is switched in two stages.

It is assumed that the capacitance values of the capacitive elements 321-1 and 322-1 corresponding to the HCG are larger than those of the capacitive elements corresponding to the MCG and the LCG. Further, it is assumed that the capacitance values of the capacitive elements 321-2 and 322-2 corresponding to the MCG are the same as those of the capacitive elements 321-3 and 322-3 corresponding to the LCG. The capacitive elements 321-1 and 322-1 are examples of high capacitive elements described in the claims. The capacitive elements 321-2, 322-2, 321-3, and 322-3 are examples of low capacitive elements described in the claims.

Although the conversion efficiency is set to three stages, it can also be set to four or more stages. When the conversion efficiency is set to four or more stages, a conversion efficiency control transistor, a capacitive element, or a selection transistor may be added depending on the number of stages.

Figure 42:
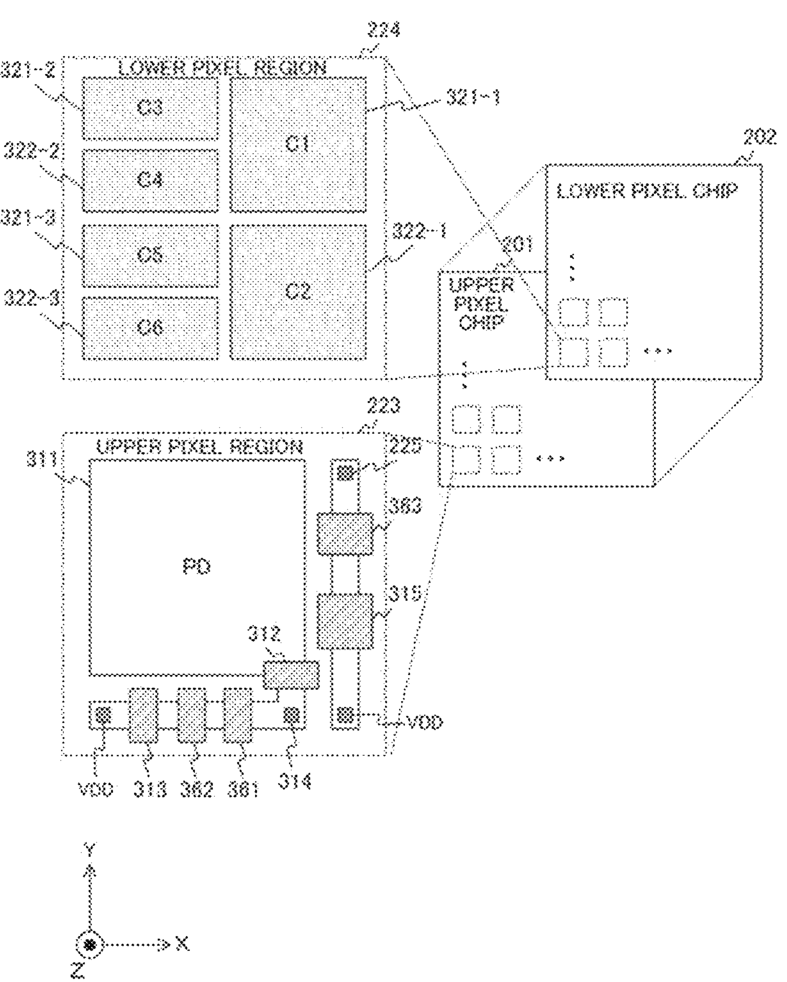
FIG. 42 is a plan view showing an example of a layout of an element when a conversion efficiency is switched in three stages in the eighth embodiment of the present technology.

FIG. 42 is a plan view showing an example of a layout of an element when a conversion efficiency is switched in three stages in the eighth embodiment of the present technology. The conversion efficiency control transistor 362 is further disposed in the upper pixel region 223, and the capacitive elements 321-3 and 322-3 are further disposed in the lower pixel region 224.

It is also assumed that the areas of the capacitive elements 321-1 and 322-1 corresponding to the HCG are larger than those of the capacitive elements corresponding to the MCG and the LCG.

Each of the second to seventh embodiments can be applied to the eighth embodiment.

In this manner, according to the eighth embodiment of the present technology, the conversion efficiency is switched in two stages, and thus it is possible to switch the conversion efficiency in accordance with an illuminance and improve image quality. Furthermore, since the capacitance values of the capacitive elements 321-1 and 322-1 corresponding to the HCG are set to be larger than those of the capacitive elements corresponding to the MCG and the LCG, it is possible to reduce kTC noise and improve image quality.

9. Ninth Embodiment

In the eighth embodiment described above, the areas of the capacitive elements 321-1 and 322-1 corresponding to the HCG are relatively large, but it is preferable to make the areas of the capacitive elements the same. A solid-state imaging element 200 in a ninth embodiment is different from that in the eighth embodiment in that capacitance densities of capacitive elements 321-1 and 322-1 corresponding to an HCG are relatively increased.

Figure 43:
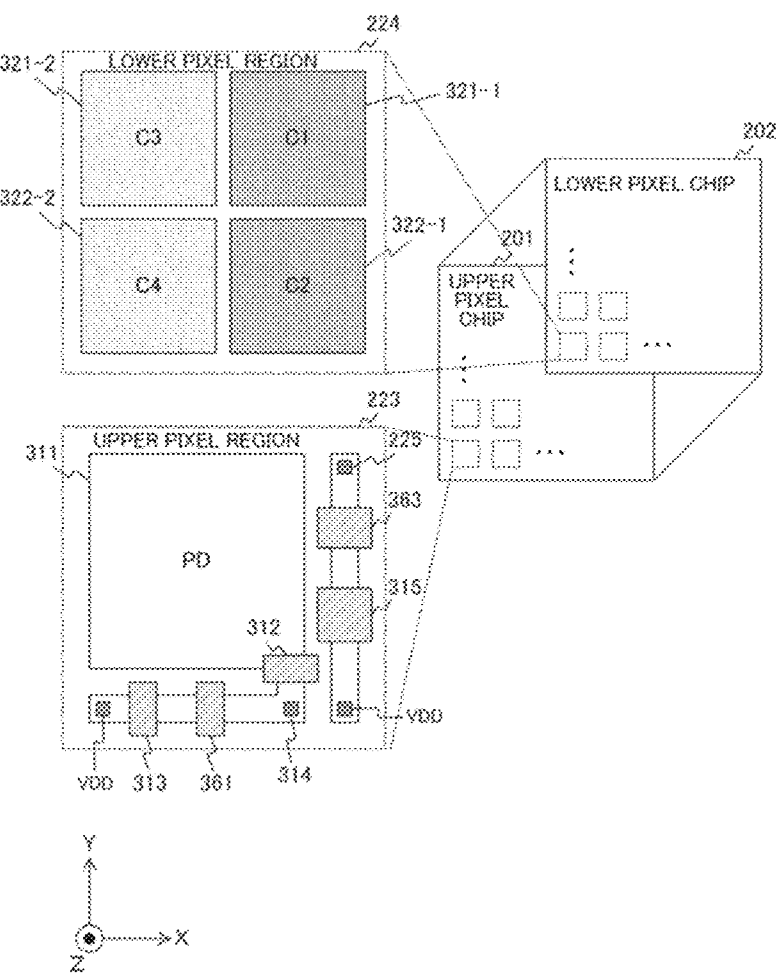
FIG. 43 is a plan view showing an example of a layout of an element in a ninth embodiment of the present technology.

FIG. 43 is a plan view showing an example of a layout of an element in the ninth embodiment of the present technology. In the ninth embodiment, the capacitance densities of the capacitive elements 321-1 and 322-1 corresponding to the HCG are higher than those of capacitive elements 321-2 and 322-2 corresponding to an LCG. Further, it is assumed that the areas of the respective capacitive elements 321-1, 322-1, 321-2, and 322-2 are substantially the same.

By making the capacitance densities of the capacitive elements 321-1 and 322-1 corresponding to the HCG relatively high, it is possible to make the areas of the capacitive elements uniform while making capacitance values of the capacitive elements 321-1 and 322-1 relatively large.

Although the conversion efficiency is set to two stages in the ninth embodiment, it can also be set to three or more stages.

In this manner, according to the ninth embodiment of the present technology, the capacitance densities of the capacitive elements 321-1 and 322-1 corresponding to the HCG are set to be high, and thus the areas of the respective capacitive elements can be made even.

Modification Example

In the ninth embodiment described above, the areas of the capacitive elements are made uniform by increasing the capacitance densities of the capacitive elements 321-1 and 322-1 corresponding to the HCG. However, in this configuration, it is necessary to provide two types of elements with different capacitance densities. A solid-state imaging element 200 in a modification example of the ninth embodiment is different from that in the ninth embodiment in that an element in which a plurality of capacitive elements are connected in parallel is used as a capacitive element corresponding to an HCG.

Figure 44:
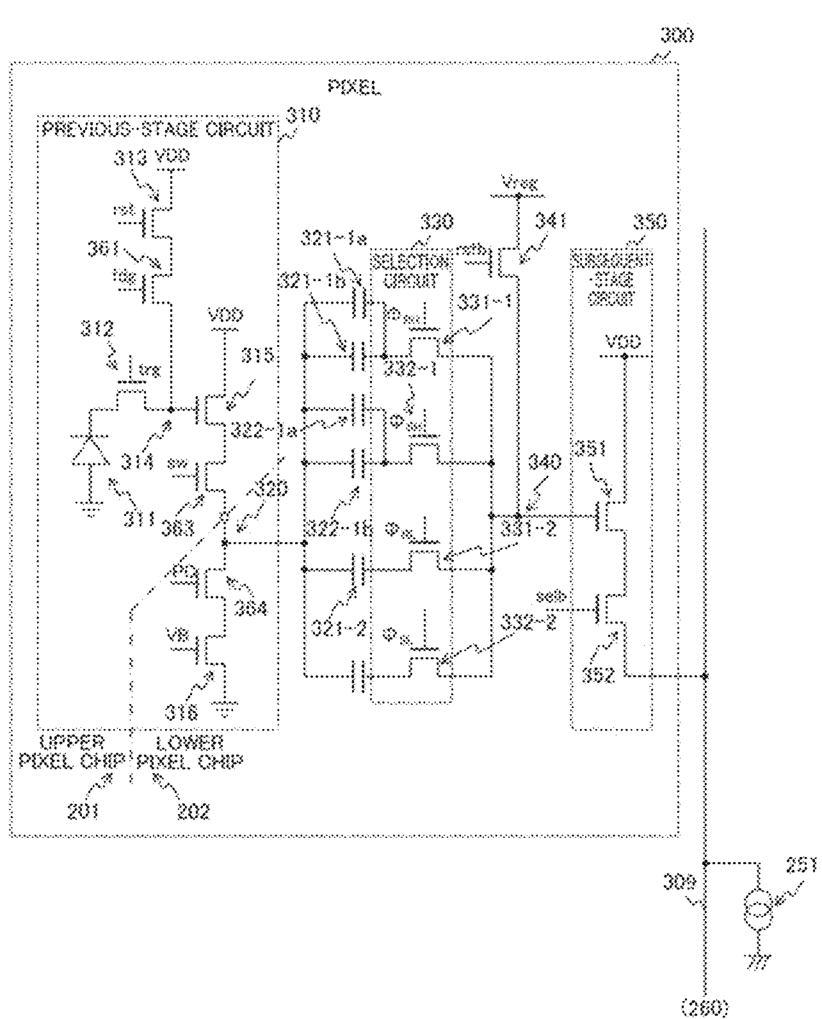
FIG. 44 is a circuit diagram showing a configuration example of a pixel in a modification example of the ninth embodiment of the present technology.

FIG. 44 is a circuit diagram showing a configuration example of a pixel 300 in the modification example of the ninth embodiment of the present technology. In the modification example of the ninth embodiment, capacitive elements **321-1*a*, 321-1*b*, 322-1*a*, and 322-1*b*** are disposed as capacitive elements corresponding to an HCG. The capacitance values of these capacitive elements are substantially the same as those of the capacitive elements corresponding to an LCG.

The capacitive elements 321-1*a* and 321-1*b* are connected in parallel between a previous-stage node 320 and a selection transistor 331-1. These capacitive elements can be treated as elements equivalent to the capacitive element 321-1 in FIG. 39. The capacitive elements 322-1*a* and 322-1*b* are connected in parallel between the previous-stage node 320 and a selection transistor 332-1. These capacitive elements can be treated as elements equivalent to the capacitive element 322-1 in FIG. 39. Although two capacitive elements are connected in parallel, three or more capacitive elements can also be connected in parallel.

Figure 45:
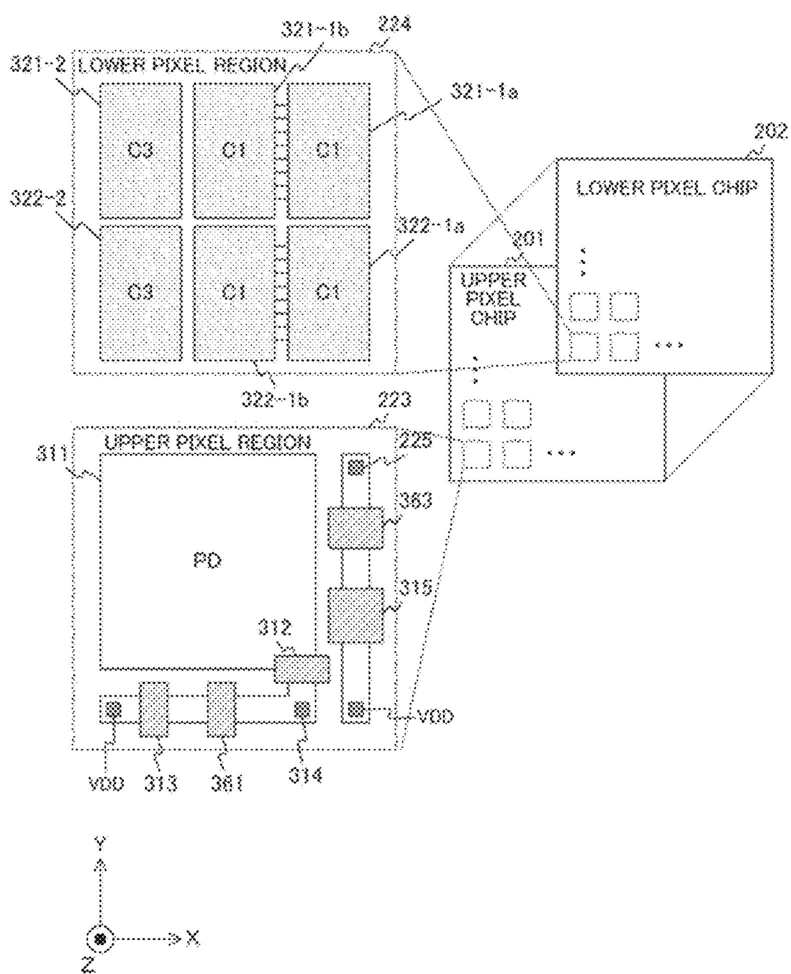
FIG. 45 is a plan view showing an example of a layout of an element in a modification example of the ninth embodiment of the present technology.

FIG. 45 is a plan view showing an example of a layout of an element in the modification example of the ninth embodiment of the present technology. As shown in the drawing, the capacitive elements 321-1*a*, 321-1*b*, 322-1*a*, and 322-1*b* are disposed as capacitive elements corresponding to an HCG. The areas and capacitance densities of these capacitive elements are substantially the same as those of the capacitive elements corresponding to an LCG.

The capacitive elements 321-1*a* and 321-1*b* are connected in parallel and are equivalent to the capacitive element 321-1 in terms of circuitry. The capacitive elements 322-1*a* and 322-1*b* are connected in parallel and are equivalent to the capacitive element 322-1 in terms of circuitry. The capacitive elements 321-1*a*, 321-1*b*, 322-1*a*, and 322-1*b* are examples of unit capacitive elements described in the claims.

By using the capacitive elements 321-1*a* and 321-1*b* connected in parallel as the capacitive element 321-1 corresponding to the HCG, the areas and capacitance densities of the respective capacitive elements can be made even. Since this configuration can be designed using only a single MIM capacitor, it is also effective for motivation to suppress development costs.

Although the conversion efficiency is set to two stages in the modification example of the ninth embodiment, it can also be set to three or more stages.

In this manner, according to the modification example of the ninth embodiment of the present technology, a plurality of capacitive elements connected in parallel are used as the capacitive elements 321-1 and 322-1 corresponding to the HCG, and thus the capacitance densities and areas of the respective capacitive elements can be made even.

10. Tenth Embodiment

In the eighth embodiment described above, in a laminated structure, the capacitive elements 321-1 and 322-1 corresponding to the HCG and the capacitive elements 321-2 and 322-2 corresponding to the LCG are disposed in a lower chip. In this configuration, it is preferable to disposed the element so that a wiring distance to the capacitive element corresponding to the HCG is relatively long. A solid-state imaging element 200 in a tenth embodiment is different from that in the eighth embodiment in that a layout of capacitive elements is optimized.

Figure 46:
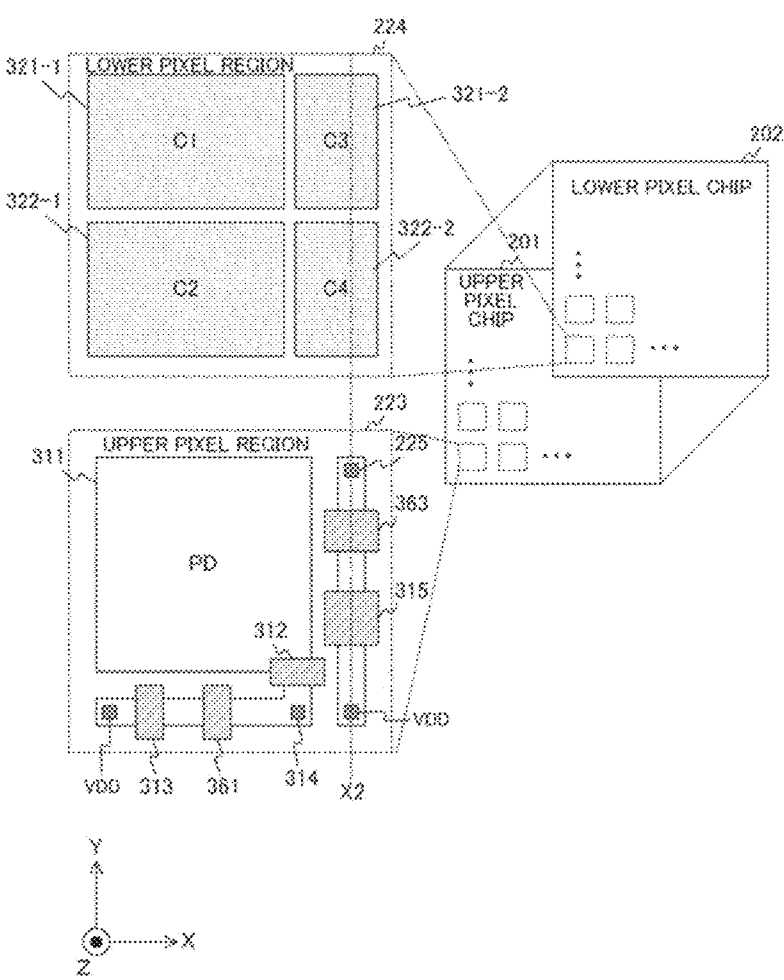
FIG. 46 is a plan view showing an example of a layout of an element in a tenth embodiment of the present technology.

FIG. 46 is a plan view showing an example of a layout of an element in the tenth embodiment of the present technology. A capacitive element 321-1 corresponding to an HCG and a capacitive element 321-2 corresponding to an LCG are arranged in the X-axis direction. In the arrangement direction (that is, the X-axis direction), the position of an output terminal 225 of an upper pixel region 223 is assumed to be X2. It is assumed that a distance from the position X2 of the output terminal 225 to a connection terminal (not shown) of the capacitive element 321-1 on the X-axis is longer than a distance to a connection terminal (not shown) of the capacitive element 321-2. Further, it is also assumed that a distance from the position X2 to a connection terminal (not shown) of a capacitive element 322-1 is longer than a distance to a connection terminal (not shown) of a capacitive element 322-2.

Figure 47:
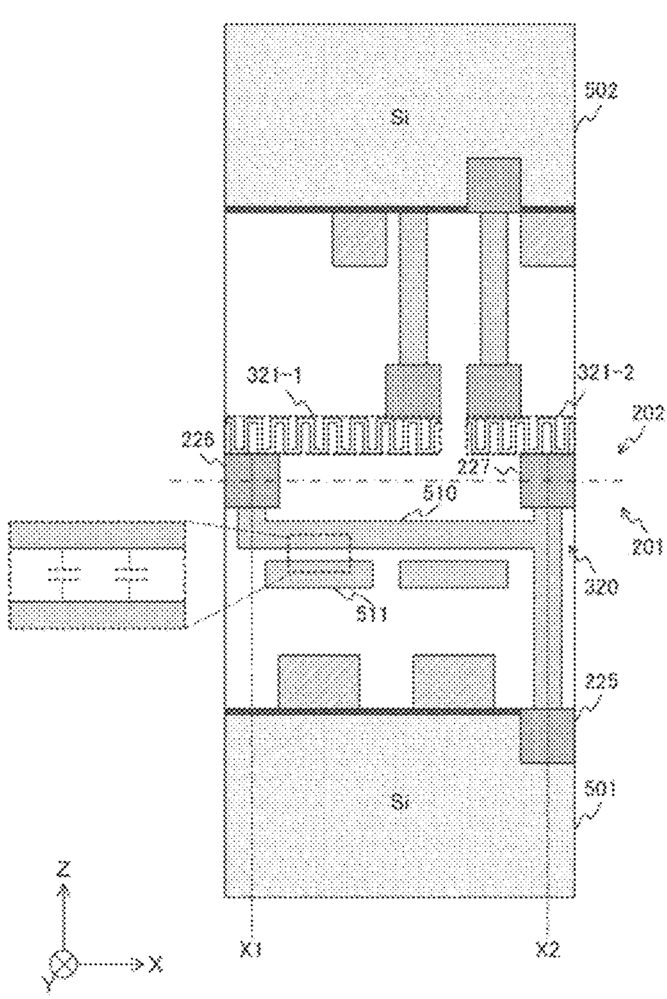
FIG. 47 is an example of a cross-sectional view of a solid-state imaging element in the tenth embodiment of the present technology.

FIG. 47 is an example of a cross-sectional view of the solid-state imaging element 200 in the tenth embodiment of the present technology. The drawing shows a cross-sectional view seen from the Y-axis direction. An upper pixel chip 201 includes a substrate 501. Elements (not shown) from a photoelectric conversion element 311 to a switching transistor 363 in a previous-stage circuit 310 are formed on the substrate 501. An output terminal 225 of the previous-stage circuit 310 is connected to connection terminals 226 and 227 via a wiring 510.

Further, a lower pixel chip 202 includes a substrate 502 and a plurality of capacitive elements such as the capacitive elements 321-1 and 321-2. One end of the capacitive element 321-1 is connected to the connection terminal 226, and one end of the capacitive element 321-2 is connected to the connection terminal 227. It is assumed that a distance from the position X2 of the output terminal 225 to a position X1 of the connection terminal 226 of the capacitive element 321-1 corresponding to the HCG on the X-axis is longer than a distance to the position X2 of the connection terminal 227 of the capacitive element 321-2 corresponding to the LCG.

By making the distance to the capacitive element 321-1 corresponding to the HCG relatively long, a wiring distance to the capacitive element 321-1 can be made relatively long. The longer the wiring distance, the greater a parasitic capacitance between wirings. For example, a parasitic capacitance indicated by a dotted line is generated between the wiring 510 and a nearby wiring 511. This parasitic capacitance makes it possible to increase a capacitance value on the HCG side and further suppress kTC noise.

Although the conversion efficiency is set to two stages in the tenth embodiment, it can also be set to three or more stages. Furthermore, the ninth embodiment and the modification example thereof can be applied to the tenth embodiment.

In this manner, according to the tenth embodiment of the present technology, a distance from the output terminal 225 to the capacitive element 321-1 corresponding to the HCG is made relatively long, and thus a capacitance value on the HCG side can be increased by the parasitic capacitance between the wirings.

11. Eleventh Embodiment

In the tenth embodiment described above, elements are disposed on the single substrate 501 in the upper pixel chip 201. However, in this configuration, it is difficult to increase the areas of the photoelectric conversion element 311 and the transistor. A solid-state imaging element 200 in an eleventh embodiment is different from that in the tenth embodiment in that an upper pixel chip 201 has a laminated structure.

Figure 48:
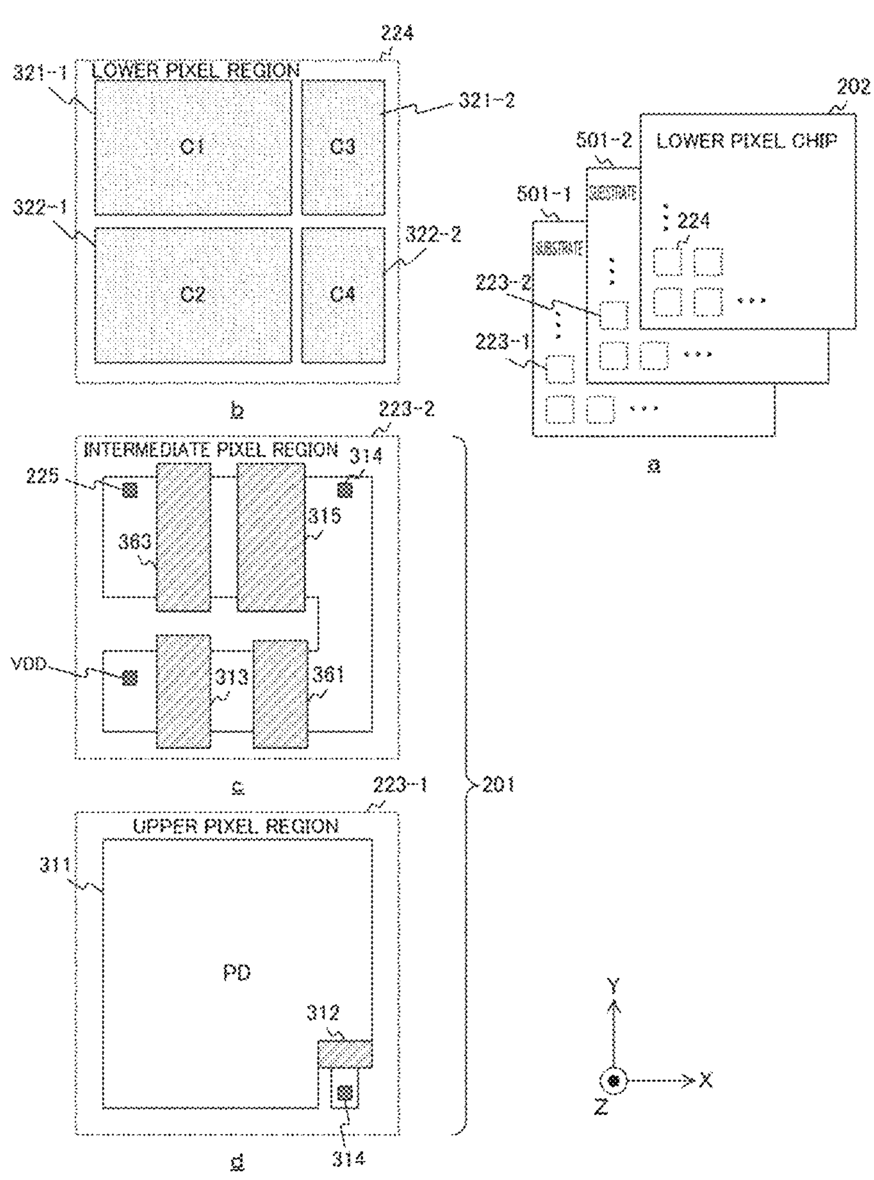
FIG. 48 is a plan view showing an example of a layout of an element in an eleventh embodiment of the present technology.

FIG. 48 is a plan view showing an example of a layout of an element in the eleventh embodiment of the present technology. The solid-state imaging element 200 in the eleventh embodiment is different from that in the tenth embodiment in that the upper pixel chip 201 includes laminated substrates 501-1 and 501-2. For each pixel, elements within a pixel are disposed to be distributed to the substrate 501-1 on the uppermost side, the substrate 501-2 on the intermediate side, and a lower pixel chip 202. For each pixel, a region where an element on the uppermost side is disposed is assumed to be an upper pixel region 223-1, and a region where an element on the intermediate side is disposed is assumed to be an intermediate pixel region 223-2.

A photoelectric conversion element 311, a transfer transistor 312, and an FD 314 are disposed in the upper pixel region 223-1. An FD reset transistor 313, a conversion efficiency control transistor 361, a previous-stage amplification transistor 315, and a switching transistor 363 are disposed in the intermediate pixel region 223-2.

Figure 49:
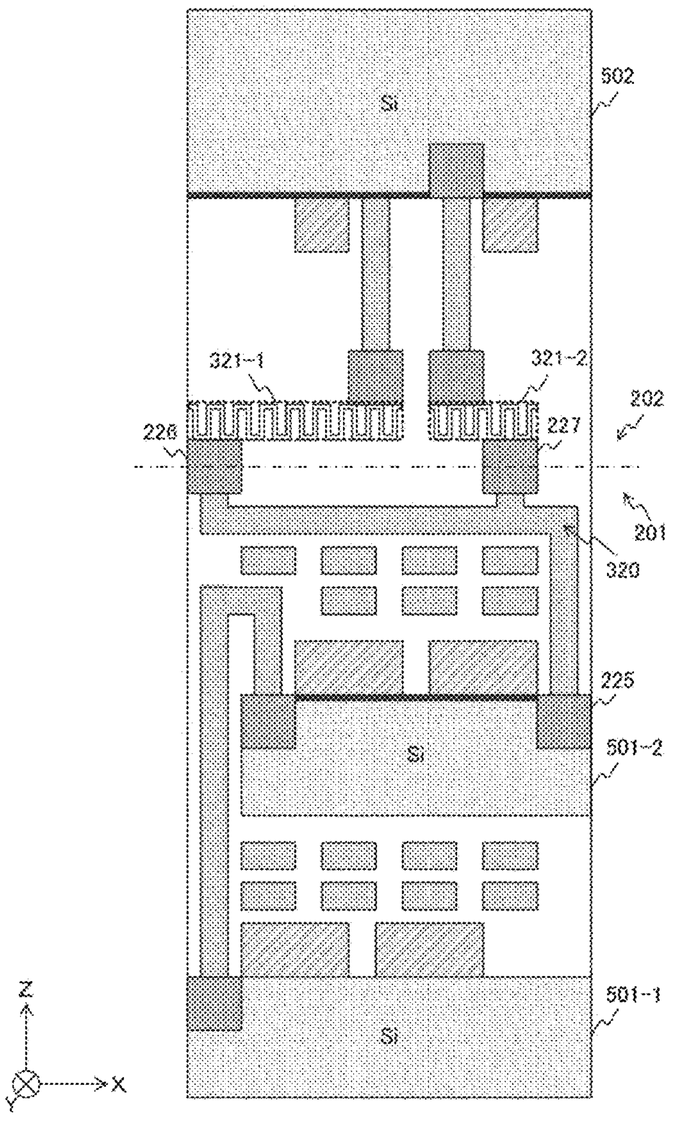
FIG. 49 is an example of a cross-sectional view of a solid-state imaging element in the eleventh embodiment of the present technology.

FIG. 49 is an example of a cross-sectional view of the solid-state imaging element 200 in the tenth embodiment of the present technology. As shown in the drawing, the substrates 501-1 and 501-2 are laminated in the upper pixel chip 201. The photoelectric conversion element 311 (not shown) and the transistors are disposed to be distributed to these substrates. Thereby, the areas of the photoelectric conversion element 311 and the transistors can be made larger than when the upper pixel chip 201 does not have a laminated structure.

Although the conversion efficiency is set to two stages in the eleventh embodiment, it can also be set to three or more stages. Furthermore, the ninth embodiment and the modification example thereof can be applied to the eleventh embodiment.

In this manner, according to the eleventh embodiment of the present technology, the upper pixel chip 201 is configured as a laminated structure, and thus the areas of the photoelectric conversion element 311 and the transistors can be increased.

12. Twelfth Embodiment

Although the capacitance value of the capacitive element that samples a signal is set to different values on the HCG side and the LCG side in VD.GS in the eighth embodiment described above, a plurality of additional capacitors with different capacitance values can be provided in a configuration other than VD.GS. A solid-state imaging element 200 in a twelfth embodiment is different from that in the eighth embodiment in that a plurality of additional capacitors with different capacitance values are provided.

Figure 50:
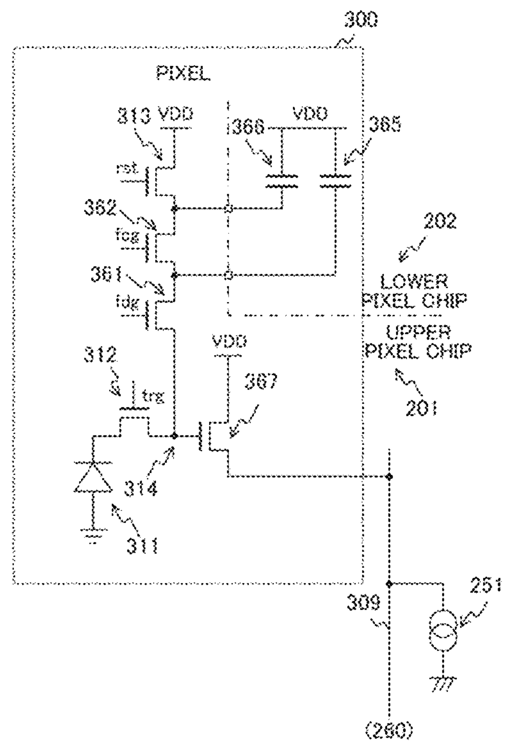
FIG. 50 is a circuit diagram showing a configuration example of a pixel in a twelfth embodiment of the present technology.

FIG. 50 is a circuit diagram showing a configuration example of a pixel 300 in the twelfth embodiment of the present technology. The pixel 300 in the twelfth embodiment includes a photoelectric conversion element 311, a transfer transistor 312, an FD reset transistor 313, conversion efficiency control transistors 361 and 362, an FD 314, and an amplification transistor 367. The pixel 300 further includes additional capacitors 365 and 366.

A connection configuration for the photoelectric conversion element 311, the transfer transistor 312, the FD reset transistor 313, the conversion efficiency control transistors 361 and 362, and the FD 314 in the twelfth embodiment is the same as that in the eighth embodiment.

The additional capacitor 365 is inserted between a connection node between the conversion efficiency control transistors 361 and 362 and a power supply voltage VDD. The additional capacitor 366 is inserted between a connection node between the FD reset transistor 313 and the conversion efficiency control transistor 362 and the power supply voltage VDD. Further, the amplification transistor 367 outputs an amplified voltage to a vertical signal line 309.

With the above-described circuit configuration, the conversion efficiency control transistor 361 opens and closes a path between the FD 314 and the additional capacitor 365. The conversion efficiency control transistor 362 opens and closes a path between the conversion efficiency control transistor 361 and the additional capacitor 366. The conversion efficiency becomes an HCG when both the conversion efficiency control transistors 361 and 362 are in an OFF state, and the conversion efficiency becomes an MCG when only the conversion efficiency control transistor 361 is in an ON state. When both the conversion efficiency control transistors 361 and 362 are in an ON state, the conversion efficiency becomes an LCG.

Additionally, the additional capacitors 365 and 366 have different capacitance values. For example, it is assumed that the capacitance value of the additional capacitor 366 added at the time of LCG is larger than the additional capacitor 365. The additional capacitors 365 and 366 are examples of first and second additional capacitors described in the claims.

Further, the additional capacitors 365 and 366 are disposed in a lower pixel chip 202, and the photoelectric conversion element 311 and the transistors are disposed in an upper pixel chip 201. Each of the elements can also be provided in a single semiconductor chip without configuring the solid-state imaging element 200 as a laminated structure.

The larger a capacitance to be added, the greater a saturation charge amount can be expanded, but random noise becomes larger. For this reason, when an illuminance is lower than a predetermined threshold value Th1, an HCG only for the FD 314 is set. Further, when an illuminance is equal to or higher than the threshold value Th1 and lower than a predetermined threshold value Th2, an MCG for the FD 314 and the additional capacitor 365 is set. Further, when an illuminance is equal to or higher than the threshold value Th2, an LCG for the FD 314, the additional capacitor 365, and the additional capacitor 366 is set. By relatively increasing a capacitance value to be added at the time of an LCG, it is possible to achieve both an increase in a saturation charge amount and a reduction in noise.

Figure 51:
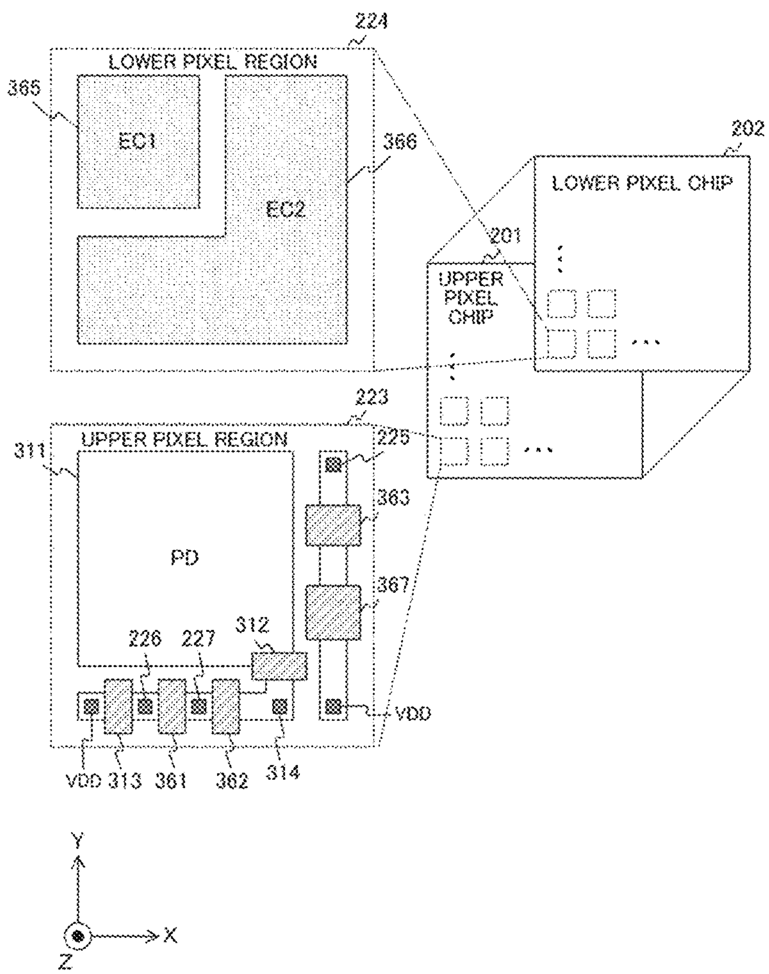
FIG. 51 is a plan view showing an example of a layout of an element in the twelfth embodiment of the present technology.

FIG. 51 is a plan view showing an example of a layout of an element in the twelfth embodiment of the present technology. The photoelectric conversion element 311 and the transistors are disposed in an upper pixel region 223, and the additional capacitors 365 and 366 are disposed in a lower pixel region 224. Further, the capacitance densities of the additional capacitors 365 and 366 are the same, and the area of the additional capacitor 366 is larger than that of the additional capacitor 365.

Although the conversion efficiency is set to three stages, it can also be set to four or more stages. When the conversion efficiency is set to four or more stages, a conversion efficiency control transistor and an additional capacitor may be added in accordance with the number of stages. Further, the ninth embodiment in which a capacitance density is set to a different value and the modification example thereof can be applied to the twelfth embodiment.

Figure 52:
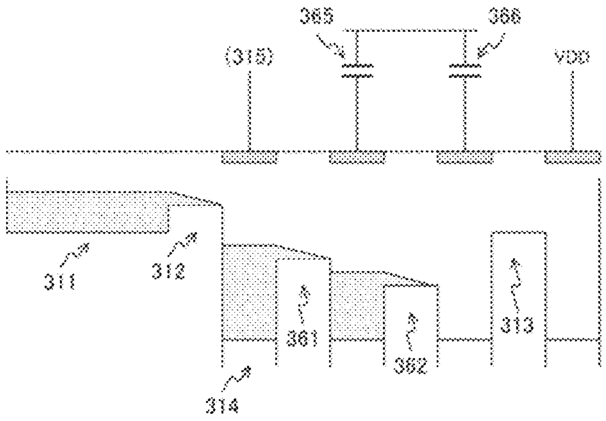
FIG. 52 is an example of a potential diagram of a pixel in the twelfth embodiment of the present technology.

FIG. 52 is an example of a potential diagram of a pixel in the twelfth embodiment of the present technology. When the transfer transistor 312 transitions to an ON state, charges are transferred from the photoelectric conversion element 311 to the FD 314. Gray portions in the drawing indicate accumulated charge. When the conversion efficiency control transistor 361 is in an ON state, the additional capacitor 365 is connected. Further, when the conversion efficiency control transistor 362 is in an ON state, the additional capacitor 366 is further connected.

In this manner, according to the twelfth embodiment of the present technology, since the conversion efficiency control transistors 361 and 362 connect at least one of the additional capacitors 365 and 366 having different capacitance values, it is possible to achieve both an increase in a saturation charge amount and a reduction in noise.

13. Thirteenth Embodiment

Although the additional capacitors are provided in a configuration other than VD.GS in the twelfth embodiment described above, an additional capacitor can also be provided in VD.GS. A solid-state imaging element 200 in a thirteenth embodiment is different from that in the twelfth embodiment in that an additional capacitor is provided in VD.GS.

Figure 53:
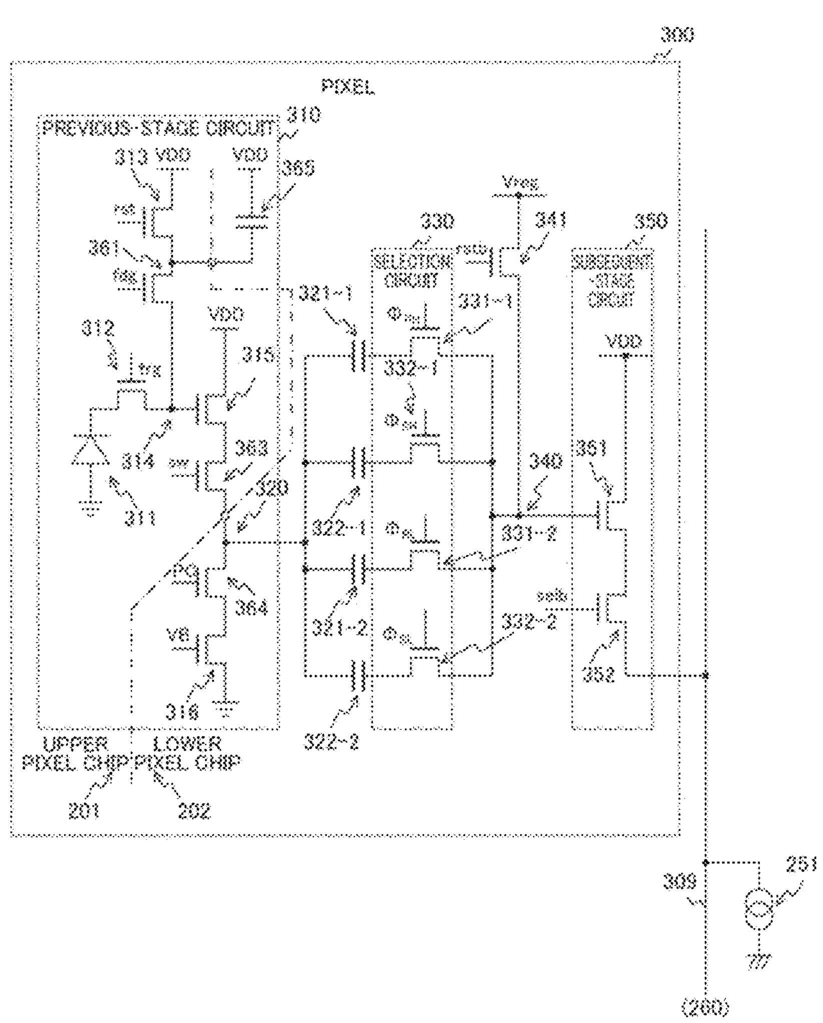
FIG. 53 is a circuit diagram showing a configuration example of a pixel in a thirteenth embodiment of the present technology.

FIG. 53 is a circuit diagram showing a configuration example of a pixel 300 in the thirteenth embodiment of the present technology. The pixel 300 in the thirteenth embodiment is obtained by adding an additional capacitor 365 to the circuit shown in FIG. 39.

The additional capacitor 365 is disposed in a lower pixel chip 202 and inserted between a connection node between an FD reset transistor 313 and a conversion efficiency control transistor 361 and a power supply voltage VDD. Each of the elements can also be provided in a single semiconductor chip without configuring the solid-state imaging element 200 as a laminated structure.

Figure 54:
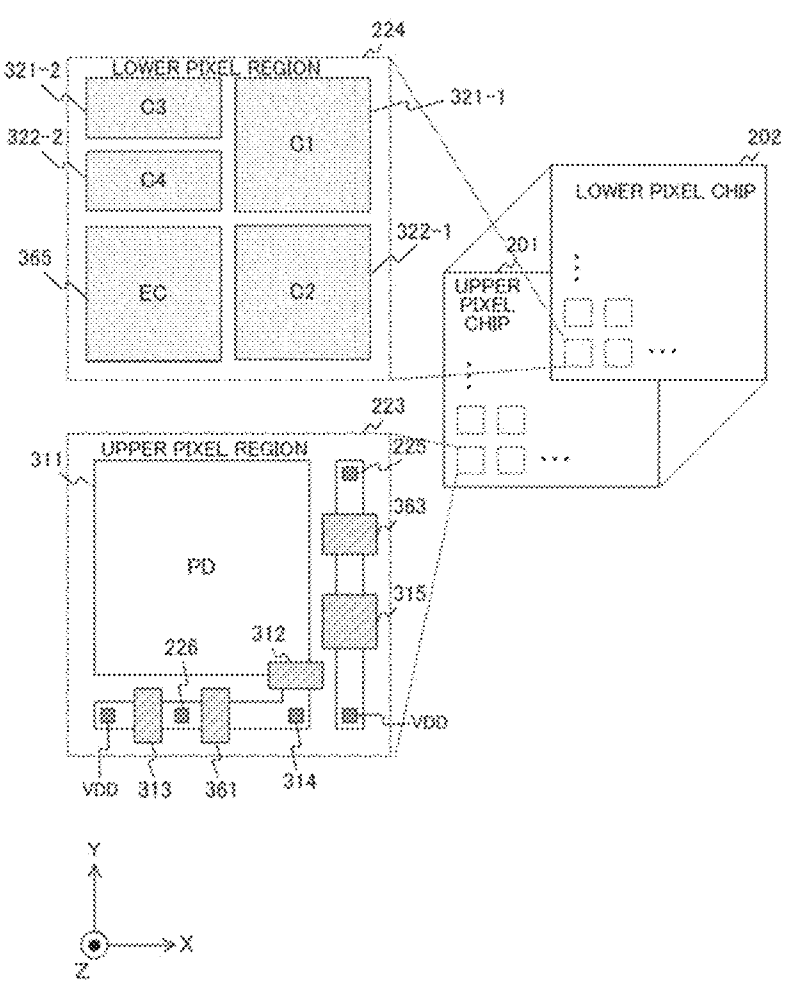
FIG. 54 is a plan view showing an example of a layout of an element in the thirteenth embodiment of the present technology.

FIG. 54 is a plan view showing an example of a layout of an element in the thirteenth embodiment of the present technology. As shown in the drawing, the additional capacitor 365 is further disposed in a lower pixel region 224.

Figure 55:
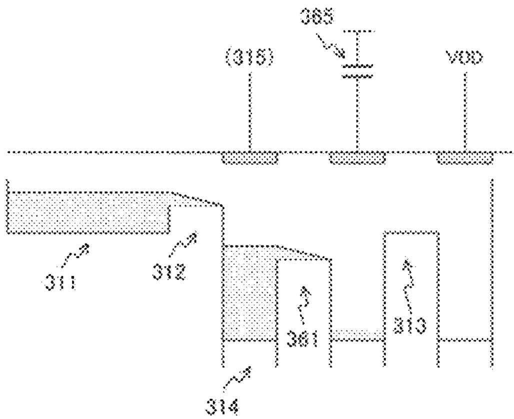
FIG. 55 is an example of a potential diagram of a pixel in the thirteenth embodiment of the present technology.

FIG. 55 is an example of a potential diagram of a pixel in the thirteenth embodiment of the present technology. When a transfer transistor 312 transitions to an ON state, charges are transferred from a photoelectric conversion element 311 to an FD 314. When the conversion efficiency control transistor 361 is in an ON state, the additional capacitor 365 is connected. By connecting the additional capacitor 365, a capacitance value at the time of switching to an LCG can be made larger than when the additional capacitor 365 is not connected.

Although the conversion efficiency is set to two stages, it can also be set to three or more stages. When the conversion efficiency is set to three or more stages, a conversion efficiency control transistor and an additional capacitor may be added in accordance with the number of stages. Furthermore, the ninth embodiment and the modification example thereof can be applied to the thirteenth embodiment. Each of the tenth and eleventh embodiments can also be applied to the thirteenth embodiment.

In this manner, according to the thirteenth embodiment of the present technology, the conversion efficiency control transistor 361 connects the additional capacitor 365 at the time of switching to the LCG, and thus it is possible to increase a capacitance value at the time of switching to the LCG.

14. Fourteenth Embodiment

In the thirteenth embodiment described above, the photoelectric conversion element 311 is connected to only the transfer transistor 312. However, in this configuration, there is a concern that charges will overflow from the photoelectric conversion element 311 to the FD 314 during sampling of the photoelectric conversion element 311 of a reset level corresponding to an HCG. When the potential of the FD 314 continuously changes due to the overflow, a current flows to charge the corresponding capacitive element, causing an IR drop of VDD or Vreg, which may change a pixel signal. A solid-state imaging element 200 in a fourteenth embodiment is different from that in the thirteenth embodiment in that the solid-state imaging element 200 further includes a discharge transistor 317.

Figure 56:
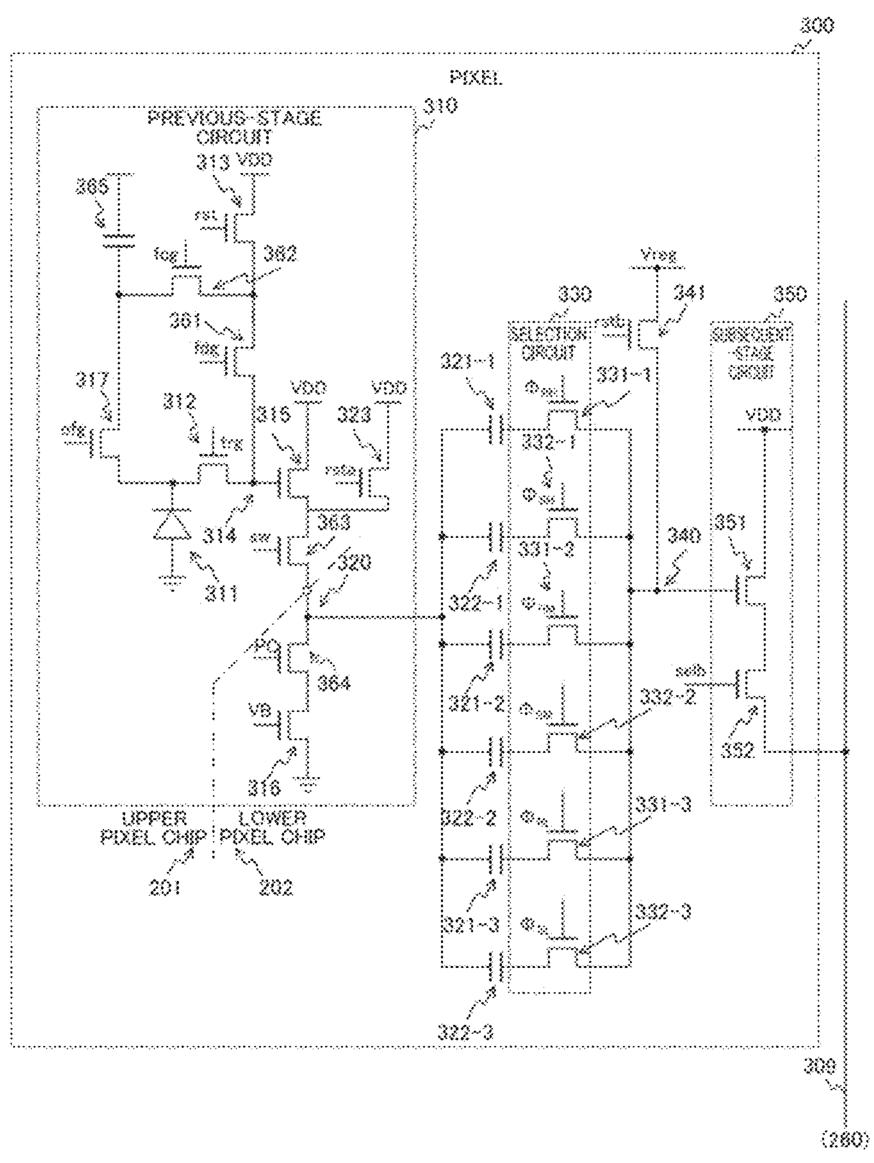
FIG. 56 is a circuit diagram showing a configuration example of a pixel in a fourteenth embodiment of the present technology.

FIG. 56 is a circuit diagram showing a configuration example of a pixel 300 in the fourteenth embodiment of the present technology. The pixel 300 in the fourteenth embodiment is different from that in the thirteenth embodiment in that the pixel 300 further includes the discharge transistor 317, a conversion efficiency control transistor 362, and a previous-stage reset transistor 323. The discharge transistor 317, the conversion efficiency control transistor 362, and the previous-stage reset transistor 323 are disposed in an upper pixel chip 201. Each of the elements can also be provided in a single semiconductor chip without configuring the solid-state imaging element 200 as a laminated structure.

The conversion efficiency control transistor 362 is inserted between an additional capacitor 365 and a connection node between an FD reset transistor 313 and a conversion efficiency control transistor 361. The discharge transistor 317 is inserted between the additional capacitor 365 and the photoelectric conversion element 311. The previous-stage reset transistor 323 is inserted between a connection node between a previous-stage reset transistor 315 and a switching transistor 363 and a power supply voltage VDD.

Immediately after a reset level is sampled and held, a vertical scanning circuit 211 controls the discharge transistor 317 so that the discharge transistor 317 is in an ON state over a pulse period. Thereby, charges overflowing from the photoelectric conversion element 311 after initialization are discharged to a path from the discharge transistor 317 to the additional capacitor 365, and thus it is possible to suppress a fluctuation in the potential of the FD 314 due to the overflowing charge.

The previous-stage reset transistor 323 fixes the level of a previous-stage node 320 to the power supply voltage VDD during reading in response to a previous-stage reset signal rsta.

Figure 57:
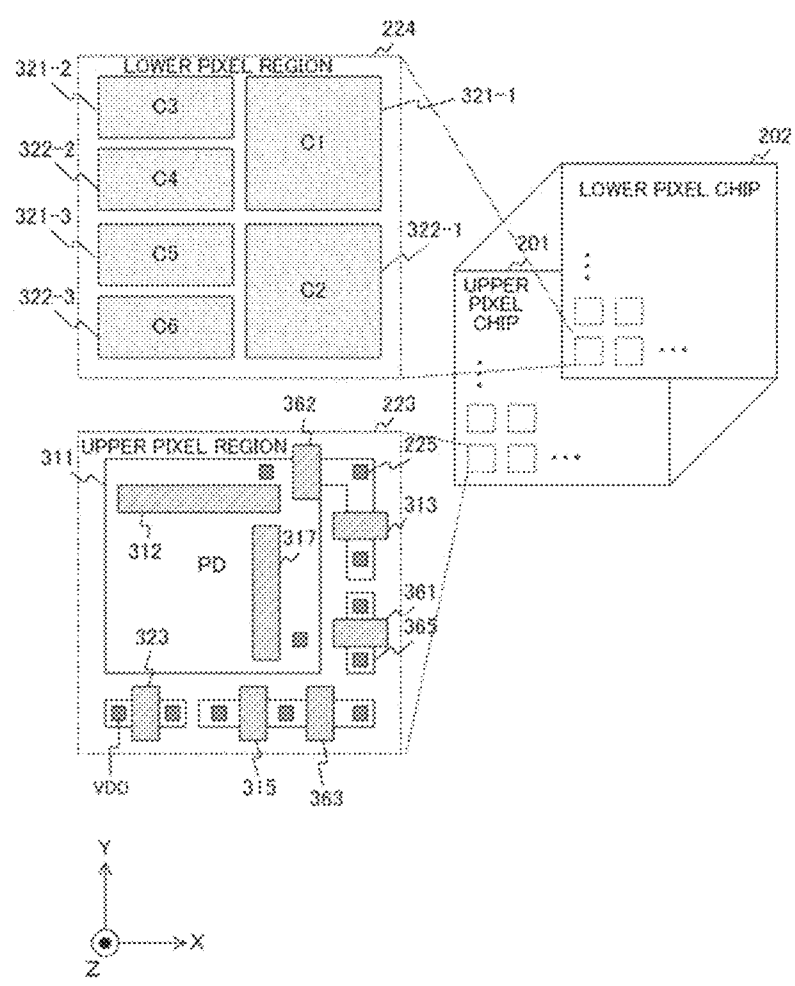
FIG. 57 is a plan view showing an example of a layout of an element in the fourteenth embodiment of the present technology.

FIG. 57 is a plan view showing an example of a layout of an element in the fourteenth embodiment of the present technology. As shown in the drawing, the discharge transistor 317, the conversion efficiency control transistor 362, and the previous-stage reset transistor 323 are further disposed in an upper pixel region 223.

Figure 58:
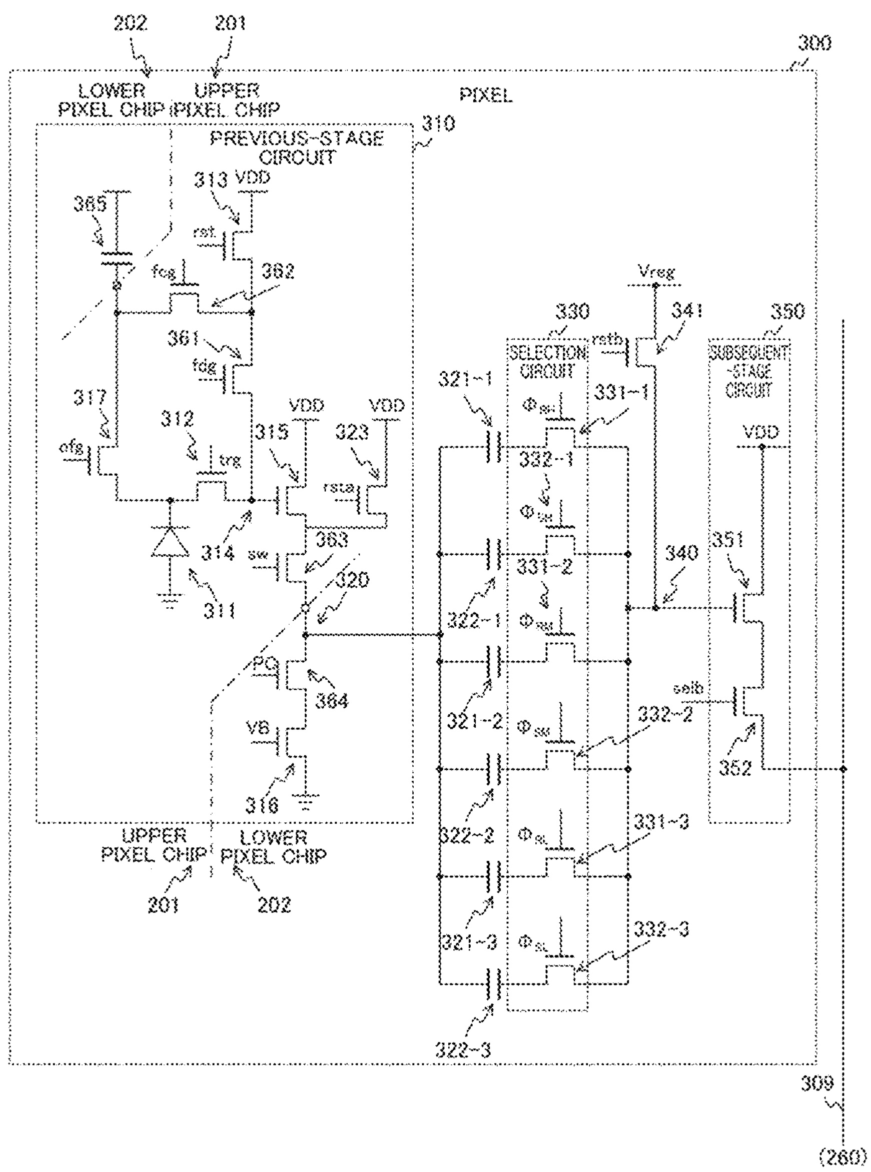
FIG. 58 is a circuit diagram showing another example of a pixel in the fourteenth embodiment of the present technology.
Figure 59:
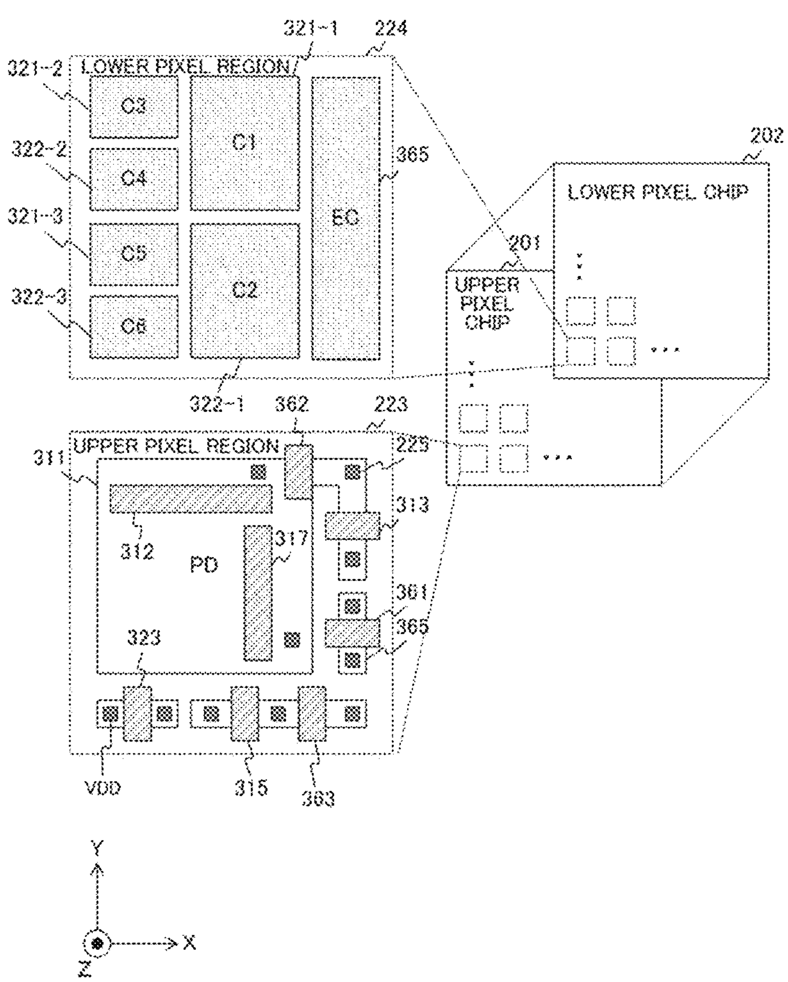
FIG. 59 is a plan view showing another example of a layout of an element in the fourteenth embodiment of the present technology.

As shown in FIGS. 58 and 59, the additional capacitor 365 can also be disposed in a lower pixel chip 202.

Although the conversion efficiency is set to three stages, it can also be set to two stages or four stages or more. Furthermore, the ninth embodiment and the modification example thereof can be applied to the fourteenth embodiment. Each of the tenth and eleventh embodiments can also be applied to the fourteenth embodiment.

In this manner, according to the fourteenth embodiment of the present technology, the discharge transistor 317 discharges charges overflowing from the photoelectric conversion element 311 to a path to the additional capacitor 365, and thus it is possible to suppress a fluctuation in the potential of the FD 314 due to the overflowing charge.

15. Fifteenth Embodiment

In the fourteenth embodiment described above, the capacitance value of the capacitive element corresponding to the HCG is relatively increased, and the vertical scanning circuit 211 holds each voltage (a reset level or a signal level) in one capacitive element. However, in this configuration, the capacitance value of the capacitive element corresponding to the LCG is relatively decreased, and there is a concern that noise may not be sufficiently reduced. A solid-state imaging element 200 in a fifteenth embodiment is different from that in the fourteenth embodiment in that capacitive elements have the same capacitance value, and a vertical scanning circuit 211 holds a voltage in a plurality of capacitive elements.

Figure 60:
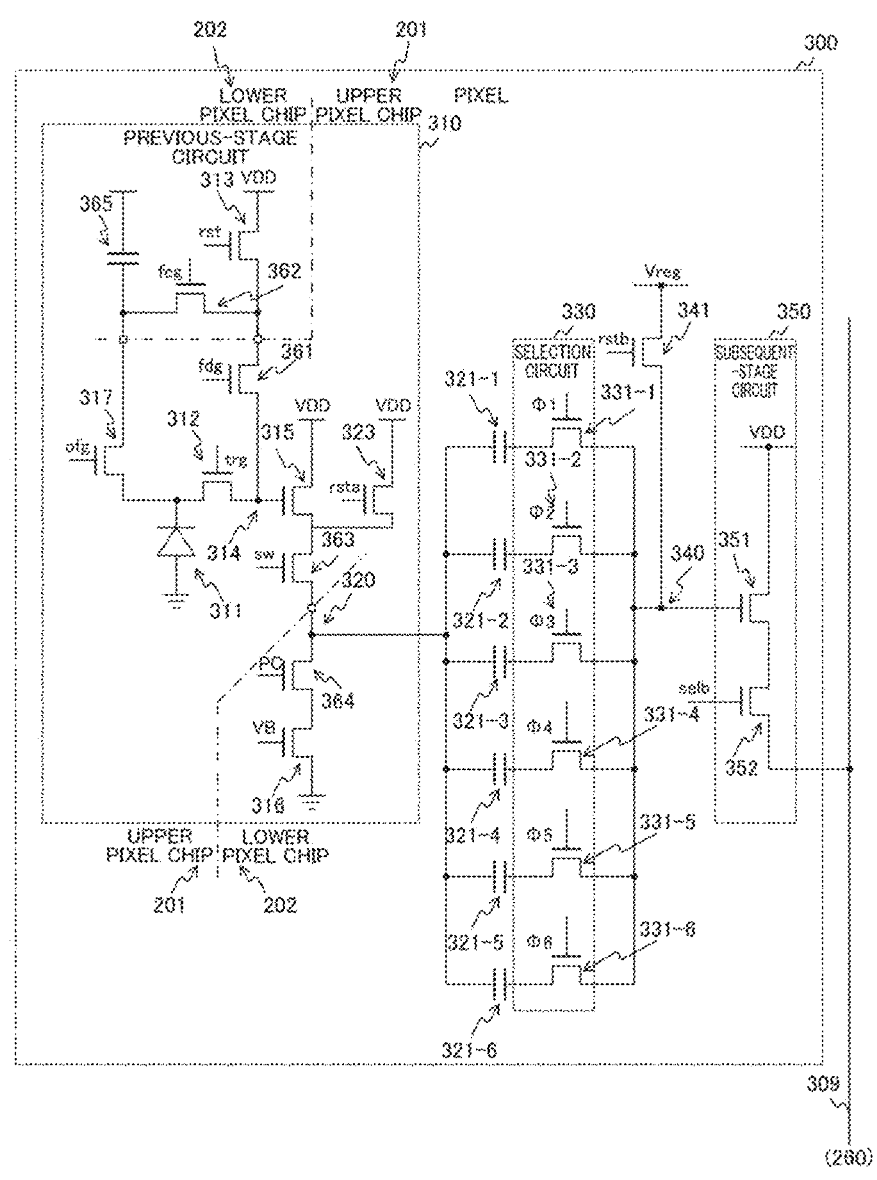
FIG. 60 is a circuit diagram showing a configuration example of a pixel in a fifteenth embodiment of the present technology.

FIG. 60 is a circuit diagram showing a configuration example of a pixel 300 in the fifteenth embodiment of the present technology. The pixel 300 in the fifteenth embodiment includes a previous-stage circuit 310, a plurality of capacitive elements, a plurality of selection transistors, a subsequent-stage reset transistor 341, and a subsequent-stage circuit 350.

Circuit configurations of the previous-stage circuit 310 and the subsequent-stage circuit 350 in the fifteenth embodiment are the same as those in the fourteenth embodiment.

Further, the number of capacitive elements is four or more, and for example, six capacitive elements 321-1 to 321-6 are disposed. Further, the capacitance values of the capacitive elements are the same. The number of selection transistors is the same as the number of capacitive elements, and for example, selection transistors 331-1 to 331-6 are disposed.

One ends of the respective capacitive elements 321-1 to 321-6 are connected to a previous-stage node 320 in common. The selection transistors 331-1 to 331-6 open and close paths between the other ends of the capacitive elements 321-1 to 321-6 and a subsequent-stage node 340 in response to selection signals Φ1 to Φ6 received from a vertical scanning circuit 211.

FIG. 61 is a diagram showing a method of driving the pixel 300 in the fifteenth embodiment of the present technology. The solid-state imaging element 200 can use any driving method among Driving Examples 1 to 4.

In Driving Examples 1 and 2, the vertical scanning circuit 211 controls the previous-stage circuit 310 so that the previous-stage circuit 310 sets any one of a plurality of conversion efficiencies such as an HCG, an MCG, and an LCG. In addition, in Driving Example 1 and Driving Example 2, the vertical scanning circuit 211 holds a P-phase level (reset level) in the plurality of capacitive elements and holds a D-phase level (signal level) in another plurality of capacitive elements in response to selection signals Φ1 to Φ6.

In Driving Example 1, the vertical scanning circuit 211 holds a reset level in three of the six capacitive elements and holds a signal level in the remaining three capacitive elements. In Driving Example 2, the vertical scanning circuit 211 holds a reset level in two of the six capacitive elements and holds a signal level in another two capacitive elements. All of the capacitive elements may hold a voltage as in Driving Example 1, or some of the capacitive elements may hold a voltage as in Driving Example 2. Four or more capacitive elements are provided for each pixel in Driving Example 1, and six or more capacitive elements are provided in Driving Example 2.

In Driving Examples 3 and 4, the vertical scanning circuit 211 controls the previous-stage circuit 310 so that the previous-stage circuit 310 sequentially sets two of a plurality of conversion efficiencies such as an HCG, an MCG, and an LCG. For example, the HCG and the LCG are set in order.

Further, in Driving Example 3, the vertical scanning circuit 211 holds each of a reset level and a signal level generated in accordance with a higher conversion efficiency in a plurality of capacitive elements. Further, the vertical scanning circuit 211 holds each of a reset level and a signal level generated in accordance with a lower conversion efficiency in another plurality of capacitive elements. For example, it is assumed that capacitive elements 321-7 and 321-8 are further added. Then, the vertical scanning circuit 211 holds a reset level corresponding to the HCG in the capacitive elements 321-1 and 321-2 and holds a signal level corresponding to the HCG in the capacitive elements 321-3 and 321-4. Furthermore, the vertical scanning circuit 211 holds a reset level corresponding to the LCG in the capacitive elements 321-5 and 321-6 and holds a signal level corresponding to the LCG in the capacitive elements 321-7 and 321-8.

Further, in Driving Example 4, the vertical scanning circuit 211 holds each of a reset level and a signal level generated in accordance with a higher conversion efficiency in a plurality of capacitive elements. Further, the vertical scanning circuit 211 holds each of a reset level and a signal level generated in accordance with a lower conversion efficiency in a smaller number of capacitors. For example, the vertical scanning circuit 211 holds a reset level corresponding to the HCG in the capacitive elements 321-1 and 321-2 and holds a signal level corresponding to the HCG in the capacitive elements 321-3 and 321-4. Furthermore, the vertical scanning circuit 211 holds a reset level corresponding to the LCG in the capacitive element 321-5 and holds a signal level corresponding to the LCG in the capacitive element 321-6.

Eight or more capacitive elements are provided for each pixel in Driving Example 3, and six or more capacitive elements are provided in Driving Example 4. Further, in Driving Example 3 and Driving Example 4, it is also possible to further add a capacitive element and set three or more conversion efficiencies in order.

As shown in the drawing, when one or two of the three conversion efficiencies are used, the vertical scanning circuit 211 holds a voltage in a plurality of capacitive elements, and thus it is possible to suppress noise more than when a voltage is held in one capacitive element.

FIG. 62 is a diagram showing an example of the state of a pixel at the time of performing sampling-and-holding in Driving Example 1 in the fifteenth embodiment of the present technology. It is assumed that the HCG is set among the HCG, the MCG, and the LCG. As shown in "a" in the drawing, the vertical scanning circuit 211 sets only the selection transistors 331-1 to 331-3 to be in an ON state to hold a reset level P_HCG corresponding to the HCG in the capacitive elements 321-1 to 321-3. Further, as shown in "b" in the drawing, the vertical scanning circuit 211 sets only the selection transistors 331-4 to 331-6 to be in an ON state to hold a signal level D_HCG corresponding to the HCG in the capacitive elements 321-4 to 321-6.

FIG. 63 is a diagram showing an example of the state of a pixel at the time of performing sampling-and-holding in Driving Example 2 in the fifteenth embodiment of the present technology. It is assumed that the HCG is set among the HCG, the MCG, and the LCG. As shown in "a" in the drawing, the vertical scanning circuit 211 sets only the selection transistors 331-1 and 331-2 to be in an ON state to hold a reset level P_HCG corresponding to the HCG in the capacitive elements 321-1 and 321-2. Further, as shown in "b" in the drawing, the vertical scanning circuit 211 sets only the selection transistors 331-3 and 331-4 to be in an ON state to hold a signal level D_HCG corresponding to the HCG in the capacitive elements 321-3 and 321-4.

Figure 64:
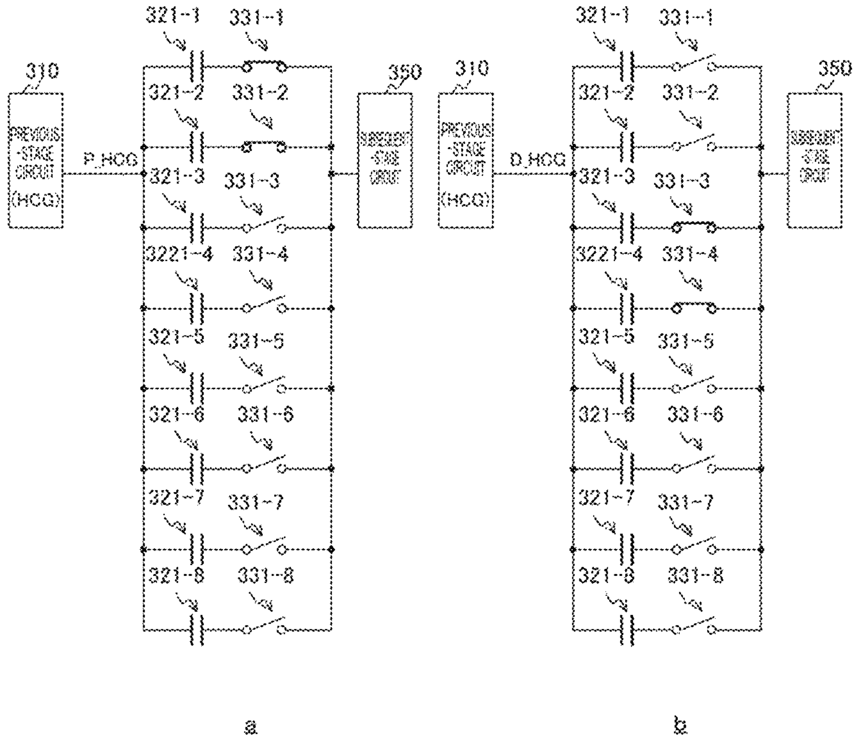
FIG. 64 is a diagram showing an example of the state of a pixel at the time of sampling and holding a level corresponding to a high conversion efficiency in Driving Example 3 in the fifteenth embodiment of the present technology.

FIG. 64 is a diagram showing an example of the state of a pixel when a level corresponding to a high conversion efficiency is sampled and held in Driving Example 3 in the fifteenth embodiment of the present technology. It is assumed that the HCG and the LCG are set in order among the HCG, the MCG, and the LCG. As shown in "a" in the drawing, the vertical scanning circuit 211 sets only the selection transistors 331-1 and 331-2 to be in an ON state to hold a reset level P_HCG corresponding to the HCG in the capacitive elements 321-1 and 321-2. Further, as shown in "b" in the drawing, the vertical scanning circuit 211 sets only the selection transistors 331-3 and 331-4 to be in an ON state to hold a signal level D_HCG corresponding to the HCG in the capacitive elements 321-3 and 321-4.

Figure 65:
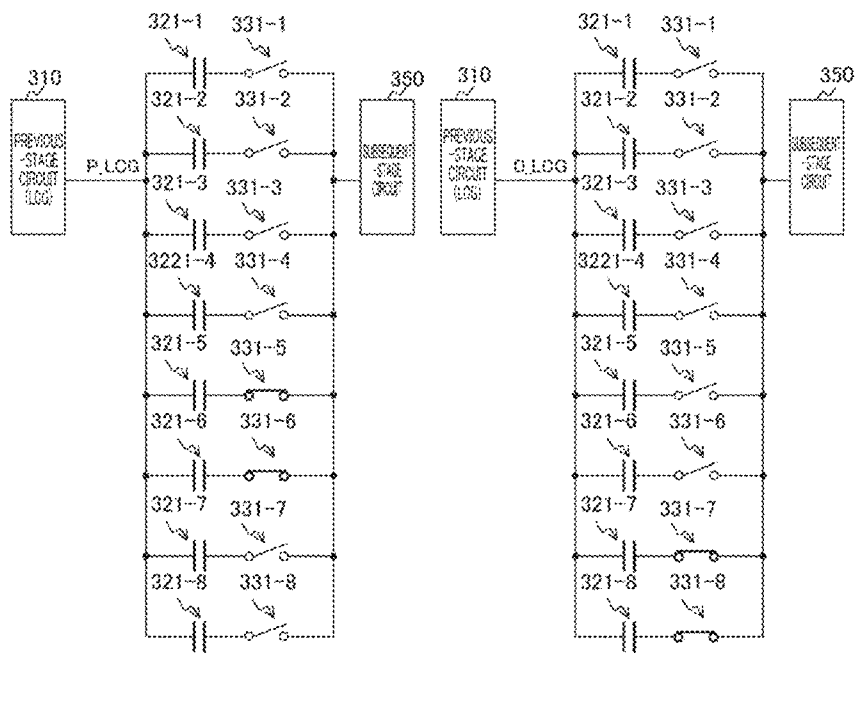
FIG. 65 is a diagram showing an example of the state of a pixel at the time of sampling and holding a level corresponding to a low conversion efficiency in Driving Example 3 in the fifteenth embodiment of the present technology.

FIG. 65 is a diagram showing an example of the state of a pixel when a level corresponding to a low conversion efficiency is sampled and held in Driving Example 3 in the fifteenth embodiment of the present technology. As shown in "a" in the drawing, the vertical scanning circuit 211 sets only the selection transistors 331-5 and 331-6 to be in an ON state to hold a reset level P_HCG corresponding to the LCG in the capacitive elements 321-5 and 321-6. Further, as shown in "b" in the drawing, the vertical scanning circuit 211 sets only the selection transistors 331-7 and 331-8 to be in an ON state to hold a signal level D_LCG corresponding to the LCG in the capacitive elements 321-7 and 321-8.

FIG. 66 is a diagram showing an example of the state of a pixel when a level corresponding to a high conversion efficiency is sampled and held in Driving Example 4 in the fifteenth embodiment of the present technology. It is assumed that the HCG and the LCG are set in order among the HCG, the MCG, and the LCG. As shown in "a" in the drawing, the vertical scanning circuit 211 sets only the selection transistors 331-1 and 331-2 to be in an ON state to hold a reset level P_HCG corresponding to the HCG in the capacitive elements 321-1 and 321-2. Further, as shown in "b" in the drawing, the vertical scanning circuit 211 sets only the selection transistors 331-3 and 331-4 to be in an ON state to hold a signal level D_HCG corresponding to the HCG in the capacitive elements 321-3 and 321-4.

FIG. 67 is a diagram showing an example of the state of a pixel when a level corresponding to a low conversion efficiency is sampled and held in Driving Example 4 in the fifteenth embodiment of the present technology. As shown in "a" in the drawing, the vertical scanning circuit 211 sets only the selection transistor 331-5 to be in an ON state to hold a reset level P_LCG corresponding to the LCG in the capacitive element 321-5. Further, as shown in "b" in the drawing, the vertical scanning circuit 211 sets only the selection transistor 331-6 to be in an ON state to hold a signal level D_LCG corresponding to the LCG in the capacitive element 321-6.

The fifteenth embodiment can also be applied to each of the eighth to thirteenth embodiments.

In this manner, according to the fifteenth embodiment of the present technology, the vertical scanning circuit 211 holds a voltage in a plurality of capacitive elements, and thus it is possible to suppress noise more than when a voltage is held in one capacitive element.

Modification Example

In the fifteenth embodiment described above, one ends of the capacitive element 321-1 and the like are connected to the previous-stage node 320 in common, and the selection transistor 331-1 and the like are inserted between the other ends thereof and the subsequent-stage node 340. However, the circuit configuration is not limited thereto as long as VD.GS can be realized. A solid-state imaging element 200 in a modification example of the fifteenth embodiment is different from that in the fifteenth embodiment in that the connections between a capacitive element 321-1 and the like and a selection transistor 331-1 and the like are different.

Figure 68:
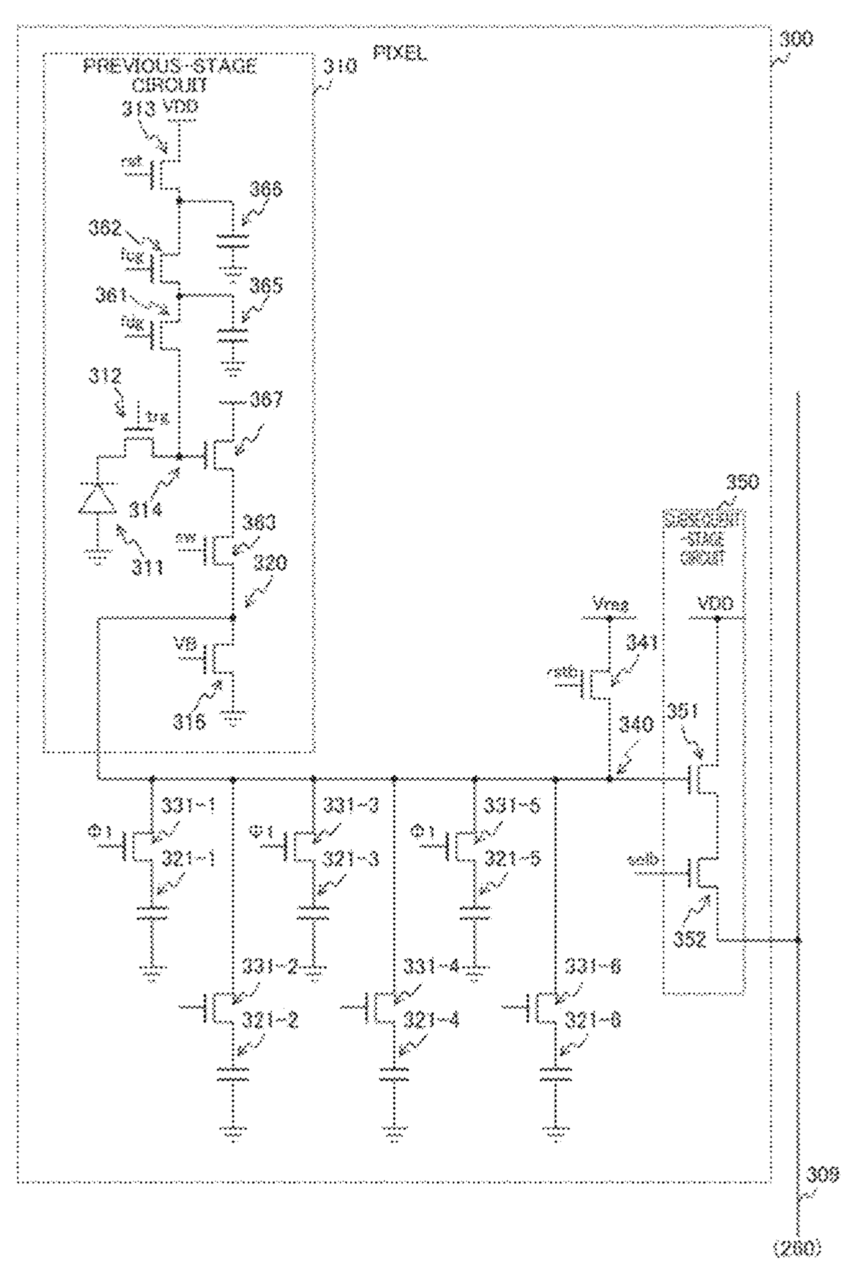
FIG. 68 is a circuit diagram showing a configuration example of a pixel in a modification example of the fifteenth embodiment of the present technology.

FIG. 68 is a circuit diagram showing a configuration example of a pixel 300 in the modification example of the fifteenth embodiment of the present technology. In the pixel 300 in the modification example of the fifteenth embodiment, a previous-stage node 320 of a previous-stage circuit 310 is connected to a subsequent-stage node 340.

Further, the selection transistor 331-1 is inserted between one end of the capacitive element 321-1 and the previous-stage node 320, and a selection transistor 331-2 is inserted between one end of a capacitive element 321-2 and the previous-stage node 320. The selection transistor 331-3 is inserted between one end of a capacitive element 321-3 and the previous-stage node 320, and a selection transistor 331-4 is inserted between one end of a capacitive element 321-4 and the previous-stage node 320. A selection transistor 331-5 is inserted between one end of a capacitive element 321-5 and the previous-stage node 320, and a selection transistor 331-6 is inserted between one end of a capacitive element 321-6 and the previous-stage node 320. Further, the other ends of the capacitive elements 321-1 to 321-6 are connected to a ground terminal.

VD.GS can also be realized by the circuit shown in the drawing. In addition, each of Driving Examples 1 to 4 shown in FIG. 61 can be applied.

In this manner, according to the modification example of the fifteenth embodiment of the present technology, the selection transistor 331-1 and the like are inserted between the previous-stage node 320 and one ends of the capacitive element 321-1 and the like, and the other ends of the capacitive elements are grounded, whereby it is possible to realize VD.GS. Further, Driving Examples 1 to 4 can be applied to the circuit.

16. Sixteenth Embodiment

In the fourteenth embodiment described above, the solid-state imaging element 200 expands a dynamic range by switching a conversion efficiency in accordance with an illuminance in units of pixels or in units of frames. However, a dynamic range can also be expanded by fixing a conversion efficiency, imaging a plurality of frames with different exposure periods, and combining the frames. In this case, it is preferable to improve a consecutive imaging function. A solid-state imaging element 200 in a sixteenth embodiment is different from that in the fourteenth embodiment in that a consecutive imaging function is improved by starting exposure of a next frame immediately after the exposure of a certain frame ends and performing reading within an exposure period.

Figure 69:
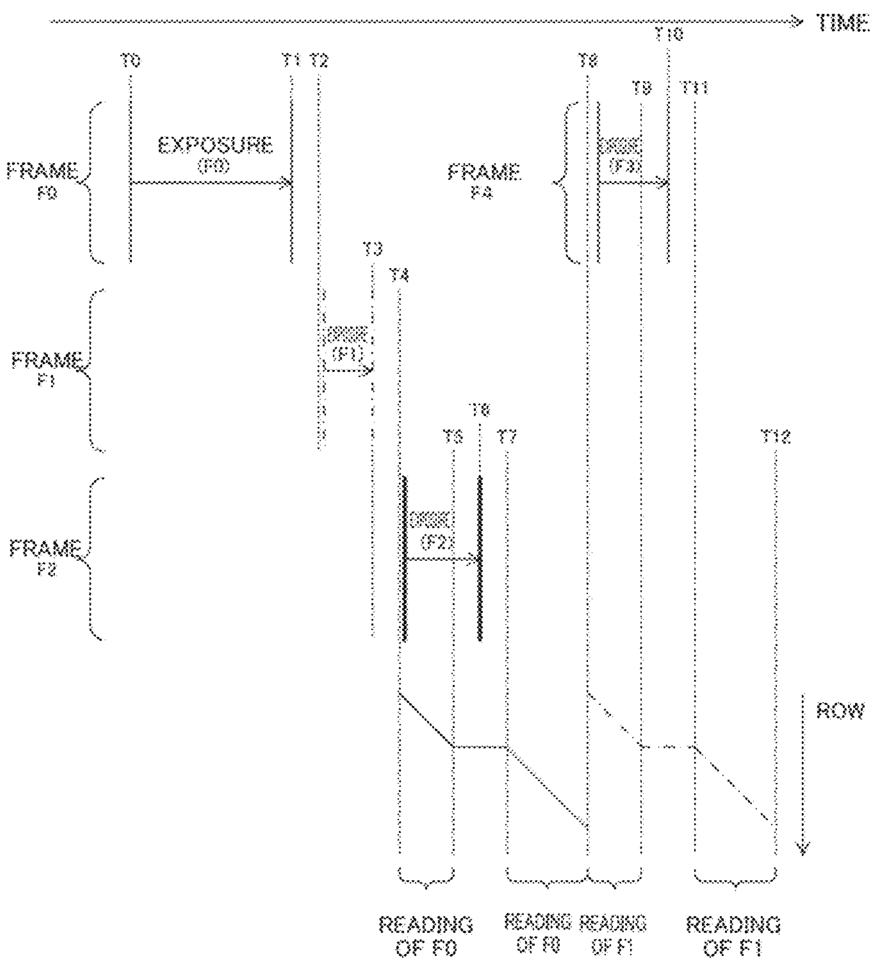
FIG. 69 is a timing chart showing an example of an operation of a solid-state imaging element in a sixteenth embodiment of the present technology.

FIG. 69 is a timing chart showing an example of an operation of the solid-state imaging element 200 in the sixteenth embodiment of the present technology. In the sixteenth embodiment, a vertical scanning circuit 211 controls a previous-stage circuit 310 to fix a conversion efficiency to any one of an HCG, an MCG, and an LCG and performs imaging of a plurality of frames. The vertical scanning circuit 211 holds a reset level and a signal level of a 3m-th frame in capacitive elements 321-1 and 321-2, where m is an integer. Further, the vertical scanning circuit 211 holds a reset level and a signal level of a (3m+1)-th frame in capacitive elements 321-3 and 321-4. The vertical scanning circuit 211 holds a reset level and a signal level of a (3m+2)-th frame in capacitive elements 321-5 and 32-6.

Furthermore, it is assumed that exposure periods of at least two of the 3m-th, (3m+1)-th, and (3m+2)-th frames are different from each other. A circuit at a subsequent stage (a column signal processing circuit 260 or the like) can combine these three frames and generate a composite frame with an expanded dynamic range.

The vertical scanning circuit 211 drives all pixels at a timing T0 to start exposure of a frame F0 and ends the exposure of the frame F0 at a timing T1. The vertical scanning circuit 211 generates a reset level immediately before the timing T1 and holds the generated reset level in the capacitive element 321-1. Further, the vertical scanning circuit 211 generates a signal level at the timing T1 and holds the generated signal level in the capacitive element 321-2. A sample-and-hold period of the signal level ends at a timing T2.

Then, the vertical scanning circuit 211 drives all pixels immediately after the timing T2 to start exposure of the next frame F1, and ends the exposure of the frame F1 at a timing T3. The vertical scanning circuit 211 generates a reset level immediately before the timing T3 and holds the generated reset level in the capacitive element 321-3. Further, the vertical scanning circuit 211 generates a signal level at the timing T3 and holds the generated signal level in the capacitive element 321-4. A sample-and-hold period of the signal level ends at a timing T4.

Subsequently, the vertical scanning circuit 211 drives all pixels immediately after the timing T4 to start exposure of a frame F2, and ends the exposure of the frame F2 at a timing T6. The vertical scanning circuit 211 generates a reset level immediately before the timing T6 and holds the generated reset level in the capacitive element 321-5. Further, the vertical scanning circuit 211 generates a signal level at the timing T6 and holds the generated signal level in the capacitive element 321-6. Sample-and-hold periods of the reset level and the signal level are included in a period from a timing T5 to a timing T7.

Further, a subsequent-stage circuit 350 and a column signal processing circuit 260 read the reset level and the signal level while avoiding the sample-and-hold periods. For example, the frame F0 is read within a period from the timing T4 when the sample-and-hold period ends to the timing T5 when the next sample-and-hold period starts. It is assumed that reading of all rows of the frame F0 is not completed within this period. In this case, the remaining rows of the frame F0 are read within a period from a timing T7 when the sample-and-hold period ends to a timing T8.

The vertical scanning circuit 211 drives all pixels to start exposure of a frame F3 immediately after the timing T8 when the reading of the frame F0 is completed, and ends the exposure of the frame F3 at a timing T10. The vertical scanning circuit 211 generates a reset level immediately before the timing T10 and holds the generated reset level in the capacitive element 321-1. Further, the vertical scanning circuit 211 generates a signal level at the timing T10 and holds the generated signal level in the capacitive element 321-2. Sample-and-hold periods of the reset level and the signal level are included in a period from a timing T9 to a timing T11. The frame F1 is read within a period from the timing T8 to the timing T9 when the sample-and-hold period is started. It is assumed that the reading of all rows of the frame F1 is not completed within this period. In this case, the remaining rows of the frame F1 are read within a period from the timing T11 when the sample-and-hold period ends to a timing T12. The frames F2 and F3 are also read out of the sample-and-hold period. Similar control is performed in frames subsequent to the frame F3.

As shown in the drawing, the vertical scanning circuit 211 fixes a conversion efficiency and holds a different frame level for each pair of capacitive elements (321-1 and 321-2, and the like), whereby it is possible to start exposure of the next frame immediately after exposure of a certain frame ends. Thereby, it is possible to achieve high-speed consecutive imaging with almost no gaps between frames.

Furthermore, reading is performed in a pipeline manner while avoiding a sample-and-hold period during exposure, and thus it is possible to shorten a period of time from the end of high-speed consecutive imaging of the frames F0 to F2 to the start of exposure of the next frame F3. In the drawing, reading of the frame F0 is performed during exposure of the frame F2, and thus a period of time until the start of exposure of the frame F3 is shorter than when the reading is started after the exposure of the frame F2 ends. In the drawing, since an exposure period of the frame F1 is short, the column signal processing circuit 260 does not perform reading during the exposure, but when the exposure period of the frame F1 is sufficiently long, reading can also be performed during the exposure.

Figure 70:
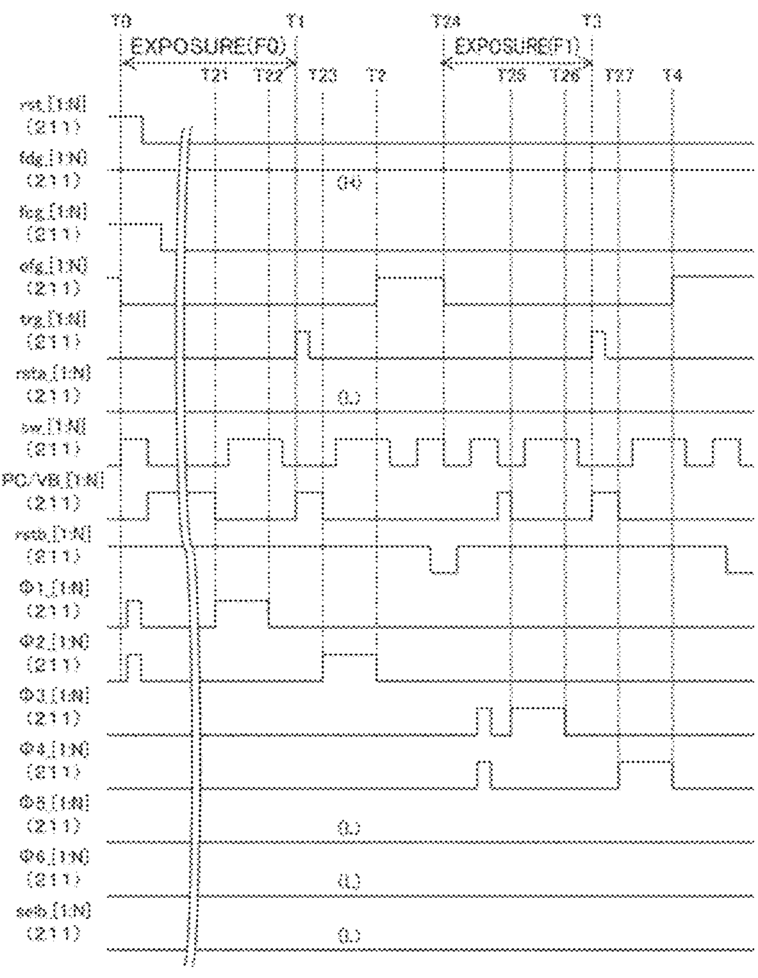
FIG. 70 is a timing chart showing an example of first and second exposure control in the sixteenth embodiment of the present technology.

FIG. 70 is a timing chart showing an example of first and second exposure controls in the sixteenth embodiment of the present technology. The vertical scanning circuit 211 sets a discharge signal ofg of all pixels to a low level at a timing T0 to start exposure of a frame F0. Then, the vertical scanning circuit 211 supplies a high-level transfer signal trg to all pixels over a pulse period from a timing T1 and ends the exposure of the frame F0.

Further, the vertical scanning circuit 211 supplies a high-level selection signal 1 to all pixels during a sample-and-hold period from a timing T21 to a timing T22 immediately before the timing T1 and holds a reset level. Further, the vertical scanning circuit 211 supplies a high-level selection signal Φ2 to all pixels during a sample-and-hold period from a timing T23 immediately after the timing T1 to a timing T2 and holds a signal level.

Then, the vertical scanning circuit 211 returns the discharge signal ofg of all pixels to a high level at the timing T2 and sets the discharge signal ofg of all pixels to a low level at a timing T24 immediately after the timing T2 to start exposure of a frame F1. Then, the vertical scanning circuit 211 supplies the high-level transfer signal trg to all pixels over a pulse period from a timing T3, and ends the exposure of the frame F1.

Further, the vertical scanning circuit 211 supplies a high-level selection signal Φ3 to all pixels during a sample-and-hold period from a timing T25 immediately before the timing T3 to a timing T26, and holds a reset level. Further, the vertical scanning circuit 211 supplies a high-level selection signal Φ4 to all pixels during a sample-and-hold period from a timing T27 immediately after the timing T3 to a timing T4, and holds a signal level. Reading is performed while avoiding these sample-and-hold periods. Although a period from the timing T26 to the timing T27 is not a sample-and-hold period, this period is so short that reading is not performed, and reading is performed after the timing T4. Further, the vertical scanning circuit 211 returns the discharge signal ofg of all pixels to a high level at the timing T4.

Although the solid-state imaging element 200 consecutively images three frames, the solid-state imaging element 200 can also image four or more frames consecutively. Each time the number of times of consecutive imaging is increased by one, two capacitive elements are added within a pixel.

Figure 71:
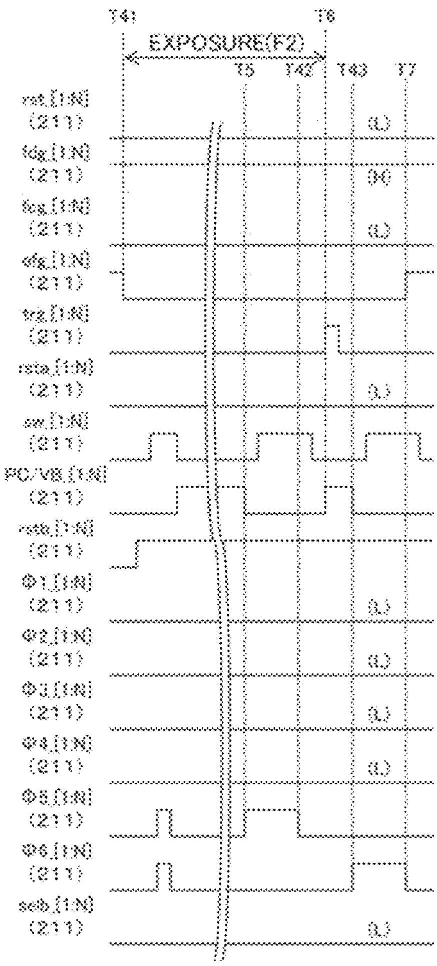
FIG. 71 is a timing chart showing an example of third exposure control in the sixteenth embodiment of the present technology.

FIG. 71 is a timing chart showing an example of a third exposure control in the sixteenth embodiment of the present technology. The vertical scanning circuit 211 sets a discharge signal ofg of all pixels to a low level at a timing T41 immediately after the end of a sample-and-hold period, and starts exposure of a frame F2. Then, the vertical scanning circuit 211 supplies a high-level transfer signal trg to all pixels over a pulse period from a timing T6, and ends the exposure of the frame F2.

Further, the vertical scanning circuit 211 supplies a high-level selection signal Φ5 to all pixels during a sample-and-hold period from a timing T5 immediately before the timing T6 to a timing T42, and holds a reset level. Further, the vertical scanning circuit 211 supplies a high-level selection signal Φ6 to all pixels during a sample-and-hold period from a timing T43 immediately after the timing T6 to a timing T7, and holds a signal level. Reading is performed while avoiding a period from the timing T5 to the timing T7 that includes these sample-and-hold periods.

Figure 72:
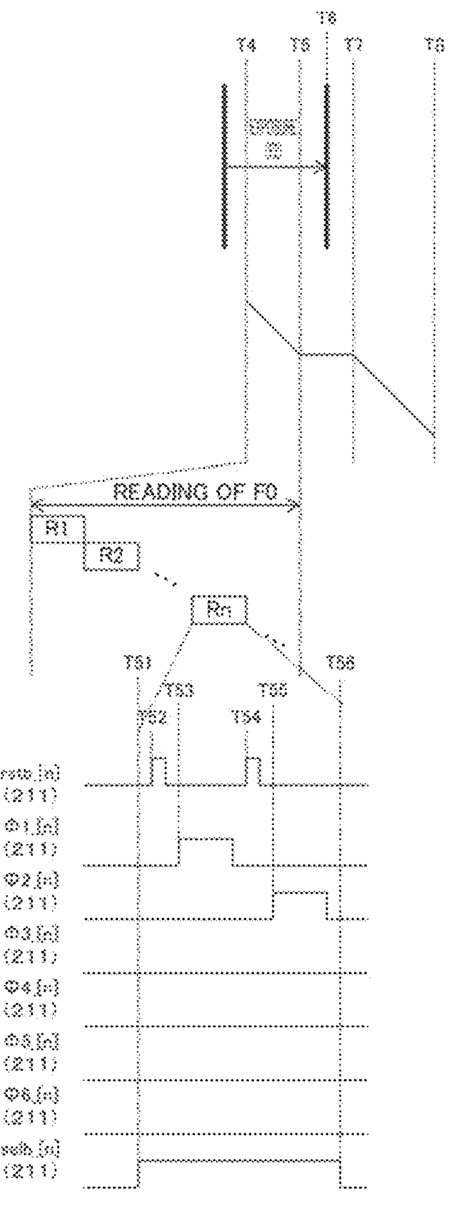
FIG. 72 is a timing chart showing an example of a reading operation for a first frame in the sixteenth embodiment of the present technology.

FIG. 72 is a timing chart showing an example of a reading operation for a first frame in the sixteenth embodiment of the present technology. During exposure of a frame F2, a frame F0 is read over a period from a timing T4 at the end of a sample-and-hold period to a timing T5 at the start of the next sample-and-hold period. During this reading period, the vertical scanning circuit 211 sequentially drives rows. Rn in the drawing indicates a reading period of an n-th row.

The vertical scanning circuit 211 supplies a high-level subsequent-stage selection signal selb to the n-th row over the reading period of the n-th row from a timing T51 to a timing T56. Further, the vertical scanning circuit 211 supplies a high-level subsequent-stage reset signal rstb to the n-th row over a pulse period from a timing T52, and supplies a high-level selection signal Φ1 to the n-th row over a predetermined period from a timing T53. Thereby, a reset level of the n-th row is read.

Then, the vertical scanning circuit 211 supplies the high-level subsequent-stage reset signal rstb to the n-th row over a pulse period from a timing T54, and supplies a high-level selection signal Φ2 to the n-th row over a predetermined period from a timing T55. Thereby, a signal level of the n-th row is read.

Figure 73:
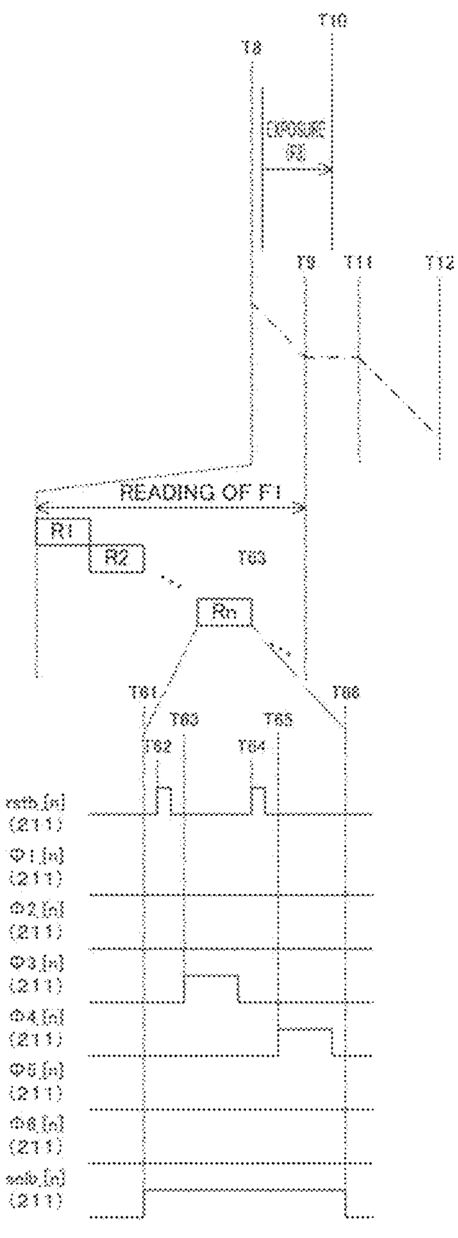
FIG. 73 is a timing chart showing an example of a reading operation for a second frame in the sixteenth embodiment of the present technology.

FIG. 73 is a timing chart showing an example of a reading operation for a second frame in the sixteenth embodiment of the present technology. A frame F1 is read over a period from a timing T8 to a timing T9 at the start of a sample-and-hold period.

The vertical scanning circuit 211 supplies the high-level subsequent-stage selection signal selb to the n-th row over a reading period of the n-th row from a timing T61 to a timing T66. Further, the vertical scanning circuit 211 supplies a high-level subsequent-stage reset signal rstb to the n-th row over a pulse period from a timing T62, and supplies a high-level selection signal Φ3 to the n-th row over a predetermined period from a timing T63. Thereby, a reset level of the n-th row is read.

Then, the vertical scanning circuit 211 supplies the high-level subsequent-stage reset signal rstb to the n-th row over a pulse period from a timing T64, and supplies a high-level selection signal Φ4 to the n-th row over a predetermined period from a timing T65. Thereby, a signal level of the n-th row is read.

The sixteenth embodiment can also be applied to each of the eighth to thirteenth embodiments. Further, the modification example of the fifteenth embodiment can be applied to the sixteenth embodiment.

In this manner, according to the sixteenth embodiment of the present technology, since exposure of a next frame is started immediately after exposure of a certain frame ends, and reading is performed while avoiding a sample-and-hold period during exposure, it is possible to improve a consecutive imaging function.

First Modification Example

In the sixteenth embodiment described above, three frames are consecutively imaged using six capacitive elements, but the number of frames to be consecutively imaged is not limited to three. A solid-state imaging element 200 in a first modification example of the sixteenth embodiment is different from that in the first embodiment in that the number of frames to be consecutively imaged is two.

Figure 74:
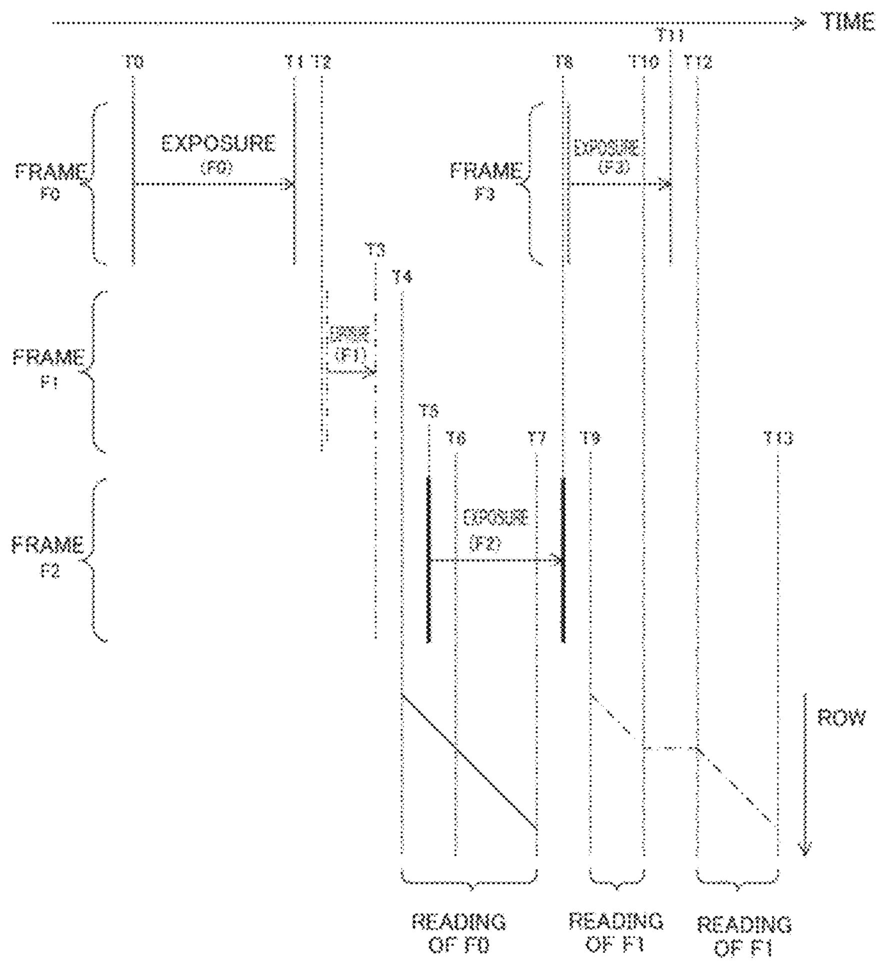
FIG. 74 is a timing chart showing an example of an operation of a solid-state imaging element in a first modification example of the sixteenth embodiment of the present technology.

FIG. 74 is a timing chart showing an example of an operation of the solid-state imaging element 200 in the first modification example of the sixteenth embodiment of the present technology. Control up to a timing T4 at which a sample-and-hold period of a frame F1 ends in the first modification example of the sixteenth embodiment is similar to that in the sixteenth embodiment.

Further, in the first modification example of the sixteenth embodiment, a vertical scanning circuit 211 drives all pixels at a timing T5 after the timing T4 to start exposure of a frame F2, and ends the exposure of the frame F2 at a timing T8. The vertical scanning circuit 211 drives all pixels immediately after the timing T8 to start exposure of a frame F3, and ends the exposure of the frame F3 at a timing T11.

Furthermore, a frame F0 is read within a period from the timing T4 when the sample-and-hold period ends to a timing T7 when the next sample-and-hold period is started. The frame F1 is read within a period from a timing T9 when the sample-and-hold period ends to a timing T10 when the next sample-and-hold period is started. It is assumed that the reading of all rows of the frame F1 is not completed within this period. In this case, the remaining rows of the frame F1 are read within a period from a timing T12 at which the sample-and-hold period ends to a timing T13.

When there are six capacitive elements, consecutive imaging can be performed up to three times as in the sixteenth embodiment, but consecutive imaging can also be performed up to twice as shown in the first modification example of the sixteenth embodiment. Thereby, the reading of the frame F0 is not interrupted, and thus it is possible to further shorten a period of time until the exposure of the frame F3 is started. Although the frame F2 is imaged after consecutive imaging is performed twice in the drawing, it is also possible to adopt a configuration in which this frame is not imaged. When the frame F2 is not imaged, the number of capacitive elements may remain six or may be reduced by two.

In this manner, according to the first modification example of the sixteenth embodiment of the present technology, since the number of frames to be consecutively imaged is set to two, it is possible to further shorten a period of time from the end of the exposure of the frame F2 to the start of the exposure of the frame F3.

Second Modification Example

In the sixteenth embodiment described above, a reset level and a signal level are held in a capacitive element for each frame. However, in this configuration, two capacitive elements are required in a pixel for each frame, and the number of frames to be consecutively imaged is limited to half the number of capacitive elements. For example, when there are six capacitive elements in a pixel, the number of frames to be consecutively imaged is limited to three. A solid-state imaging element 200 in a second modification example of the sixteenth embodiment is different from that in the sixteenth embodiment in that the number of frames to be consecutively imaged is increased by holding only a signal level from a second frame onward.

Figure 75:
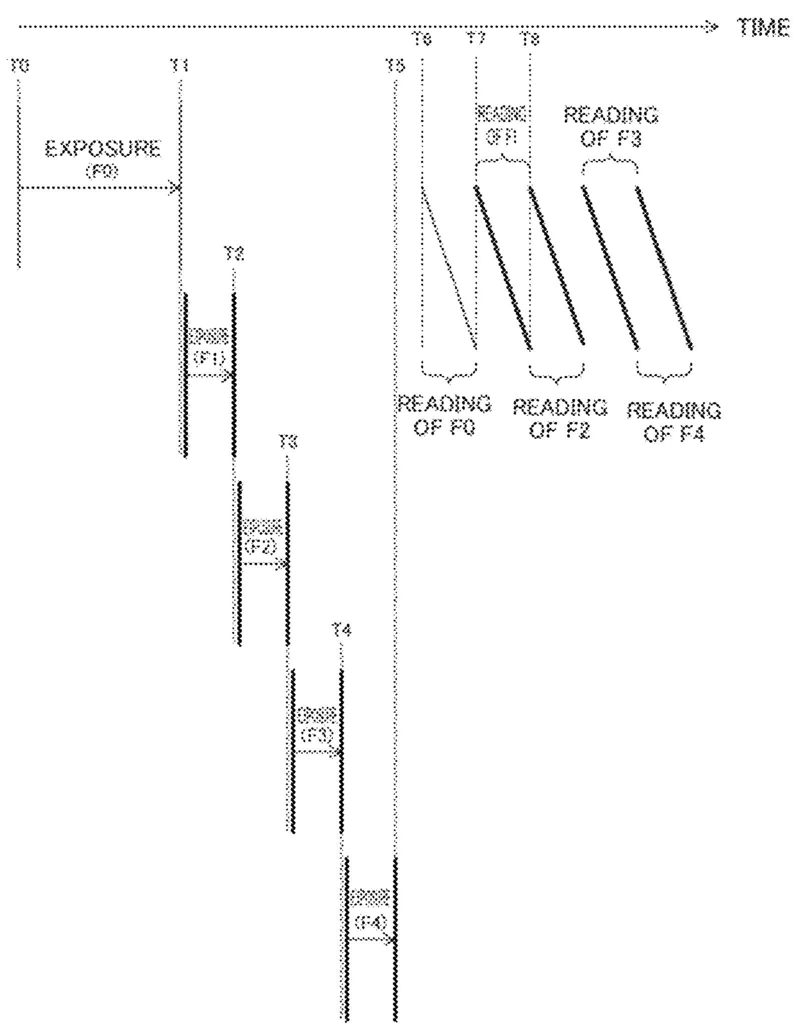
FIG. 75 is a timing chart showing an example of an operation of a solid-state imaging element in a second modification example of the sixteenth embodiment of the present technology.

FIG. 75 is a timing chart showing an example of an operation of the solid-state imaging element 200 in the second modification example of the sixteenth embodiment of the present technology. A vertical scanning circuit 211 drives all pixels at a timing T0 to start exposure of a frame F0 and end the exposure of the frame F0 at a timing T1. The vertical scanning circuit 211 generates a reset level immediately before the timing T1 and holds the generated reset level in a capacitive element 321-1. Further, the vertical scanning circuit 211 generates a signal level at the timing T1 and holds the generated signal level in a capacitive element 321-2.

Then, the vertical scanning circuit 211 drives all pixels immediately after the timing T1 to start exposure of a frame F1 and end the exposure of the frame F1 at a timing T2. The vertical scanning circuit 211 generates a signal level at the timing T2 and holds the generated signal level in a capacitive element 321-3. On the other hand, a reset level of the frame F1 is not held.

The vertical scanning circuit 211 drives all pixels immediately after the timing T2 to start exposure of a frame F2 and end the exposure of the frame F2 at a timing T3. The vertical scanning circuit 211 generates a signal level at the timing T3 and holds the generated signal level in a capacitive element 321-4. Further, the vertical scanning circuit 211 drives all pixels immediately after the timing T3 to start exposure of a frame F3 and end the exposure of the frame F3 at a timing T4. The vertical scanning circuit 211 generates a signal level at the timing T4 and holds the generated signal level in a capacitive element 321-5. Then, the vertical scanning circuit 211 drives all pixels immediately after the timing T4 to start exposure of a frame F4 and end the exposure of the frame F4 at a timing T5. The vertical scanning circuit 211 generates a signal level at timing T5 and holds the generated signal level in a capacitive element 321-6. On the other hand, reset levels of the frames F2 to F4 are not held.

Then, after a timing T6 when a sample-and-hold period ends, the reset level and the signal level of the frame F0 and the signal levels of the frames F2 to F4 are read in order. It is assumed that at least two of the five frames have different exposure periods.

As shown in the drawing, only the signal level is held from the frame F1 onward, and thus the number of frames to be consecutively imaged can be increased to five. The number of frames to be consecutively imaged is not limited to five, but can also be two to four. In this case, as in the first modification example of the sixteenth embodiment, a third frame and the subsequent frames may be imaged, or may not be imaged. Further, when the number of frames to be consecutively imaged is set to two to four, the number of capacitive elements may remain six, or may be reduced by leaving an amount necessary for the number of frames to be consecutively imaged. Further, it is also possible to consecutively image six or more frames, and in this case, one capacitive element is added each time the number of frames to be consecutively imaged is increased by one.

Figure 76:
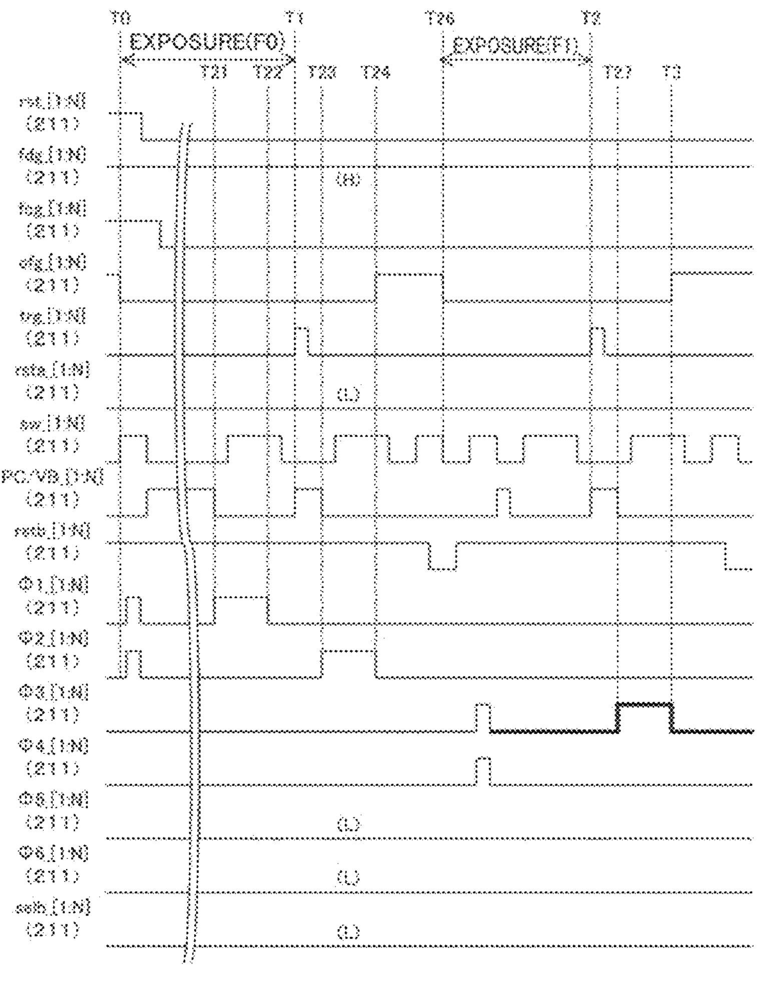
FIG. 76 is a timing chart showing an example of exposure control in the second modification example of the sixteenth embodiment of the present technology.

FIG. 76 is a timing chart showing an example of exposure control in the second modification example of the sixteenth embodiment of the present technology. In the second modification example of the sixteenth embodiment, a high-level selection signal is not supplied immediately before a timing T2 when exposure of a frame F1 ends, and a reset level is not held. Further, the vertical scanning circuit 211 supplies a high-level selection signal Φ3 to all pixels during a sample-and-hold period from a timing T27 immediately after the timing T2 to a timing T3 and holds a signal level. Similarly, only the signal level is held in the frame F2 and the subsequent frames.

Figure 77:
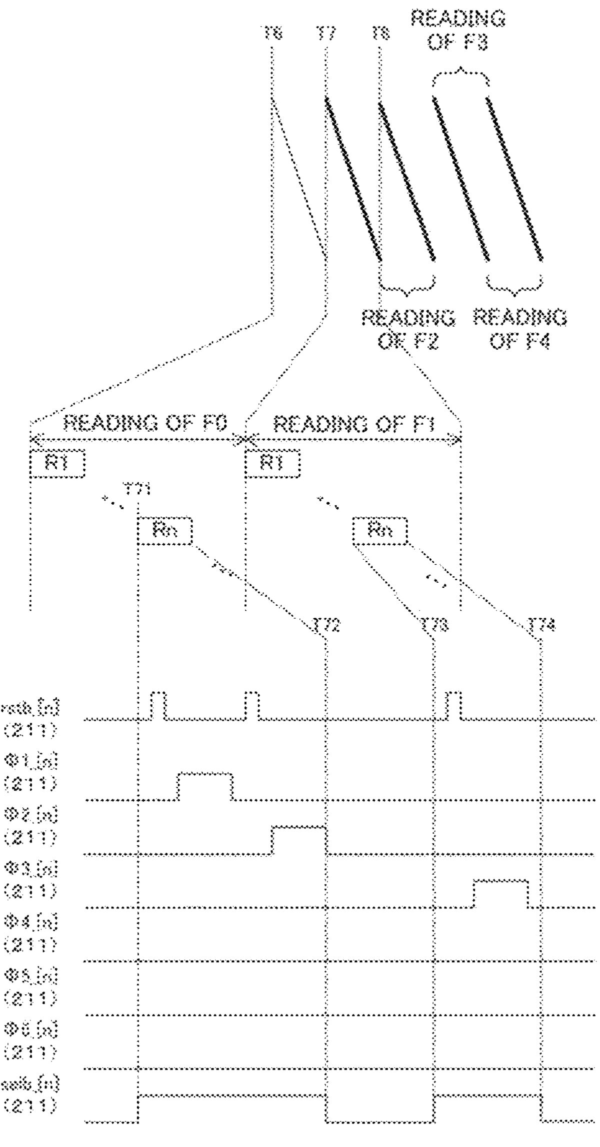
FIG. 77 is a timing chart showing an example of a reading operation in the second modification example of the sixteenth embodiment of the present technology.

FIG. 77 is a timing chart showing an example of a reading operation in the second modification example of the sixteenth embodiment of the present technology. A reset level and a signal level of a frame F0 are read over a period from a timing T6 at the end of a sample-and-hold period to a timing T7. The vertical scanning circuit 211 supplies a high-level selection signal Φ1 to an n-th row during a reading period of the n-th row from a timing T71 to a timing T72, and then supplies a high-level selection signal Φ2. Thereby, a reset level and a signal level of the n-th row are read.

A signal level of the frame F1 is read over a period from the timing T7 to a timing T8. During a reading period of the n-th row from a timing T73 to a timing T74, the vertical scanning circuit 211 supplies a high-level selection signal Φ3 to the n-th row over a predetermined period. Thereby, the signal level of the n-th row is read. Thereafter, through similar control, signal levels of frames F2 to F4 are read in order in response to selection signals Φ4, Φ5, and Φ6.

A column signal processing circuit 260 holds the reset level of the frame F0 and performs CDS processing for obtaining a difference between the reset level and the signal level of each of the frames F0 to F4 to generate five frames.

In this manner, according to the second modification example of the sixteenth embodiment of the present technology, the vertical scanning circuit 211 holds only the signal level from the second frame onward, and thus it is possible to increase the number of frames to be consecutively imaged.

17. Example of Application to Mobile Object

The technology according to the present disclosure (this technology) can be applied to various products. For example, the technology according to the present disclosure may be realized as a device mounted on any type of mobile object such as a car, an electric vehicle, a hybrid electric vehicle, a motorcycle, a bicycle, a personal mobility, an airplane, a drone, a ship, and a robot.

Figure 78:
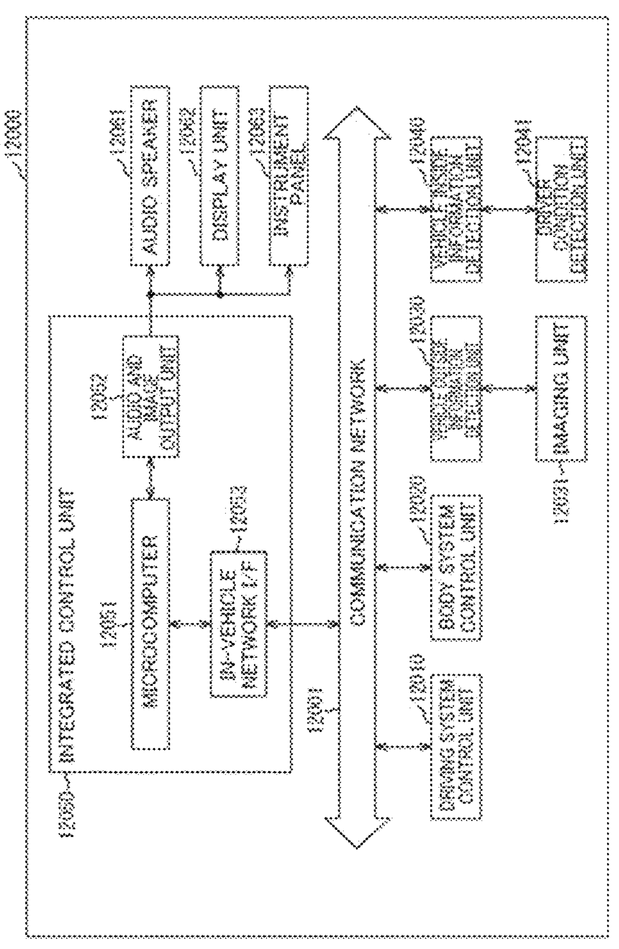
FIG. 78 is a block diagram showing a schematic configuration example of a vehicle control system.

FIG. 78 is a block diagram showing a schematic configuration example of a vehicle control system, which is an example of a mobile object control system to which the technology according to the present disclosure can be applied.

A vehicle control system 12000 includes a plurality of electronic control units connected via a communication network 12001. In an example shown in FIG. 78, the vehicle control system 12000 includes a driving system control unit 12010, a body system control unit 12020, a vehicle outside information detection unit 12030, a vehicle inside information detection unit 12040, and an integrated control unit 12050. Further, as a functional configuration of the integrated control unit 12050, a microcomputer 12051, an audio and image output unit 12052, and an in-vehicle network interface (I/F) 12053 are shown.

The driving system control unit 12010 controls operations of devices related to a driving system of a vehicle in accordance with various programs. For example, the driving system control unit 12010 functions as a control device for a driving force generation device, such as an internal combustion engine or a drive motor, which generates a driving force for the vehicle, a driving force transmission mechanism for transmitting the driving force to wheels, a steering mechanism that adjusts the steering angle of the vehicle, a braking device that generates a braking force for the vehicle, and the like.

The body system control unit 12020 controls operations of various devices installed in a vehicle body in accordance with various programs. For example, the body system control unit 12020 functions as a control device for a keyless entry system, a smart key system, a power window device, or various lamps such as a head lamp, a back lamp, a brake lamp, a turn signal, or a fog lamp. In this case, radio waves transmitted from a portable device that replaces a key or signals from various switches may be input to the body system control unit 12020. The body system control unit 12020 receives inputs of these radio waves or signals, and controls a door lock device, a power window device, a lamp, and the like of the vehicle.

The vehicle outside information detection unit 12030 detects information regarding the outside of the vehicle in which the vehicle control system 12000 is mounted. For example, an imaging unit 12031 is connected to the vehicle outside information detection unit 12030. The vehicle outside information detection unit 12030 causes the imaging unit 12031 to capture an image of the exterior of the vehicle, and receives the captured image. The vehicle outside information detection unit 12030 may perform object detection processing for, such as a person, a car, an obstacle, a sign, or characters on a road surface or distance detection processing based on the received image.

The imaging unit 12031 is an optical sensor that receives light and outputs an electrical signal according to the amount of received light. The imaging unit 12031 can also output the electrical signal as an image or as distance measurement information. Further, the light received by the imaging unit 12031 may be visible light or non-visible light such as infrared rays.

The vehicle inside information detection unit 12040 detects information regarding the inside of the vehicle. For example, a driver condition detection unit 12041 that detects the condition of a driver is connected to the vehicle inside information detection unit 12040. The driver condition detection unit 12041 includes, for example, a camera that images the driver, and the vehicle inside information detection unit 12040 may calculate the degree of fatigue or concentration of the driver or may determine whether the driver is falling asleep, based on detection information input from the driver condition detection unit 12041.

The microcomputer 12051 can calculate a control target value for the driving force generation device, the steering mechanism, or the braking device based on the information regarding the inside and outside of the vehicle which is acquired by the vehicle outside information detection unit 12030 or the vehicle inside information detection unit 12040, and can output a control command to the driving system control unit 12010. For example, the microcomputer 12051 can perform cooperative control for the purpose of realizing the functions of an advanced driver assistance system (ADAS) including vehicle collision avoidance or impact mitigation, following traveling based on a following distance, vehicle speed maintenance travelling, a vehicle collision warning, a vehicle lane departure warning, and the like.

In addition, the microcomputer 12051 can perform cooperative control for the purpose of autonomous driving and the like in which the vehicle travels autonomously without depending on the driver's operation by controlling the driving force generation device, the steering mechanism, the braking device, or the like based on information regarding the surroundings of the vehicle acquired by the vehicle outside information detection unit 12030 or the vehicle inside information detection unit 12040.

Furthermore, the microcomputer 12051 can output a control command to the body system control unit 12020 based on the information regarding the outside of the vehicle which is acquired by the vehicle outside information detection unit 12030. For example, the microcomputer 12051 can control the headlamps in accordance with the position of a preceding vehicle or an oncoming vehicle detected by the vehicle outside information detection unit 12030, and can perform cooperative control for the purpose of preventing glare, such as switching from high beam to low beam.

The audio and image output unit 12052 transmits an output signal of at least one of audio and an image to an output device capable of visually or audibly giving a notice of information to an occupant of the vehicle or the outside of the vehicle. In the example of FIG. 78, an audio speaker 12061, a display unit 12062, and an instrument panel 12063 are shown as output devices. The display unit 12062 may include, for example, at least one of an on-board display and a head-up display.

Figure 79:
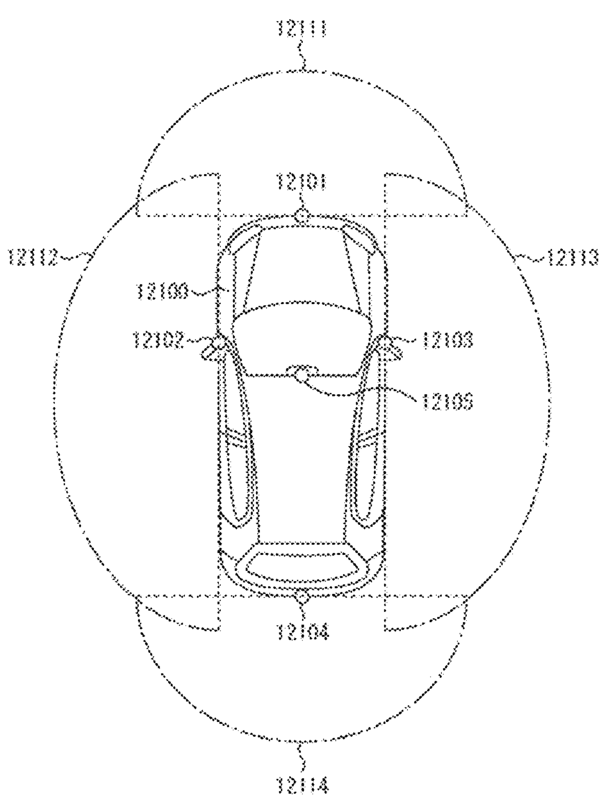
FIG. 79 is an explanatory diagram showing an example of an installation position of an imaging unit.

FIG. 79 is a diagram showing an example of an installation position of the imaging unit 12031.

In FIG. 79, the imaging unit 12031 includes imaging units 12101, 12102, 12103, 12104, and 12105.

The imaging units 12101, 12102, 12103, 12104, and 12105 are provided at positions such as a front nose, side mirrors, a rear bumper, and a back door of a vehicle 12100, and an upper portion of a windshield inside the vehicle 12100. The imaging unit 12101 provided at the front nose and the imaging unit 12105 provided at the upper portion of the windshield inside the vehicle mainly acquire images of regions in front of the vehicle 12100. The imaging units 12102 and 12103 provided at the side mirrors mainly capture images of regions at the sides of the vehicle 12100. The imaging unit 12104 provided at the rear bumper or the back door mainly captures images regions behind the vehicle 12100. The imaging unit 12105 provided at the upper portion of the windshield inside the vehicle is mainly used to detect preceding vehicles, pedestrians, obstacles, traffic lights, traffic signs, lanes, and the like.

FIG. 79 shows an example of imaging ranges of the imaging units 12101 to 12104. An imaging range 12111 indicates the imaging range of the imaging unit 12101 provided at the front nose, imaging ranges 12112 and 12113 indicate the imaging ranges of the imaging units 12102 and 12103 provided at the side mirrors, respectively, and an imaging range 12114 indicates the imaging range of the imaging unit 12104 provided at the rear bumper or the back door. For example, pieces of image data captured by the imaging units 12101 to 12104 are superimposed on each other, and thus an overhead image of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object within the imaging ranges 12111 to 12114 and changes in the distance over time (relative speeds with respect to the vehicle 12100) based on the distance information obtained from the imaging units 12101 to 12104, and thus it is possible to particularly extract, as a preceding vehicle, a three-dimensional object that is closest to the vehicle 12100 on its advancing route and that is traveling at a predetermined speed (for example, 0 km/h or more) in substantially the same direction as the vehicle 12100. Further, the microcomputer 12051 can set an inter-vehicle distance to be secured in advance in front of the preceding vehicle, and perform automatic brake control (also including follow-up stop control), automatic acceleration control (also including follow-up start control), and the like. In this manner, it is possible to perform cooperative control for the purpose of autonomous driving and the like in which the vehicle travels autonomously without depending on the driver's operation.

For example, the microcomputer 12051 can classify and extract three-dimensional object data regarding three-dimensional objects into other three-dimensional objects such as two-wheeled vehicles, regular vehicles, large vehicles, pedestrians, and telephone poles based on the distance information obtained from the imaging units 12101 to 12104, and can use the classified three-dimensional object data for automatic avoidance of obstacles. For example, the microcomputer 12051 identifies obstacles around the vehicle 12100 into obstacles that are visible to the driver of the vehicle 12100 and obstacles that are difficult to view. Then, the microcomputer 12051 determines a collision risk indicating the degree of risk of a collision with each obstacle, and when the collision risk is equal to or greater than a set value and there is a possibility of a collision, the microcomputer 12051 can perform driving assistance for avoiding the collision by outputting a warning to the driver through the audio speaker 12061 and the display unit 12062 and performing forced deceleration and avoidance steering via the driving system control unit 12010.

At least one of the imaging units 12101 to 12104 may be an infrared camera that detects infrared rays. For example, the microcomputer 12051 can recognize a pedestrian by determining whether the pedestrian is present in images captured by the imaging units 12101 to 12104. Such pedestrian recognition is performed through, for example, a procedure of extracting feature points in images captured by the imaging units 12101 to 12104 as infrared cameras and a procedure of determining whether it is a pedestrian by performing pattern matching processing on a series of feature points indicating the outline of an object. When the microcomputer 12051 determines that a pedestrian is present in the images captured by the imaging units 12101 to 12104 and recognizes the pedestrian, the audio and image output unit 12052 controls the display unit 12062 so that a rectangular outline for emphasis is displayed on the recognized pedestrian in an overlapping manner. Furthermore, the audio and image output unit 12052 may control the display unit 12062 so that an icon or the like indicating a pedestrian is displayed at a desired position.

An example of a vehicle control system to which the technology according to the present disclosure can be applied has been described above. The technology according to the present disclosure can be applied to the imaging unit 12031 among the configurations described above. Specifically, for example, the imaging device 100 in FIG. 1 can be applied to the imaging unit 12031. By applying the technology according to the present disclosure to the imaging unit 12031, it is possible to reduce kTC noise and obtain a captured image that is easier to view, thereby making it possible to reduce a driver's fatigue.

The above-described embodiments show an example for embodying the present technology, and the matters in the embodiments and the matters specifying the invention in the claims have correspondence relations. Similarly, the matters specifying the invention in the claims and the matters in the embodiments of the present technology having the same names have correspondence relations. However, the present technology is not limited to the embodiments, and can be embodied by making various modifications to the embodiments without departing from the gist thereof.

The effects described in this specification are merely examples and are not limiting, and there may be other effects.

The present technology can also adopt the following configuration.

(1) A solid-state imaging element including:
- a previous-stage circuit that converts charges into a voltage using each of a plurality of conversion efficiencies and outputs it to a previous-stage node;
- a plurality of capacitive elements whose one ends are connected to the previous-stage node in common;
- a selection circuit that connects the other end of one of the plurality of capacitive elements to a subsequent-stage node; and
- a subsequent-stage circuit that reads the voltage via the subsequent-stage node.

(2) The solid-state imaging element according to (1), wherein the plurality of capacitive elements include
- a high capacitive element whose capacitance value is higher than a predetermined value, and
- a low capacitive element whose capacitance value is lower than the predetermined value,
- the high capacitive element holds the voltage generated by a highest high conversion efficiency among the plurality of conversion efficiencies, and
- the low capacitive element holds the voltage generated by a conversion efficiency lower than the high conversion efficiency among the plurality of conversion efficiencies.

(3) The solid-state imaging element according to (2), wherein an area of the high capacitive element is larger than that of the low capacitive element.

(4) The solid-state imaging element according to (2), wherein a capacitance density of the high capacitive element is higher than that of the low capacitive element.

(5) The solid-state imaging element according to (2), wherein the high capacitive element includes a plurality of unit capacitive elements connected in parallel.

(6) The solid-state imaging element according to any one of (2) to (5), wherein the previous-stage circuit, the selection circuit, and the subsequent-stage circuit are disposed in a first chip, and
- the plurality of capacitive elements are disposed in a second chip.

(7) The solid-state imaging element according to (6), wherein a distance from the output terminal of the previous-stage circuit to the high capacitive element is longer than a distance from the output terminal to the low capacitive element.

(8) The solid-state imaging element according to claim 6, wherein the first chip includes a plurality of laminated substrates.

(9) The solid-state imaging element according to any one of (6) to (8), wherein the previous-stage circuit includes
- a photoelectric conversion element, a previous-stage transfer transistor that transfers the charges from the photoelectric conversion element to a floating diffusion layer, a first reset transistor that initializes the floating diffusion layer, a previous-stage amplification transistor that amplifies the voltage and outputs it to the previous-stage node, and a predetermined number of conversion efficiency control transistors that control a conversion efficiency.

(10) The solid-state imaging element according to (9), wherein the previous-stage circuit further includes an additional capacitor, the conversion efficiency control transistor is inserted between the floating diffusion layer and the additional capacitor, and the additional capacitor is disposed in the second chip.

(11) The solid-state imaging element according to (9), wherein the previous-stage circuit further includes an additional capacitor, and a discharge transistor that discharges the charges from the photoelectric conversion element, the predetermined number of conversion efficiency control transistors include first and second conversion efficiency control transistors inserted in series between the floating diffusion layer and the additional capacitor, and the additional capacitor is disposed in either the first or second chip.

(12) The solid-state imaging element according to any one of (9) to (11), further including:

a switching unit that adjusts a source voltage supplied to a source of the previous-stage amplification transistor, wherein the previous-stage circuit further includes a current source transistor that supplies a current to a drain of the previous-stage amplification transistor, and the current source transistor transitions from an ON state to an OFF state after an exposure period ends.

(13) The solid-state imaging element according to (12), wherein the switching unit supplies a predetermined power supply voltage as the source voltage within the exposure period, and supplies a generated voltage different from the power supply voltage as the source voltage after the exposure period ends.

(14) The solid-state imaging element according to (9), further including:

a control circuit that controls a reset power supply voltage of the previous-stage circuit, wherein the first reset transistor initializes a voltage of the floating diffusion layer to the reset power supply voltage, and the control circuit sets the reset power supply voltage to a voltage different from that in the exposure period within a reading period in which the voltage is read.

(15) The solid-state imaging element according to (1), further including:

a digital signal processing unit that adds a pair of consecutive frames, wherein the plurality of capacitive elements include first and second capacitive elements, the voltage includes a reset level and a signal level, and the previous-stage circuit holds the reset level in one of the first and second capacitive elements within an exposure period of one of the pair of frames and then holds the signal level in the other of the first and second capacitive elements, and holds the reset level in the other of the first and second capacitive elements within an exposure period of the other of the pair of frames and then holds the signal level in one of the first and second capacitive elements.

(16) The solid-state imaging element according to any one of (1) to (15), further including: an analog-to-digital converter that converts the output voltage into a digital signal.

(17) The solid-state imaging element according to (16), wherein the analog-to-digital converter includes a comparator that compares a level of a vertical signal line for transmitting the voltage with a predetermined ramp signal and outputs a comparison result, and a counter that counts a count value over a period until the comparison result is inverted, and outputs the digital signal indicating the count value.

(18) The solid-state imaging element according to (17), wherein the comparator includes a comparison device that compares levels of a pair of input terminals and outputs comparison results, and an input-side selector that selects either the vertical signal line or a node of a predetermined reference voltage and connects it to one of the pair of input terminals, and the ramp signal is input to one of the pair of input terminals.

(19) The solid-state imaging element according to (18), further including:

a control unit that determines whether an illuminance is higher than a predetermined value based on the comparison result and outputs a determination result;

a correlated double sampling (CDS) processing unit that performs correlated double sampling processing on the digital signal; and an output-side selector that outputs either the digital signal subjected to the correlated double sampling processing or a digital signal having a predetermined value based on the determination result.

(20) The solid-state imaging element according to (1), further including:

a vertical scanning circuit that controls the previous-stage circuit to set a conversion efficiency, wherein capacitance values of the plurality of capacitive elements are the same, and the voltage includes a reset level and a signal level according to an exposure amount.

(21) The solid-state imaging element according to (20), wherein the vertical scanning circuit sets one of the plurality of conversion efficiencies, holds the reset level in half of the plurality of capacitive elements, and holds the signal level in the other half of the plurality of capacitive elements.

(22) The solid-state imaging element according to (20), wherein the plurality of capacitive elements include a plurality of first capacitive elements, a plurality of second capacitive elements, and a plurality of third capacitive elements, and the vertical scanning circuit sets one of the plurality of conversion efficiencies, holds the reset level in half of the plurality of first capacitive elements, and holds the signal level in the plurality of second capacitive elements.

(23) The solid-state imaging element according to (20), wherein the plurality of capacitive elements include a plurality of first capacitive elements, a plurality of second capacitive elements, a plurality of third capacitive elements, and a plurality of fourth capacitive elements, and the vertical scanning circuit sequentially sets two of the plurality of conversion efficiencies, holds the reset level generated by a higher one of the two conversion efficiencies in the plurality of first capacitive elements, holds the signal level generated by the higher one of the two conversion efficiencies in the plurality of second capacitive elements, holds the reset level generated by a lower one of the two conversion efficiencies in the plurality of third capacitive elements, and holds the signal level generated by the lower one of the two conversion efficiencies in the plurality of fourth capacitive elements.

(24) The solid-state imaging element according to (20), wherein the plurality of capacitive elements include a plurality of first capacitive elements, a plurality of second capacitive elements, a predetermined number of third capacitive elements smaller than the number of first capacitive elements, and the predetermined number of fourth capacitive elements, and the vertical scanning circuit sequentially sets two of the plurality of conversion efficiencies, holds the reset level generated by a higher one of the two conversion efficiencies in the plurality of first capacitive elements, holds the signal level generated by the higher one of the two conversion efficiencies in the plurality of second capacitive elements, holds the reset level generated by a lower one of the two conversion efficiencies in the predetermined number of third capacitive elements, and holds the signal level generated by the lower one of the two conversion efficiencies in the predetermined number of fourth capacitive elements.

(25) The solid-state imaging element according to (1), wherein the voltage includes a first reset level generated immediately before end of a first exposure period, a first signal level generated at the end of the first exposure period, a second reset level generated immediately before end of a second exposure period, and a second signal level generated at the end of the second exposure period, the plurality of capacitive elements include a first capacitive element that holds the first reset level, a second capacitive element that holds the first signal level, a third capacitive element that holds the second reset level, and a fourth capacitive element that holds the second signal level, the second exposure period is started immediately after the end of the first exposure period, and the subsequent-stage circuit reads the voltage while avoiding a sample-and-hold period of the voltage.

(26) The solid-state imaging element according to (25), wherein the voltage further includes a third reset level generated immediately before end of a third exposure period and a third signal level generated at the end of the third exposure period, the plurality of capacitive elements further include a fifth capacitive element that holds the third reset level and a sixth capacitive element that holds the third signal level, and the third exposure period is started immediately after the end of the second exposure period.

(27) The solid-state imaging element according to (1), wherein the voltage includes a first reset level generated immediately before end of a first exposure period, a first signal level generated at the end of the first exposure period, and a second signal level generated at end of the second exposure period, the plurality of capacitive elements include a first capacitive element that holds the first reset level, a second capacitive element that holds the first signal level, and a third capacitive element that holds the second signal level, the second exposure period is started immediately after the end of the first exposure period, and the subsequent-stage circuit reads the voltage while avoiding a sample-and-hold period of the voltage.

(28) A solid-state imaging element including:

a photoelectric conversion element;

a first additional capacitor;

a second additional capacitor that has a capacitance value different from that of the first additional capacitor;

a transfer transistor that transfers charges from the photoelectric conversion element to a floating diffusion layer;

a first conversion efficiency control transistor that opens and closes a path between the floating diffusion layer and the first additional capacitor; and a second conversion efficiency control transistor that opens and closes a path between a connection node between the first conversion efficiency control transistor and the first additional capacitor and the second z additional capacitor.

REFERENCE SIGNS LIST

100 Imaging device
110 Imaging lens
120 Recording unit
130 Imaging control unit
200 Solid-state imaging element
201 Upper pixel chip
202 Lower pixel chip
203 Circuit chip
211 Vertical scanning circuit
212 Timing control circuit
213 DAC
220 Pixel array unit
221 Upper pixel array unit
222 Lower pixel array unit
223, 223-1 Upper pixel region
223-2 Intermediate pixel region
224 Lower pixel region
225 Output terminal
226, 227 Connection terminal
250 Load MOS circuit block
251 Load MOS transistor
260 Column signal processing circuit
261, 270 ADC
262, 290 Digital signal processing unit
271 Counter
280 Comparator
281, 292 Selector
282, 283, 321, 321-1 to 321-6, **321-1*a*, 321-1*b*, 322-1*a*, 322-1*b*, 322, 322-1 to 322-3** Capacitive element
284, 286 Auto-zero switch
285 Comparison device
291 CDS processing unit
300 Pixel
301 Effective pixel
310 Previous-stage circuit
311 Photoelectric conversion element
312 Transfer transistor
313 FD reset transistor
314 FD
315 Previous-stage amplification transistor
316 Current source transistor
317 Discharge transistor
323 Previous-stage reset transistor
324 Previous-stage selection transistor
330 Selection circuit

331, 332, 331-1 to 331-8, 332-1 to 332-3 Selection transistor
341 Subsequent-stage reset transistor
350 Subsequent-stage circuit
351 Subsequent-stage amplification transistor
352 Subsequent-stage selection transistor
361, 362 Conversion efficiency control transistor
363 Switching transistor
364 Precharge transistor
365, 366 Additional capacitor
367 Amplification transistor
420 Regulator
421 Low-pass filter
422 Buffer amplifier
423 Capacitive element
430 Dummy pixel
431 Reset transistor
432 FD
433 Amplification transistor
434 Current source transistor
440 Switching unit
441 Inverter
442 Switching circuit
443, 444 Switch
501, 501-1, 501-2, 502 Substrate
510, 511 Wiring
12031 Imaging unit

What is claimed is:

1. A solid-state imaging element, comprising:
a previous-stage circuit that converts charges into a voltage using each of a plurality of conversion efficiencies and outputs it to a previous-stage node;
a plurality of capacitive elements whose one ends are connected to the previous-stage node in common;
a selection circuit that connects another end of one of the plurality of capacitive elements to a subsequent-stage node; and
a subsequent-stage circuit that reads the voltage via the subsequent-stage node,
wherein the plurality of capacitive elements includes:
a high capacitive element whose capacitance value is higher than a predetermined value; and
a low capacitive element whose capacitance value is lower than the predetermined value,
wherein the high capacitive element holds the voltage generated by a highest high conversion efficiency among the plurality of conversion efficiencies, and
wherein the low capacitive element holds the voltage generated by a conversion efficiency lower than the highest conversion efficiency among the plurality of conversion efficiencies.

2. The solid-state imaging element according to claim 1, wherein an area of the high capacitive element is larger than that of the low capacitive element.

3. The solid-state imaging element according to claim 1, wherein a capacitance density of the high capacitive element is higher than that of the low capacitive element.

4. The solid-state imaging element according to claim 1, wherein the high capacitive element includes a plurality of unit capacitive elements connected in parallel.

5. The solid-state imaging element according to claim 1, wherein the previous-stage circuit, the selection circuit, and the subsequent-stage circuit are disposed in a first chip, and
the plurality of capacitive elements are disposed in a second chip.

6. The solid-state imaging element according to claim 5, wherein a distance from an output terminal of the previous-stage circuit to the high capacitive element is longer than a distance from the output terminal to the low capacitive element.

7. The solid-state imaging element according to claim 5, wherein the first chip includes a plurality of laminated substrates.

8. The solid-state imaging element according to claim 5, wherein the previous-stage circuit includes
a photoelectric conversion element,
a previous-stage transfer transistor that transfers the charges from the photoelectric conversion element to a floating diffusion layer,
a first reset transistor that initializes the floating diffusion layer,
a previous-stage amplification transistor that amplifies the voltage and outputs it to the previous-stage node, and
a predetermined number of conversion efficiency control transistors that control a conversion efficiency.

9. The solid-state imaging element according to claim 8, wherein the previous-stage circuit further includes an additional capacitor,
the conversion efficiency control transistor is inserted between the floating diffusion layer and the additional capacitor, and
the additional capacitor is disposed in the second chip.

10. The solid-state imaging element according to claim 8, wherein the previous-stage circuit further includes
an additional capacitor, and
a discharge transistor that discharges the charges from the photoelectric conversion element,
the predetermined number of conversion efficiency control transistors include first and second conversion efficiency control transistors inserted in series between the floating diffusion layer and the additional capacitor, and
the additional capacitor is disposed in either the first or second chip.

11. The solid-state imaging element according to claim 8, further comprising:
a switching unit that adjusts a source voltage supplied to a source of the previous-stage amplification transistor,
wherein the previous-stage circuit further includes a current source transistor that supplies a current to a drain of the previous-stage amplification transistor, and
the current source transistor transitions from an ON state to an OFF state after an exposure period ends.

12. The solid-state imaging element according to claim 11, wherein the switching unit supplies a predetermined power supply voltage as the source voltage within the exposure period, and supplies a generated voltage different from the power supply voltage as the source voltage after the exposure period ends.

13. The solid-state imaging element according to claim 8, further comprising:
a control circuit that controls a reset power supply voltage of the previous-stage circuit,
wherein the first reset transistor initializes a voltage of the floating diffusion layer to the reset power supply voltage, and
the control circuit sets the reset power supply voltage to a voltage different from that in an exposure period within a reading period in which the voltage is read.

14. The solid-state imaging element according to claim 1, further comprising:
an analog-to-digital converter that converts the output voltage into a digital signal.

15. The solid-state imaging element according to claim 14, wherein the analog-to-digital converter includes a comparator that compares a level of a vertical signal line for transmitting the voltage with a predetermined ramp signal and outputs a comparison result, and a counter that counts a count value over a period until the comparison result is inverted, and outputs the digital signal indicating the count value.

16. The solid-state imaging element according to claim 15, wherein the comparator includes:

a comparison device that compares levels of a pair of input terminals and outputs comparison results; and an input-side selector that selects either the vertical signal line or a node of a predetermined reference voltage and connects it to one of the pair of input terminals, and wherein the ramp signal is input to one of the pair of input terminals.

17. The solid-state imaging element according to claim 16, further comprising:

a control unit that determines whether an illuminance is higher than a predetermined value based on the comparison result and outputs a determination result;

a correlated double sampling (CDS) processing unit that performs correlated double sampling processing on the digital signal; and an output-side selector that outputs either the digital signal subjected to the correlated double sampling processing or a digital signal having a predetermined value based on the determination result.

18. A solid-state imaging element, comprising:

a previous-stage circuit that converts charges into a voltage using each of a plurality of conversion efficiencies and outputs it to a previous-stage node;

a plurality of capacitive elements whose one ends are connected to the previous-stage node in common;

a selection circuit that connects another end of one of the plurality of capacitive elements to a subsequent-stage node;

a subsequent-stage circuit that reads the voltage via the subsequent-stage node; and a vertical scanning circuit that controls the previous-stage circuit to set a conversion efficiency, wherein the plurality of capacitive elements have a same capacitance value, wherein the voltage includes a reset level and a signal level according to an exposure amount, wherein the plurality of capacitive elements include a plurality of first capacitive elements, a plurality of second capacitive elements, and a plurality of third capacitive elements, and wherein the vertical scanning circuit sets one of the plurality of conversion efficiencies, holds the reset level in half of the plurality of first capacitive elements, and holds the signal level in the plurality of second capacitive elements.

19. A solid-state imaging element, comprising:

a previous-stage circuit that converts charges into a voltage using each of a plurality of conversion efficiencies and outputs it to a previous-stage node;

a plurality of capacitive elements whose one ends are connected to the previous-stage node in common;

a selection circuit that connects another end of one of the plurality of capacitive elements to a subsequent-stage node;

a subsequent-stage circuit that reads the voltage via the subsequent-stage node; and a vertical scanning circuit that controls the previous-stage circuit to set a conversion efficiency, wherein the plurality of capacitive elements have a same capacitance value, wherein the voltage includes a reset level and a signal level according to an exposure amount, wherein the plurality of capacitive elements include a plurality of first capacitive elements, a plurality of second capacitive elements, a plurality of third capacitive elements, and a plurality of fourth capacitive elements, and wherein the vertical scanning circuit sequentially sets two of the plurality of conversion efficiencies, holds the reset level generated by a higher one of the two conversion efficiencies in the plurality of first capacitive elements, holds the signal level generated by the higher one of the two conversion efficiencies in the plurality of second capacitive elements, holds the reset level generated by a lower one of the two conversion efficiencies in the plurality of third capacitive elements, and holds the signal level generated by the lower one of the two conversion efficiencies in the plurality of fourth capacitive elements.

20. A solid-state imaging element, comprising:

a previous-stage circuit that converts charges into a voltage using each of a plurality of conversion efficiencies and outputs it to a previous-stage node;

a plurality of capacitive elements whose one ends are connected to the previous-stage node in common;

a selection circuit that connects another end of one of the plurality of capacitive elements to a subsequent-stage node;

a subsequent-stage circuit that reads the voltage via the subsequent-stage node; and a vertical scanning circuit that controls the previous-stage circuit to set a conversion efficiency, wherein the plurality of capacitive elements have a same capacitance value, wherein the voltage includes a reset level and a signal level according to an exposure amount, wherein the plurality of capacitive elements include a plurality of first capacitive elements, a plurality of second capacitive elements, a predetermined number of third capacitive elements smaller than the number of first capacitive elements, and a predetermined number of fourth capacitive elements, and wherein the vertical scanning circuit sequentially sets two of the plurality of conversion efficiencies, holds the reset level generated by a higher one of the two conversion efficiencies in the plurality of first capacitive elements, holds the signal level generated by the higher one of the two conversion efficiencies in the plurality of second capacitive elements, holds the reset level generated by a lower one of the two conversion efficiencies in the predetermined number of third capacitive elements, and holds the signal level generated by the lower one of the two conversion efficiencies in the predetermined number of fourth capacitive elements.

* * * * *